US011050231B2

(12) United States Patent
Sylvester

(10) Patent No.: US 11,050,231 B2
(45) Date of Patent: Jun. 29, 2021

(54) ACCESS PORTS FOR ELECTRICAL ENCLOSURES

(71) Applicant: Panduit Corp., Tinley Park, IL (US)

(72) Inventor: David J. Sylvester, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 326 days.

(21) Appl. No.: 16/173,103

(22) Filed: Oct. 29, 2018

(65) Prior Publication Data

US 2019/0131782 A1     May 2, 2019

Related U.S. Application Data

(60) Provisional application No. 62/580,698, filed on Nov. 2, 2017.

(51) Int. Cl.

| H02G 3/18 | (2006.01) |
| H01R 13/502 | (2006.01) |
| H02G 3/14 | (2006.01) |
| H02G 3/16 | (2006.01) |
| H01R 13/447 | (2006.01) |
| H02G 3/08 | (2006.01) |
| H02B 1/30 | (2006.01) |
| H01R 24/64 | (2011.01) |
| H01R 27/02 | (2006.01) |
| H01R 13/70 | (2006.01) |
| H01R 24/78 | (2011.01) |

(52) U.S. Cl.
CPC ............ *H02G 3/18* (2013.01); *H01R 13/447* (2013.01); *H01R 13/502* (2013.01); *H02B 1/306* (2013.01); *H02G 3/088* (2013.01); *H02G 3/14* (2013.01); *H02G 3/16* (2013.01); *H01R 13/70* (2013.01); *H01R 24/64* (2013.01); *H01R 24/78* (2013.01); *H01R 27/02* (2013.01)

(58) Field of Classification Search
USPC ............................................... 170/50; 251/43
See application file for complete search history.

(56) References Cited

U.S. PATENT DOCUMENTS

| 1,501,029 | A | * | 7/1924 | Sargent | .................... | H02G 3/20 |
| | | | | | | 439/361 |
| 1,520,421 | A | * | 12/1924 | Kolar | ..................... | H01R 13/62 |
| | | | | | | 439/316 |
| 1,650,870 | A | * | 11/1927 | Guett | ....................... | H02B 1/00 |
| | | | | | | 439/695 |
| 2,178,392 | A | * | 10/1939 | Elfstrom | ................. | B63B 19/00 |
| | | | | | | 114/178 |
| 2,987,909 | A | * | 6/1961 | Shlank | ..................... | H02G 3/14 |
| | | | | | | 70/168 |
| 3,129,992 | A | * | 4/1964 | Blonder | ............... | H01R 13/447 |
| | | | | | | 439/133 |
| 3,131,985 | A | * | 5/1964 | Blonder | ............. | H01R 13/6397 |
| | | | | | | 439/133 |
| 3,345,603 | A | * | 10/1967 | Cohen | .................... | H01R 13/20 |
| | | | | | | 439/268 |

(Continued)

*Primary Examiner* — William H. Mayo, III
*Assistant Examiner* — Krystal Robinson
(74) *Attorney, Agent, or Firm* — Christopher S. Clancy; James H. Williams; Peter S. Lee

(57) ABSTRACT

Examples disclosed herein illustrate various implementations of access ports that are to be mounted to various types of electrical enclosures. In some implementations, the access ports are circular to provide ease of installation and to reduce the overall footprint of the access ports.

13 Claims, 55 Drawing Sheets

(56) References Cited

U.S. PATENT DOCUMENTS

| | | | | |
|---|---|---|---|---|
| 3,372,251 | A * | 3/1968 | Bowman | H01H 27/06 200/43.08 |
| 3,386,393 | A * | 6/1968 | Peterson | E05G 7/001 109/50 |
| 3,676,570 | A * | 7/1972 | Gabb | H02G 3/18 174/61 |
| 3,959,790 | A | 5/1976 | Schuyler | |
| 4,424,407 | A * | 1/1984 | Barbie | H01R 13/447 174/67 |
| 4,482,789 | A * | 11/1984 | McVey | H01R 13/6397 200/43.02 |
| 4,584,856 | A * | 4/1986 | Petersdorff | E05B 17/142 379/445 |
| 4,593,541 | A * | 6/1986 | Hollis | E05B 73/00 174/67 |
| 4,603,931 | A * | 8/1986 | Ruffman | H01R 13/6397 439/133 |
| 4,883,924 | A * | 11/1989 | Hadfield | H02G 3/185 174/482 |
| 4,951,980 | A * | 8/1990 | Wetzel | E05B 9/084 292/202 |
| 5,071,360 | A * | 12/1991 | Lindow | H01R 13/70 439/133 |
| 5,086,194 | A * | 2/1992 | Bruinsma | H02G 3/128 174/493 |
| 5,086,463 | A * | 2/1992 | Vesely | G08B 25/006 200/341 |
| 5,243,135 | A * | 9/1993 | Shotey | H02G 3/14 174/67 |
| 5,338,218 | A * | 8/1994 | Haas | H01R 13/60 200/43.02 |
| 5,347,095 | A * | 9/1994 | Zeder | G08B 13/1409 200/51.02 |
| 5,571,023 | A * | 11/1996 | Anthony | H02G 3/14 220/242 |
| 5,573,412 | A * | 11/1996 | Anthony | H01R 13/5213 220/242 |
| 5,621,788 | A | 4/1997 | Eiken | |
| 5,783,774 | A * | 7/1998 | Bowman | H02G 3/185 174/482 |
| 5,801,632 | A * | 9/1998 | Opal | H04M 11/04 340/585 |
| 5,944,542 | A * | 8/1999 | Lee | H01R 13/4538 439/140 |
| 6,007,353 | A * | 12/1999 | Webster | H01R 13/447 439/142 |
| 6,495,775 | B2 * | 12/2002 | Lawson | H01R 13/701 200/333 |
| 6,700,062 | B1 | 3/2004 | Allen, Jr. | |
| 6,831,226 | B2 | 12/2004 | Allen, Jr. | |
| 6,979,205 | B2 | 12/2005 | Hoopes et al. | |
| 7,090,520 | B2 * | 8/2006 | Matsukawa | H01R 13/193 200/51.09 |
| 7,105,745 | B2 | 9/2006 | Drane et al. | |
| 7,709,735 | B2 | 5/2010 | Vigorito et al. | |
| 7,718,893 | B2 | 5/2010 | Purves et al. | |
| 7,795,544 | B2 * | 9/2010 | Peck | H02G 3/185 174/482 |
| 7,806,374 | B1 * | 10/2010 | Ehmann | H02G 3/22 248/67.5 |
| 8,088,999 | B1 * | 1/2012 | Payou | H02G 3/14 174/67 |
| 8,455,759 | B2 * | 6/2013 | Mortun | H01R 13/746 174/50 |
| 8,598,456 | B2 * | 12/2013 | Carbone | H02G 3/18 174/66 |
| 9,509,097 | B2 * | 11/2016 | Peckham | H01R 13/447 |
| 2008/0047726 | A1 * | 2/2008 | Shai | E05C 19/186 174/17.08 |
| 2009/0038842 | A1 * | 2/2009 | Peck | H02G 3/185 174/482 |
| 2011/0024155 | A1 * | 2/2011 | Brantley | H02G 3/14 174/67 |
| 2014/0162480 | A1 * | 6/2014 | Schutte | H01R 13/447 439/142 |
| 2014/0318856 | A1 | 10/2014 | Carman | |
| 2015/0021087 | A1 | 1/2015 | Ehrgott | |

* cited by examiner

ACCESS PORTS FOR ELECTRICAL ENCLOSURES

CROSS REFERENCE TO RELATED APPLICATIONS

This application claims priority to U.S. Provisional Application No. 62/580,698, filed Nov. 2, 2017, the subject matter of which is hereby incorporated by reference in its entirety.

BACKGROUND

Access ports may be designed to attach to the outside wall or door of an electrical enclosure such as a control panel. The access port allows technicians to access the network and control equipment inside the control panel enclosure without having to open the enclosure door, thereby reducing the risk of injury due to arc-flash or electrocution.

BRIEF DESCRIPTION OF THE DRAWINGS

The following detailed description references the drawings, wherein.

DETAILED DESCRIPTION

Figure 1:
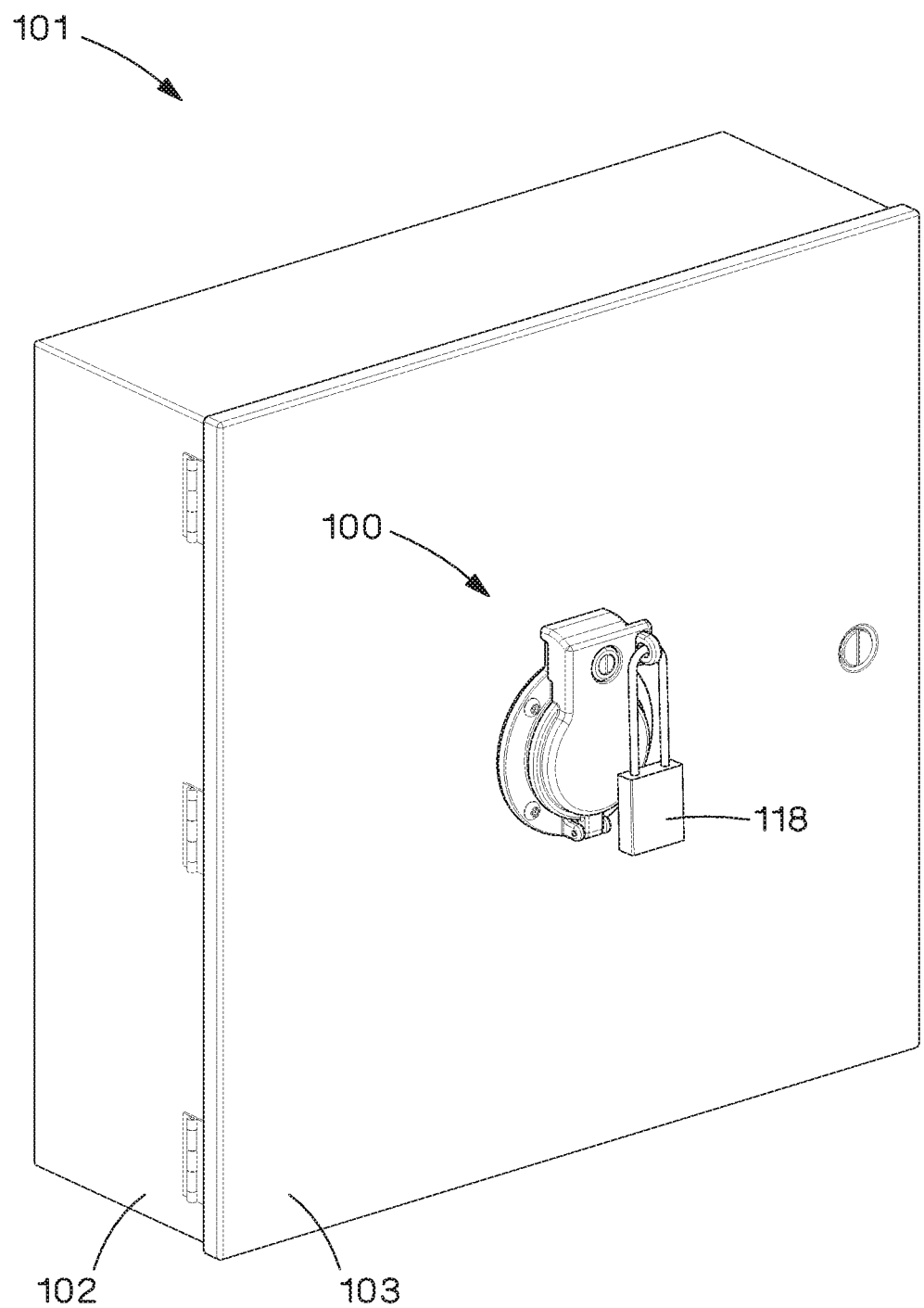
FIG. 1 is a trimetric projection of an example implementation of an access port mounted to an electrical enclosure, a cover of the access port being shown in a closed position.

Examples disclosed herein illustrate various implementations of access ports that are to be mounted to various types of electrical enclosures. The disclosed access ports are designed for ease of installation and utilize minimal mounting space on the enclosure.

Reference will now be made to the accompanying drawings. Wherever possible, the same reference numbers are used in the drawings and the following description to refer to the same or similar parts. It is to be expressly understood, however, that the drawings are for illustration and description purposes only. While several examples are described in this document, modifications, adaptations, and other implementations are possible. Accordingly, the following detailed description does not limit the disclosed examples. Instead, the proper scope of the disclosed examples may be defined by the appended claims.

FIGS. 1-13 illustrate an example access port 100. As shown in FIG. 1, access port 100 may be mounted on a door 103 of an enclosure 101 via screws 110 and nuts 119 or other types of fasteners. The installer may cut a main hole in door 103 for access to components 109*a*-109*c*, and four holes through which screws 110 are threaded. In some implementations, access port 100 may be mounted on other areas of enclosure 101, such as body 102.

As shown in FIGS. 1-13, access port 100 may be a round access port. The round shape of access port 100 minimizes mounting space and provides for easy installation of access port 100. An installer only needs to make one cut in enclosure 101 to provide access to the back of access panel 100 in enclosure 101. Previous access ports required making multiple difficult cuts (e.g., a starter hole first and then the remainder of the area cut using a straight blade) for a square or rectangular shaped access panel. Various circular tools may be used, such as a circular cutting tool (e.g., a hole saw), a knockout punch kit, etc.

Figure 2:
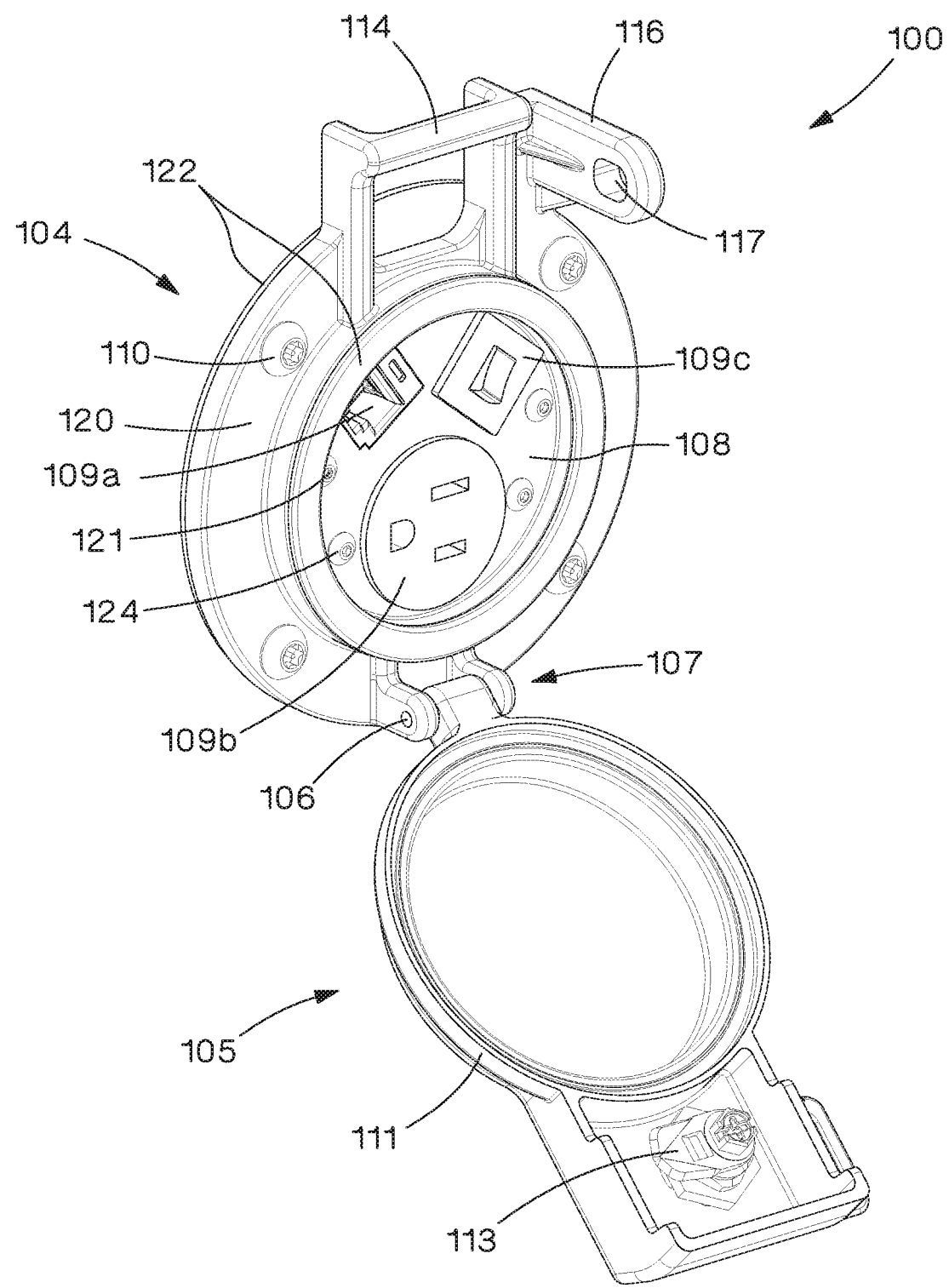
FIG. 2 is a trimetric projection of the access port shown in FIG. 1, with the cover of the access port being shown in an open position.
Figure 3:
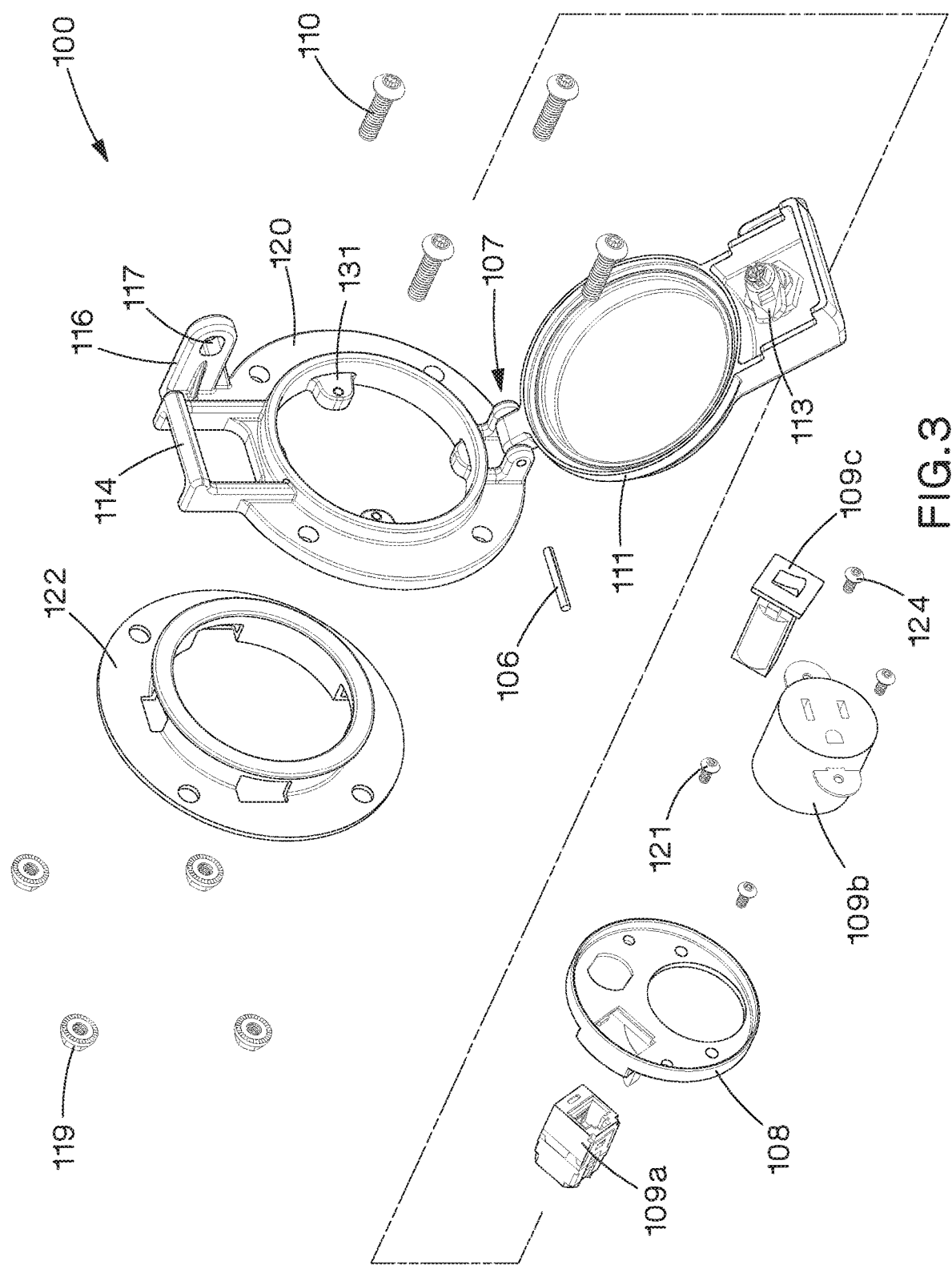
FIG. 3 is an exploded trimetric projection of the access port shown in FIG. 1, with the cover of the access port being shown in the open position.
Figure 4:
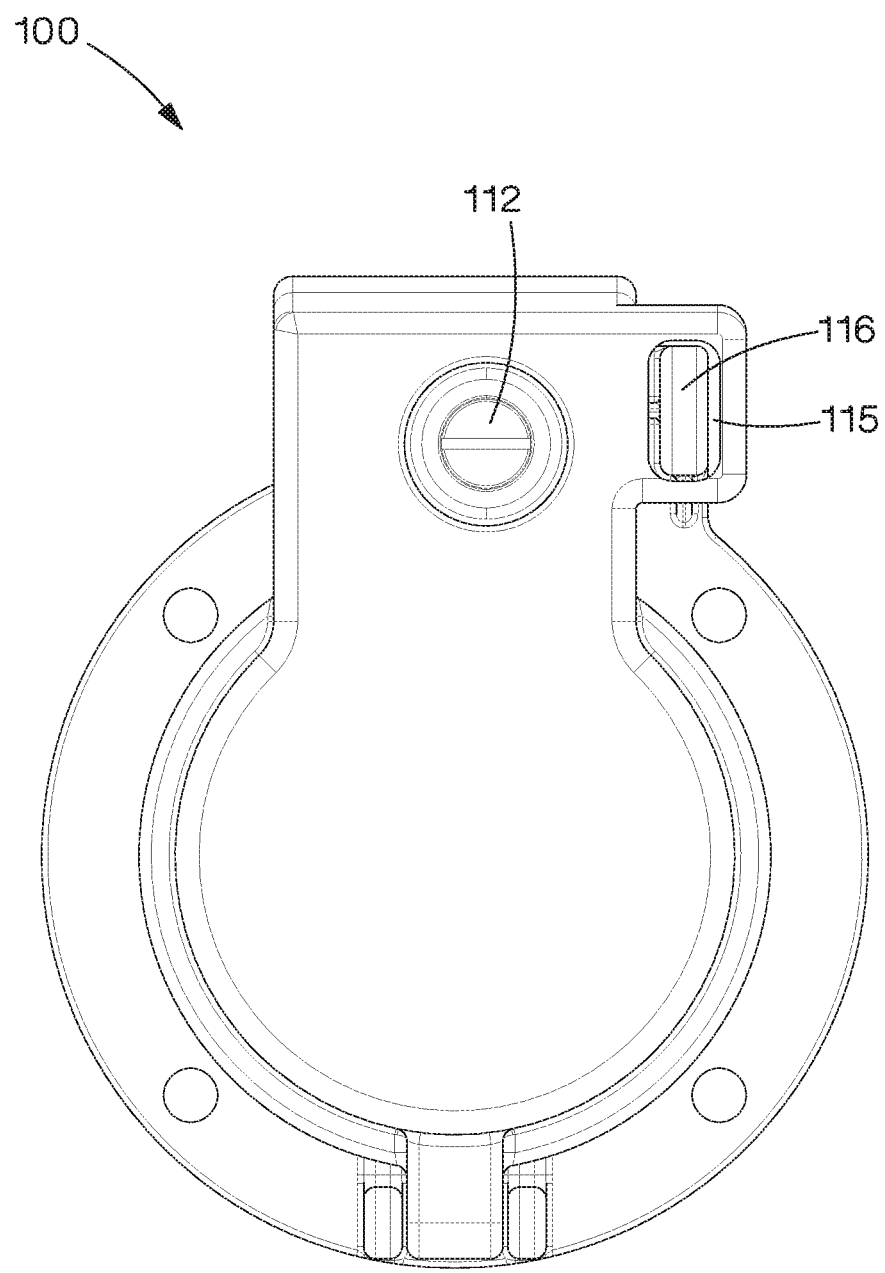
FIG. 4 is a front elevation view of the access port shown in FIG. 1, with the cover of the access port being shown in the closed position.
Figure 5:
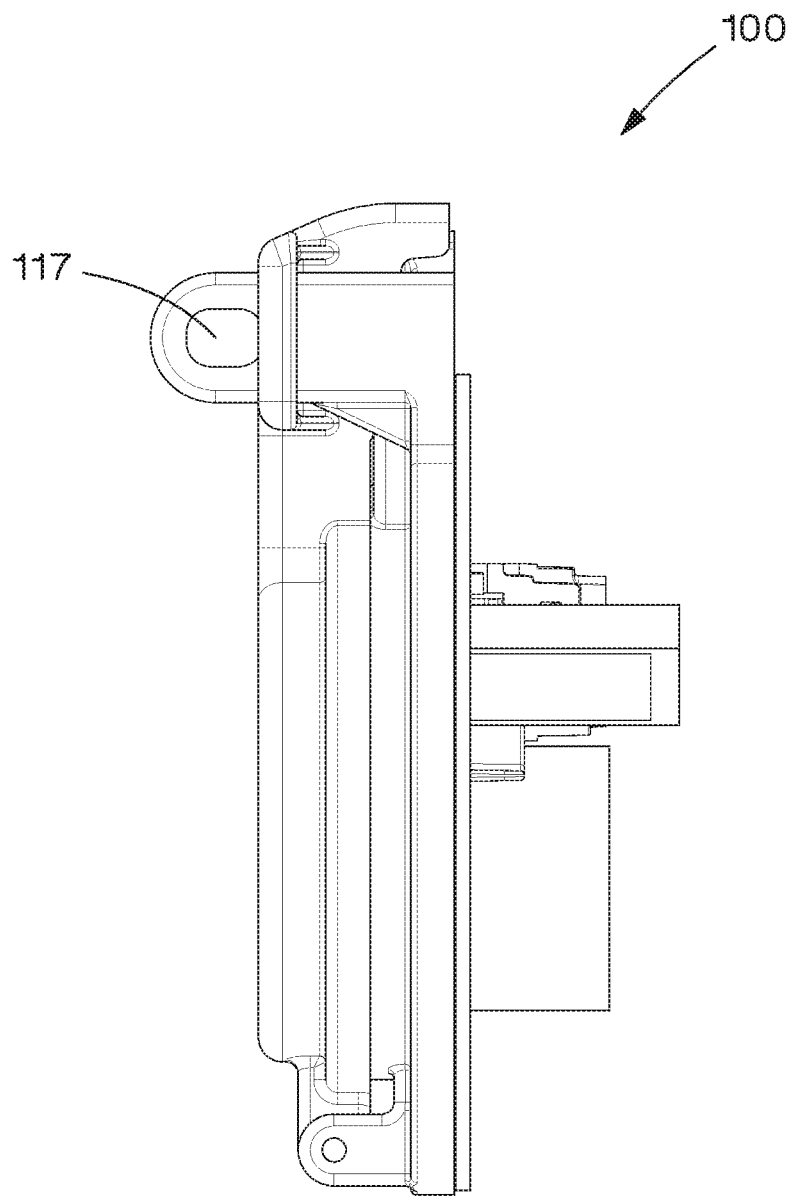
FIG. 5 is a right-side elevation view of the access port shown in FIG. 1, with the cover of the access port being shown in the closed position.
Figure 6:
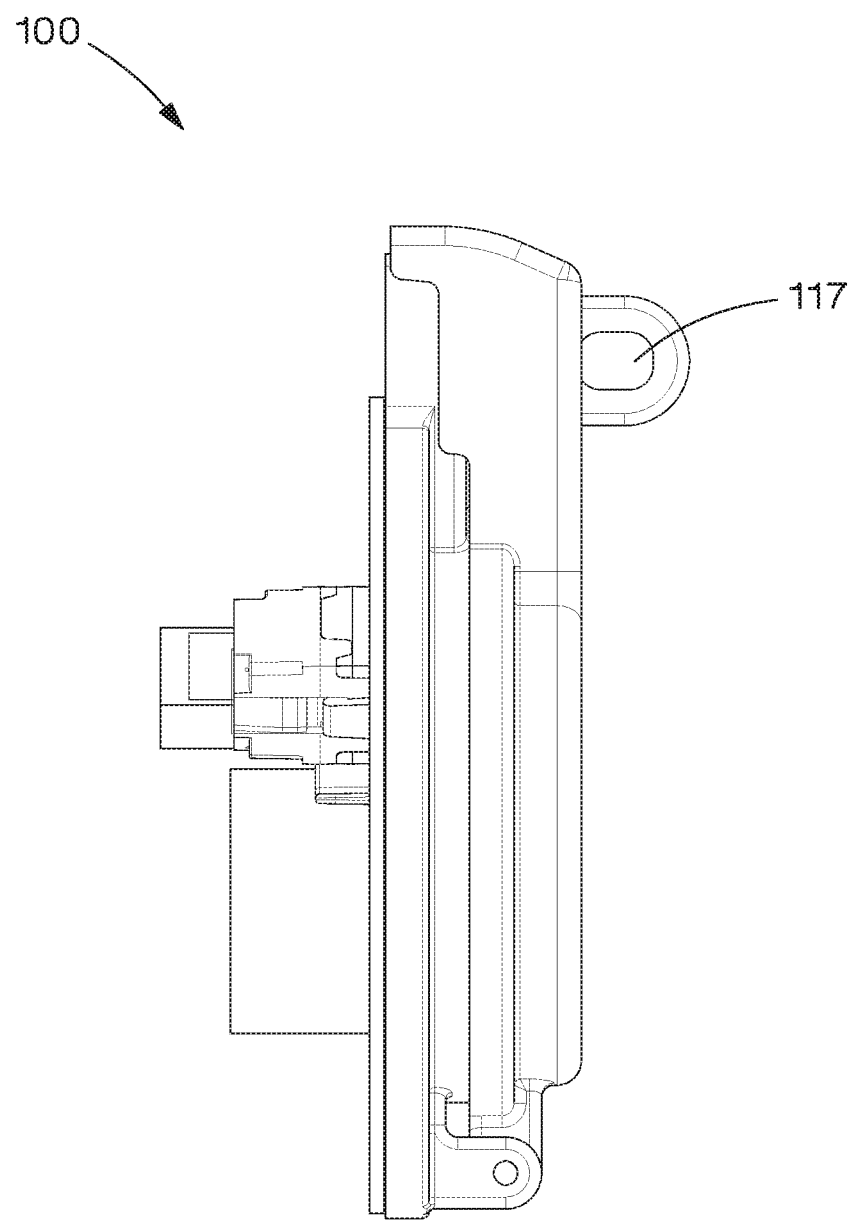
FIG. 6 is a left-side elevation view of the access port shown in FIG. 1, with the cover of the access port being shown in the closed position.
Figure 7:
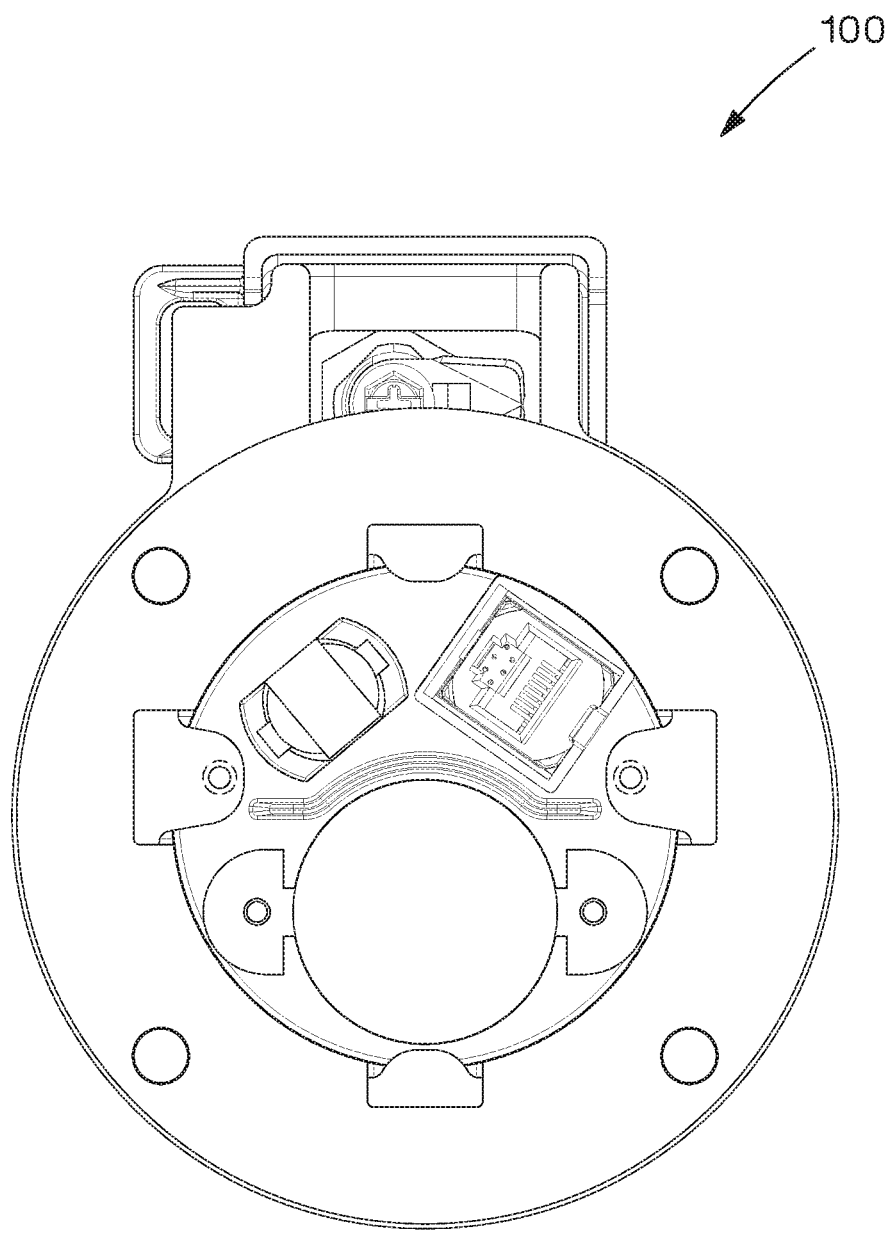
FIG. 7 is a back-elevation view of the access port shown in FIG. 1, with the cover of the access port being shown in the closed position.
Figure 8:
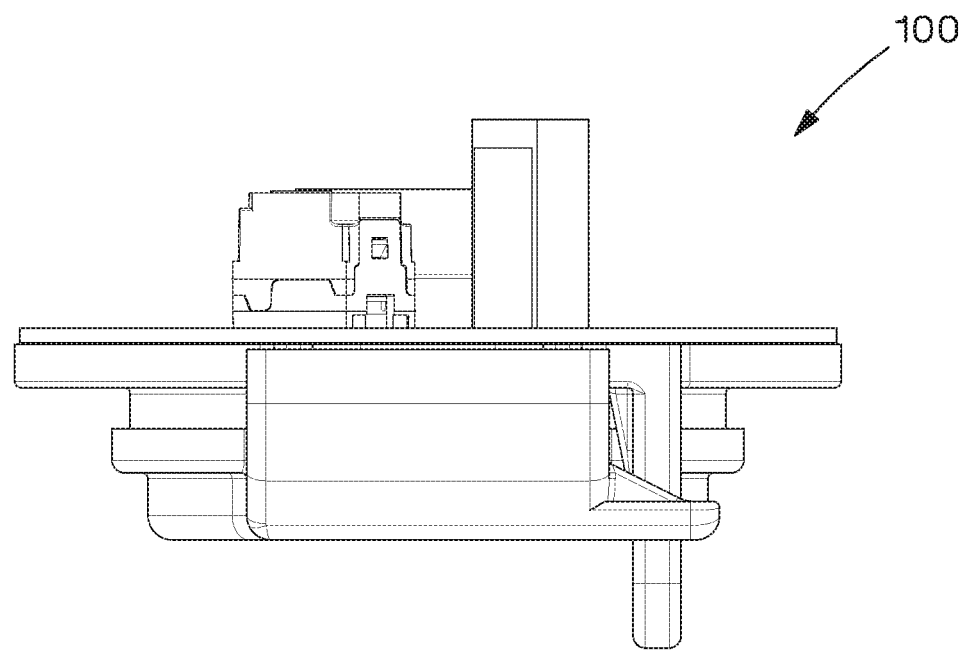
FIG. 8 is a top plan view of the access port shown in FIG. 1, with the cover of the access port being shown in the closed position.
Figure 9:
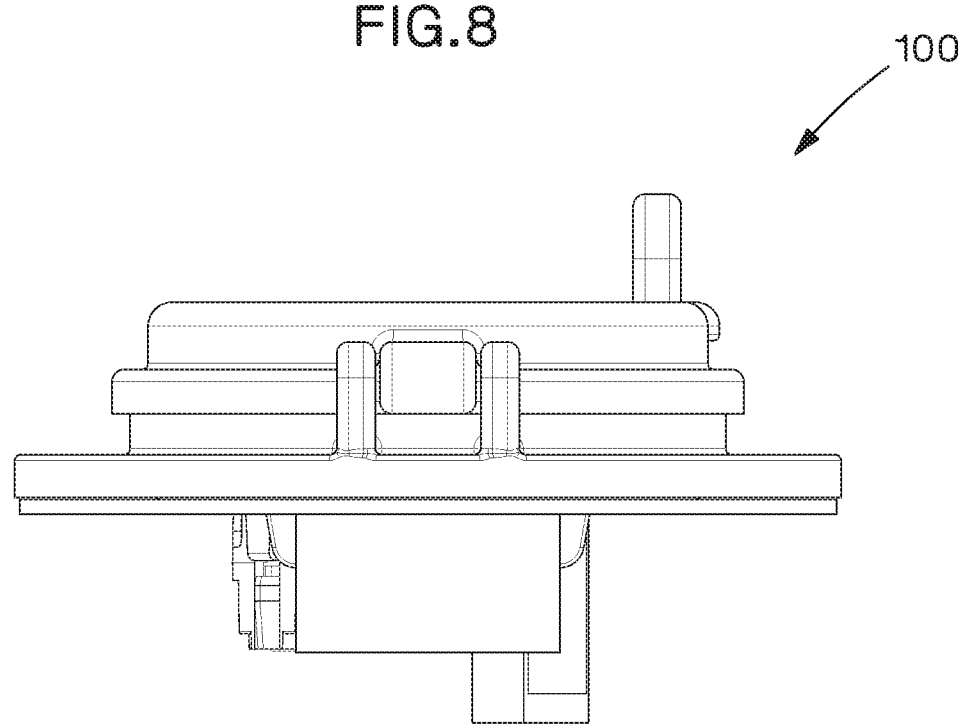
FIG. 9 is a bottom plan view of the access port shown in FIG. 1, with the cover of the access port being shown in the closed position.
Figure 11:
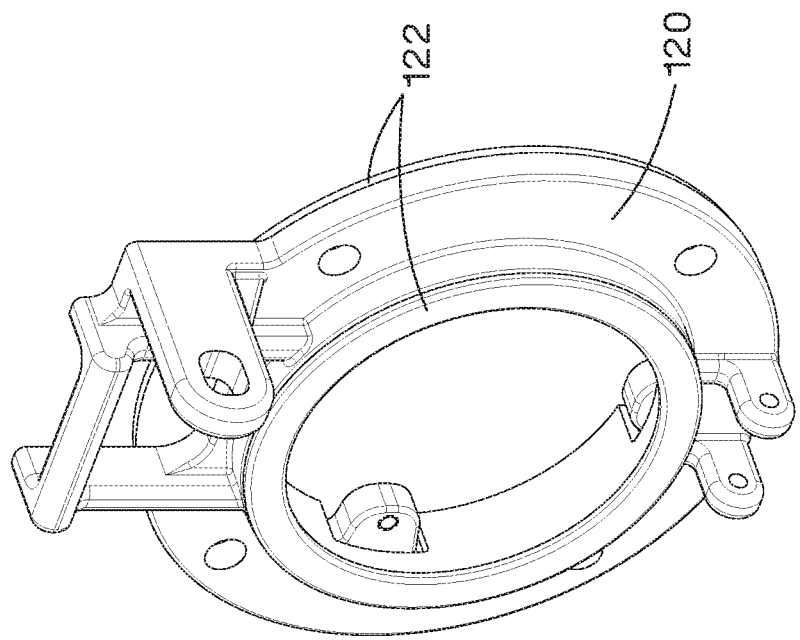
FIG. 11 is another trimetric projection of the base and gasket of the access port shown in FIG. 1.
Figure 10:
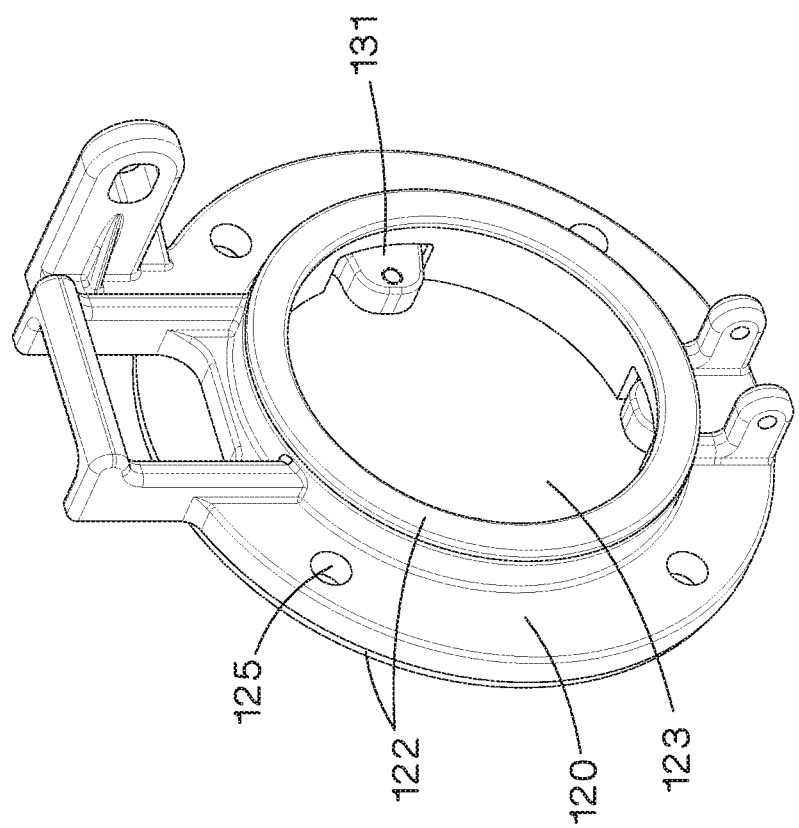
FIG. 10 is a trimetric projection of a base and gasket of the access port shown in FIG. 1.

As shown in FIG. 2, access port 100 may include a base assembly 104 and a cover assembly 105 held together by a hinge pin 106 at hinge point 107. Hinge pin 106 allows cover assembly 105 to rotate about hinge point 107 to an opened position, where cover assembly 105 is swung completely open so as to provide access to components 109*a*-109*c* mounted on a faceplate 108. In a closed position, where cover assembly 105 is swung completely closed against base assembly 104, access is restricted to components 109*a*-109*c* for security purposes as well as protecting components 109*a*-109*c* from the elements. Hinge point 107 may be positioned near the bottom of access port 100 such that cover assembly 105 swings downward with gravity to the open position. This way, a technician need not prop open cover assembly 105 with one hand while trying to interface with components 109a-109c in base assembly 104.

Cover assembly 105 may include a low-profile cover 111 that reduces the risk of accidental contact with other equipment or technicians. Cover 111 may be made of various clear or opaque materials, such as a polycarbonate with ultraviolet (UV) protection. Cover assembly 105 may also include a compression lock 112 which may require a tool to lock and unlock. Compression lock 112 may rotate latch 113 between a locked position, where it engages tab 114 to prevent cover assembly 105 from being swung open, and an unlocked position, where cover assembly 105 is free to rotate about hinge point 107. Cover assembly 105 may further include an eye 115 through which a padlock tab 116 on base assembly 104 may be seated when cover assembly 105 is in the closed position. Padlock tab 116 may include a mounting port 117 to which a padlock 118 may be mounted. Padlock 118 may retain cover assembly 105 in the closed position for added security.

Base assembly 104 may include a faceplate 108 mounted in an interior opening 123 of a base 120. A single-piece captive gasket 122 may be positioned in opening 123 between base 120 and faceplate 108. Faceplate 108 may be mounted to base 120 via screws 121. Components 109a-109c may be mounted to faceplate 108 by various techniques, such as screws 124, or by press-fitting these components onto faceplate 108.

Faceplate 108 may be made of various materials, such as an ABS plastic with UV protection. Faceplate 108 may be configured to accommodate various component configurations such that different faceplates may be swapped out without removing access port 100 from electrical enclosure 101 to provide flexibility in tailoring the connectivity of access port 100 for different applications. As shown in FIG. 2, one example configuration of a faceplate 108 includes mounting holes for a RJ45 coupler (component 109a), an electrical outlet (component 109b), such as a single female port outlet or double female port outlet, and a circuit breaker (component 109c).

Base 120 may be made of various materials, such as cast aluminum, nylon, nylon with glass fill, etc. Mounting points 125 along the perimeter of base 120 are used to mount access port 100 to electrical enclosure 101. Having mounting ports 125 along the perimeter of base 120 (as opposed to being in interior opening 123) allows access port 100 to be mounting to electrical enclosure 101 without any disassembly and reassembly.

Figure 13:
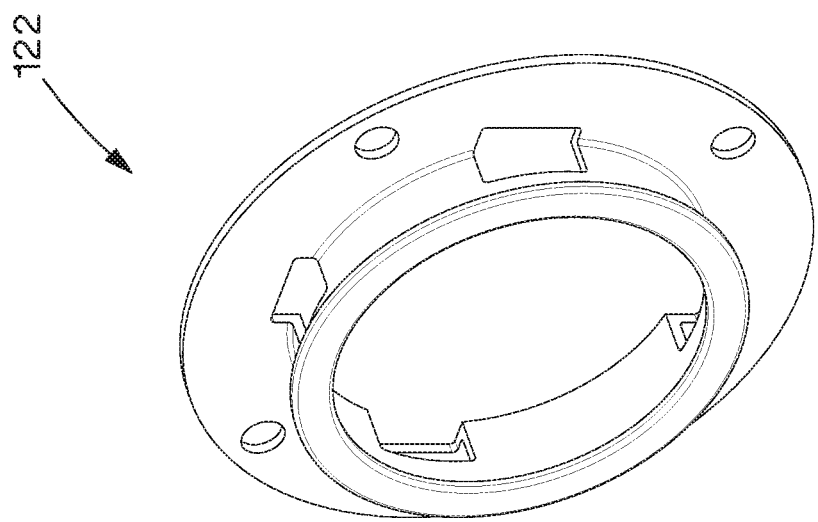
FIG. 13 is another trimetric projection of the gasket of the access port shown in FIG. 1.
Figure 12:
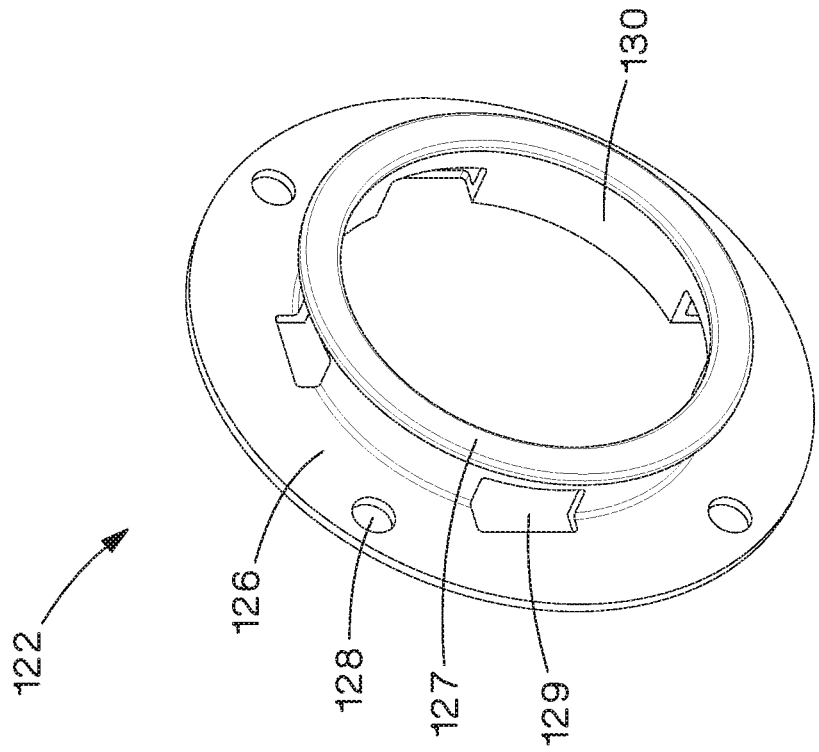
FIG. 12 is a trimetric projection of the gasket of the access port shown in FIG. 1.
Figure 14:
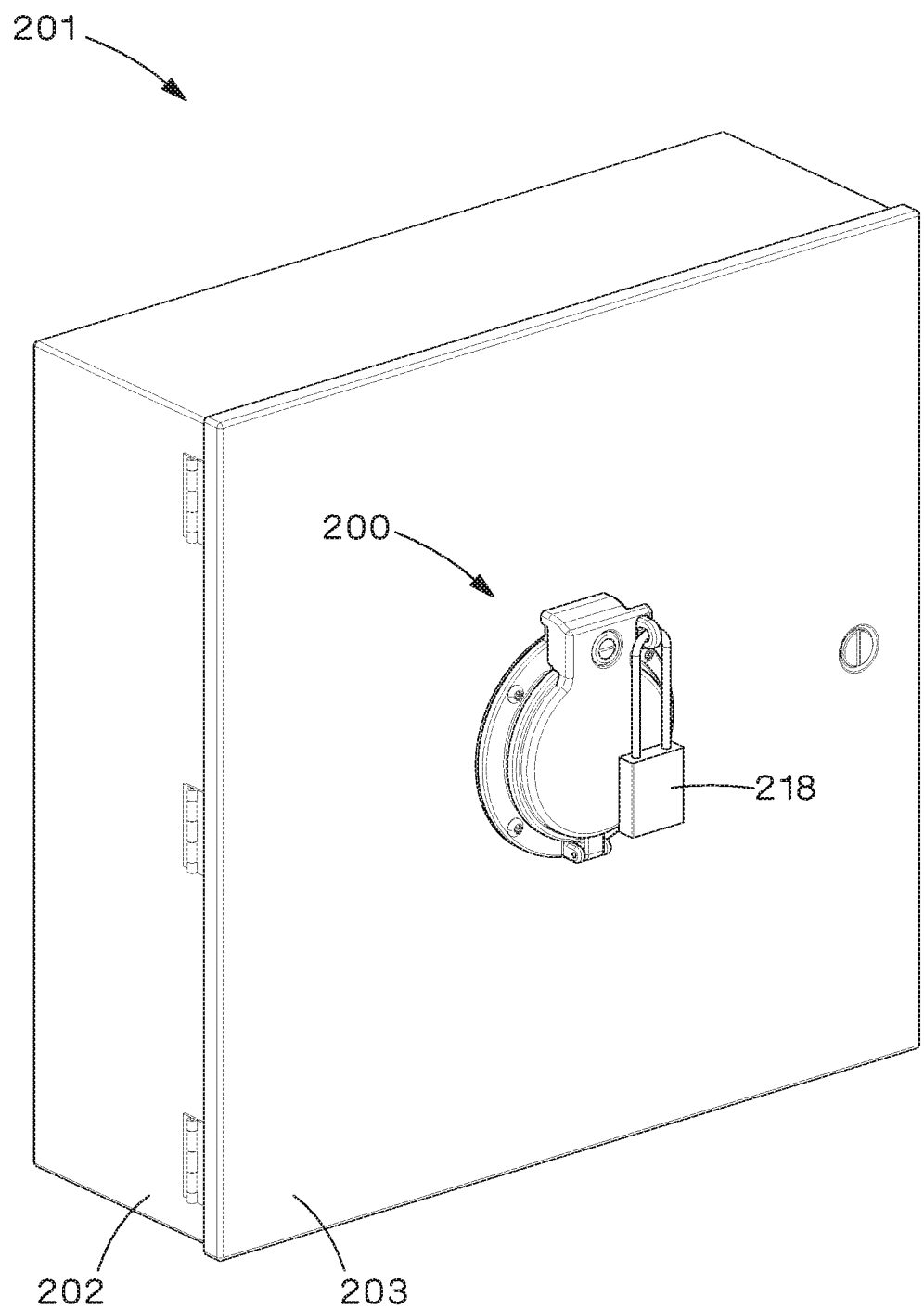
FIG. 14 is a trimetric projection of another example implementation of an access port mounted to an electrical enclosure, a cover of the access port being shown in a closed position.
Figure 15:
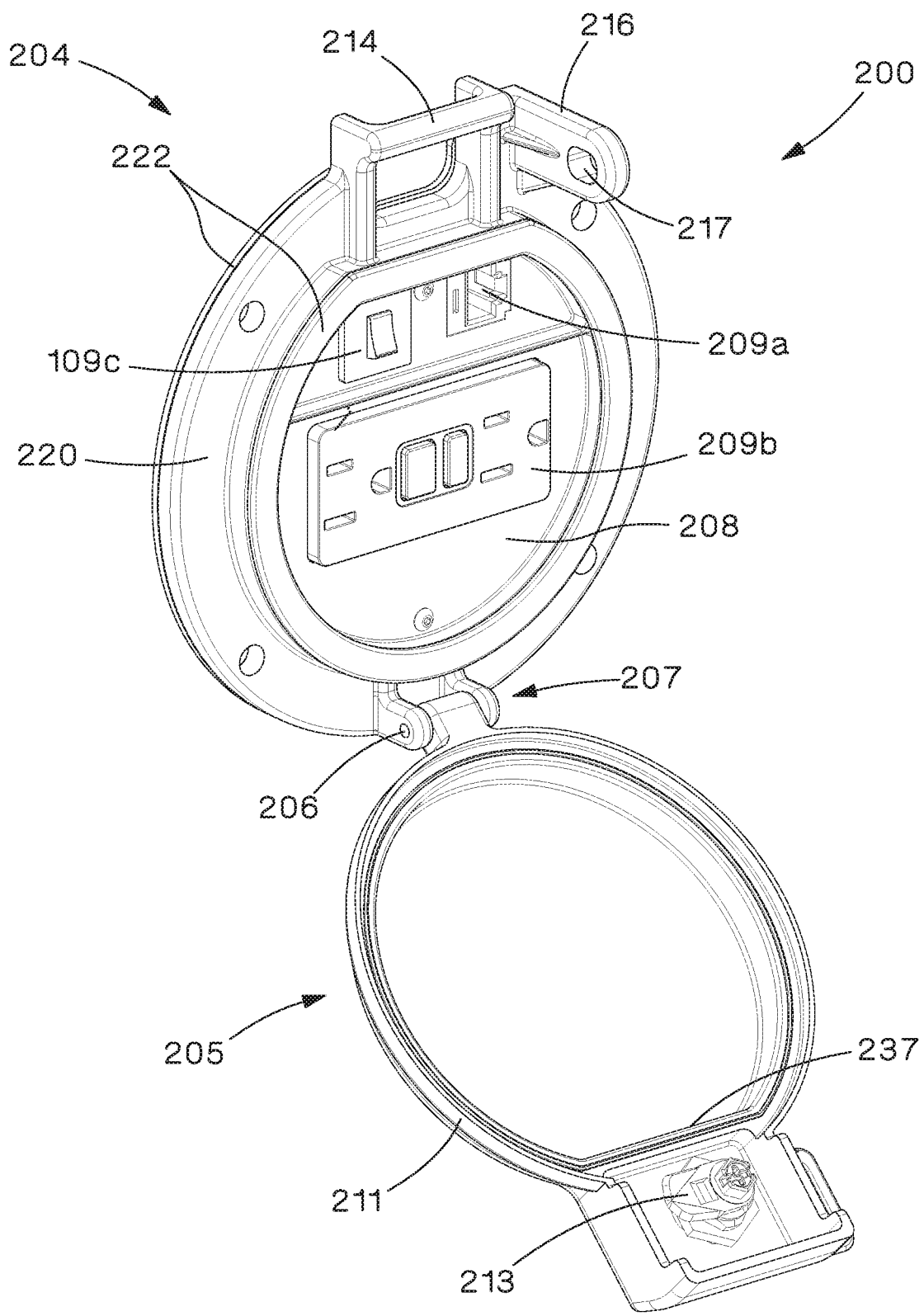
FIG. 15 is a trimetric projection of the access port shown in FIG. 14, with the cover of the access port being shown in an open position.
Figure 16:
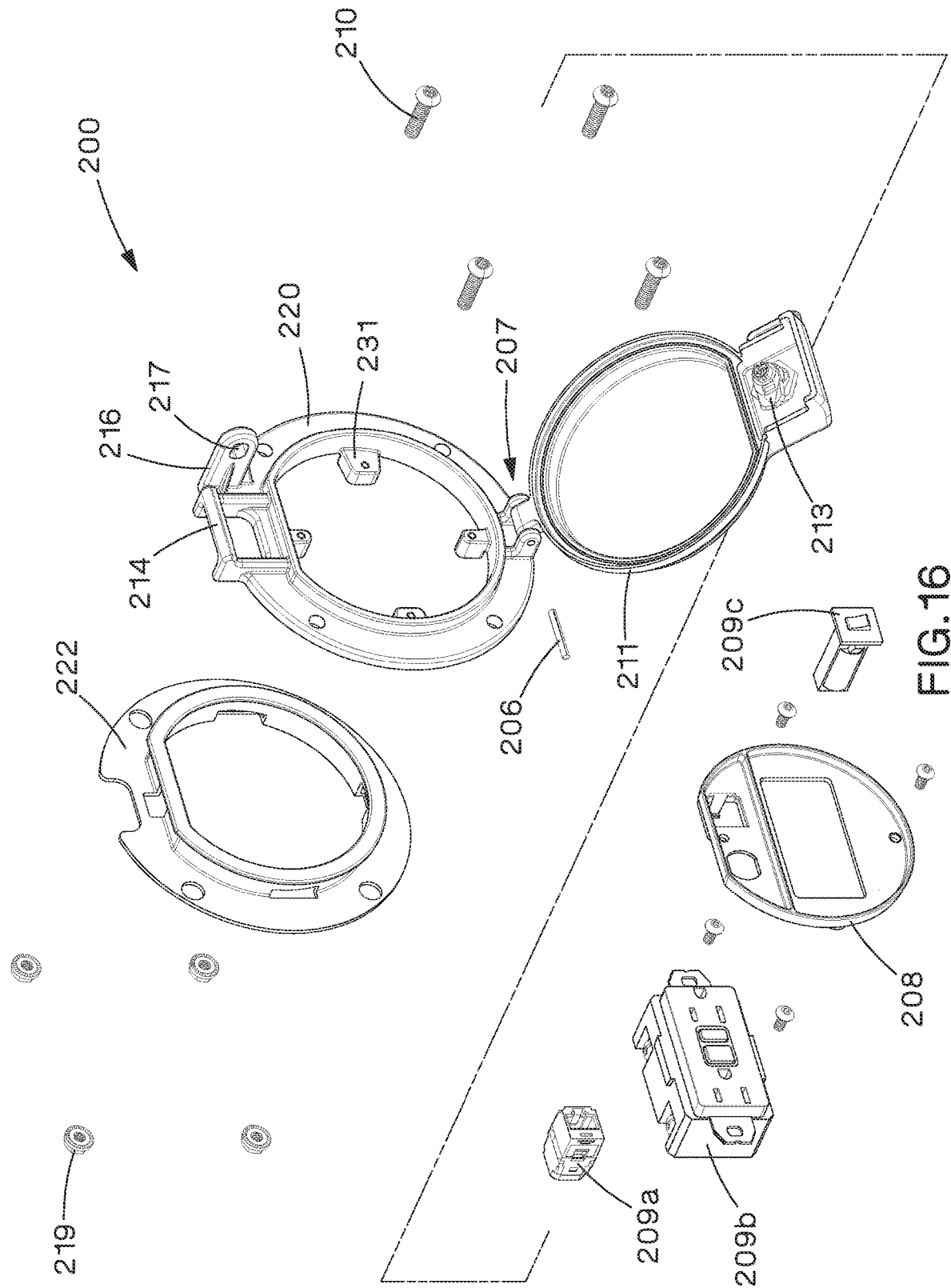
FIG. 16 is an exploded trimetric projection of the access port shown in FIG. 14, with the cover of the access port being shown in the open position.
Figure 17:
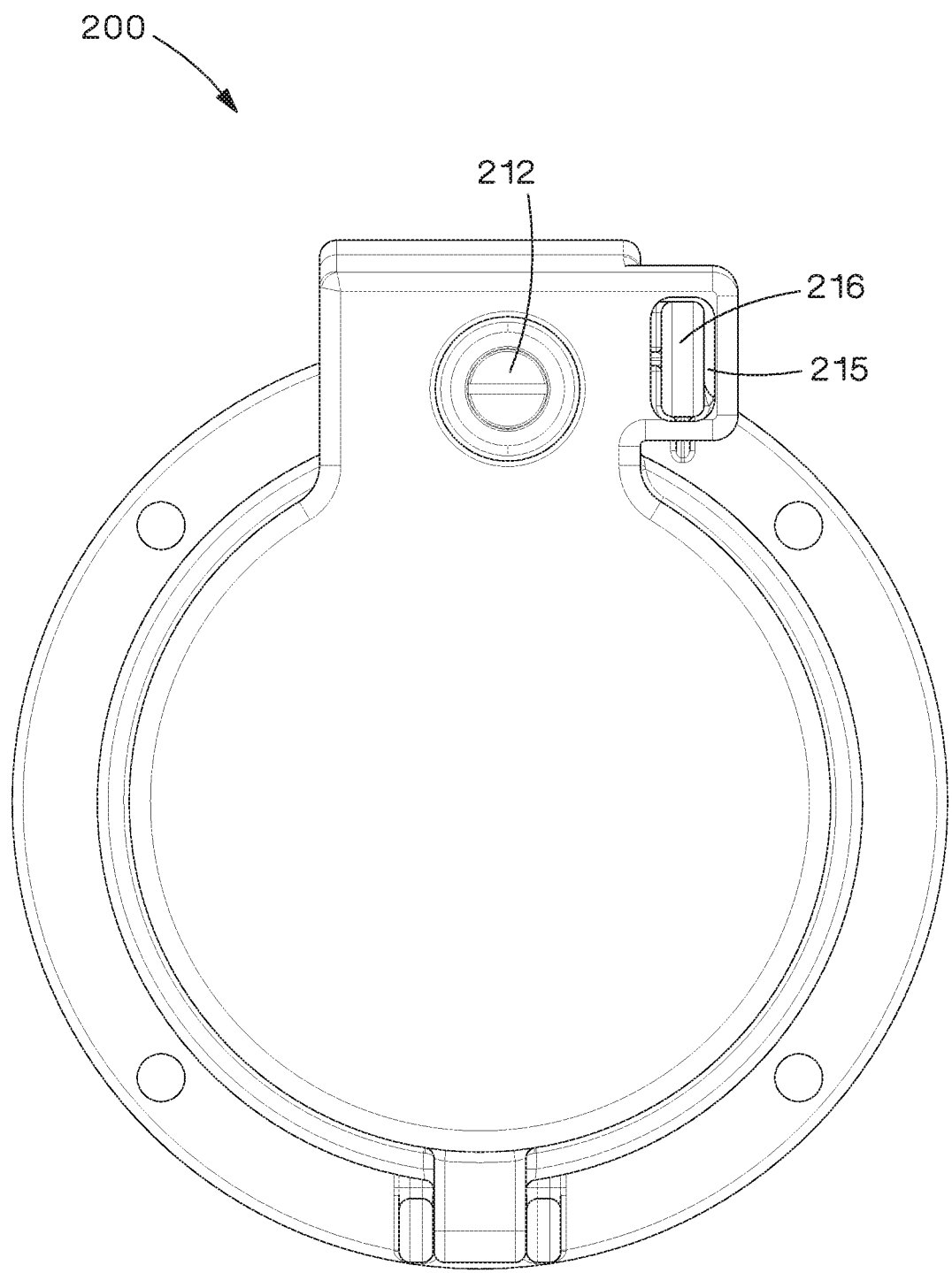
FIG. 17 is a front elevation view of the access port shown in FIG. 14, with the cover of the access port being shown in the closed position.
Figure 18:
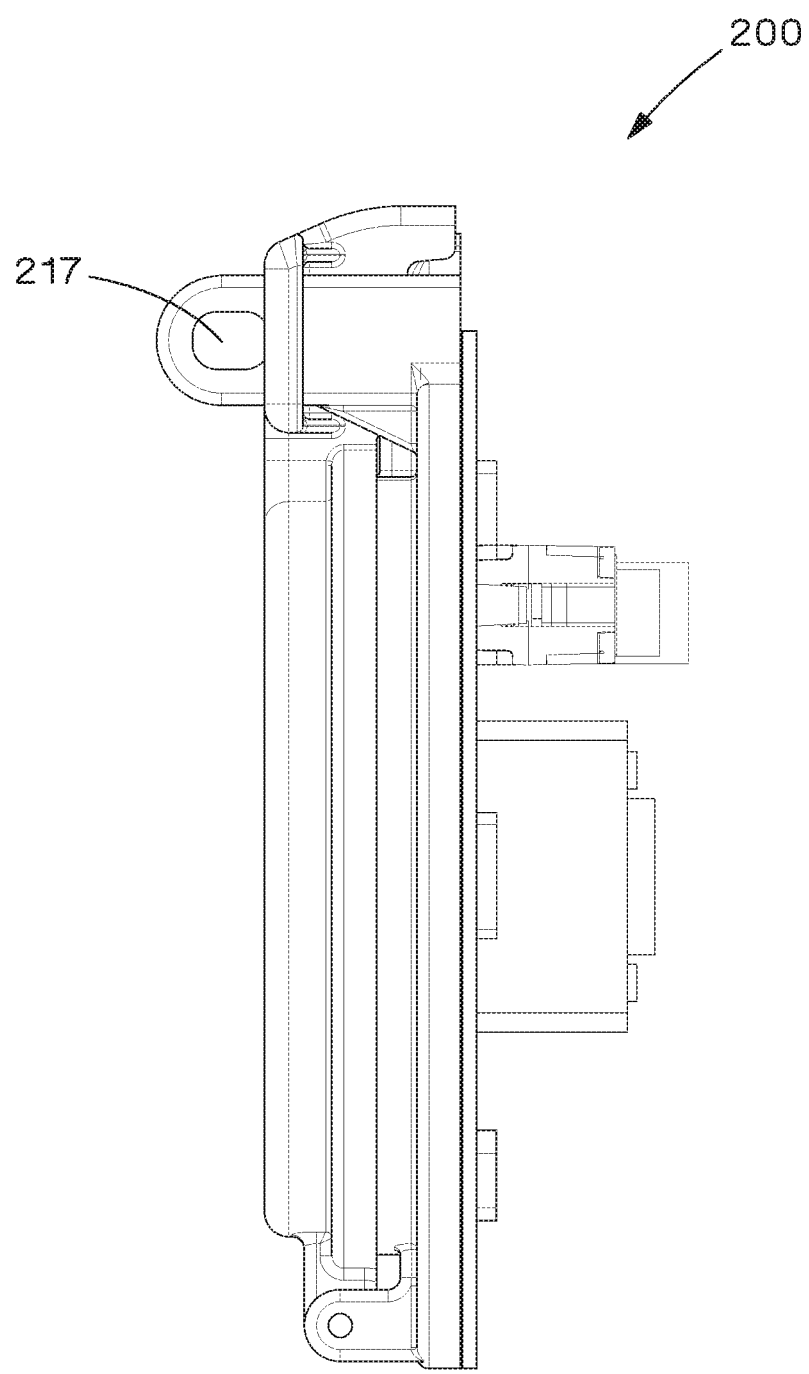
FIG. 18 is a right-side elevation view of the access port shown in FIG. 14, with the cover of the access port being shown in the closed position.
Figure 19:
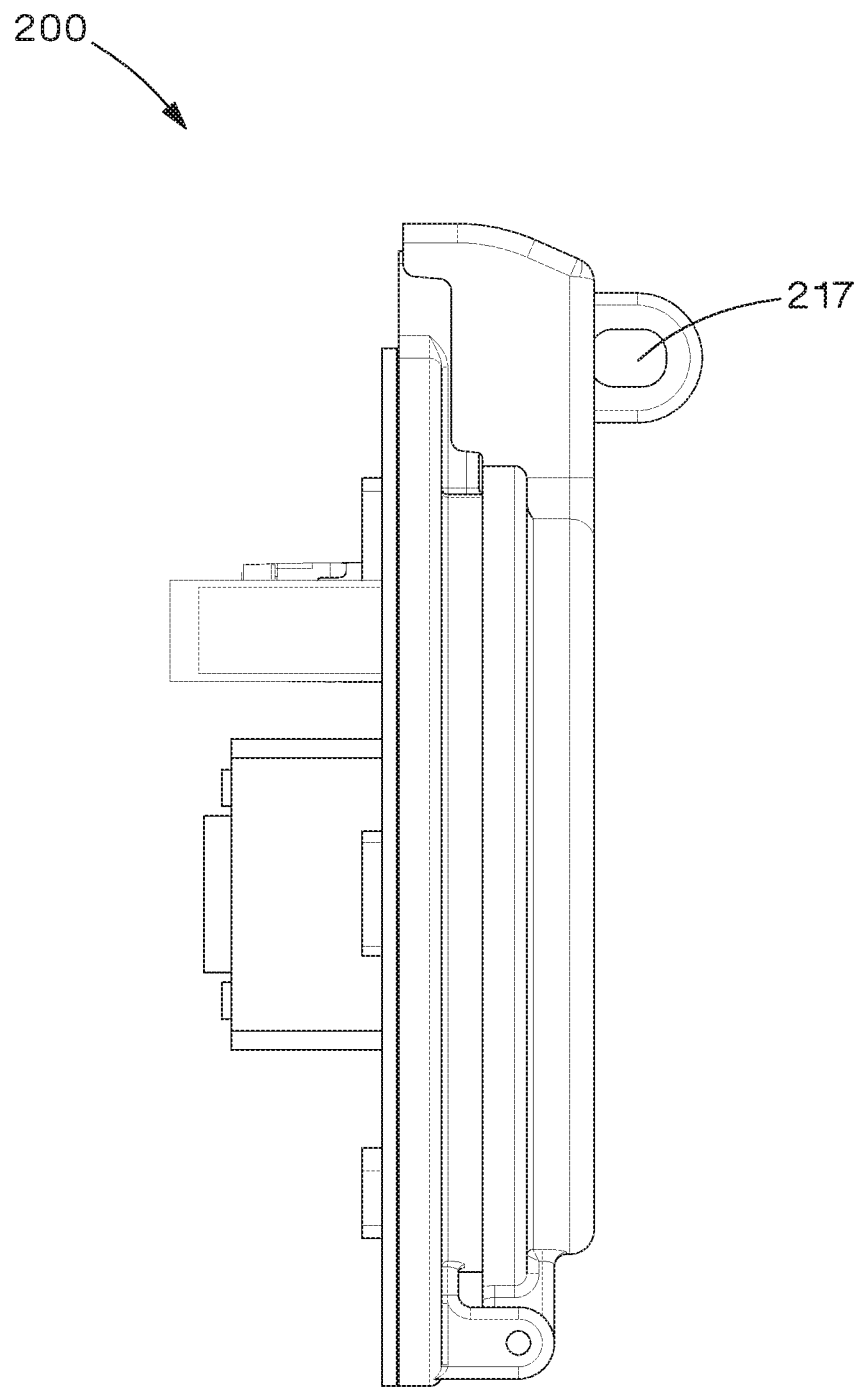
FIG. 19 is a left-side elevation view of the access port shown in FIG. 14, with the cover of the access port being shown in the closed position.
Figure 20:
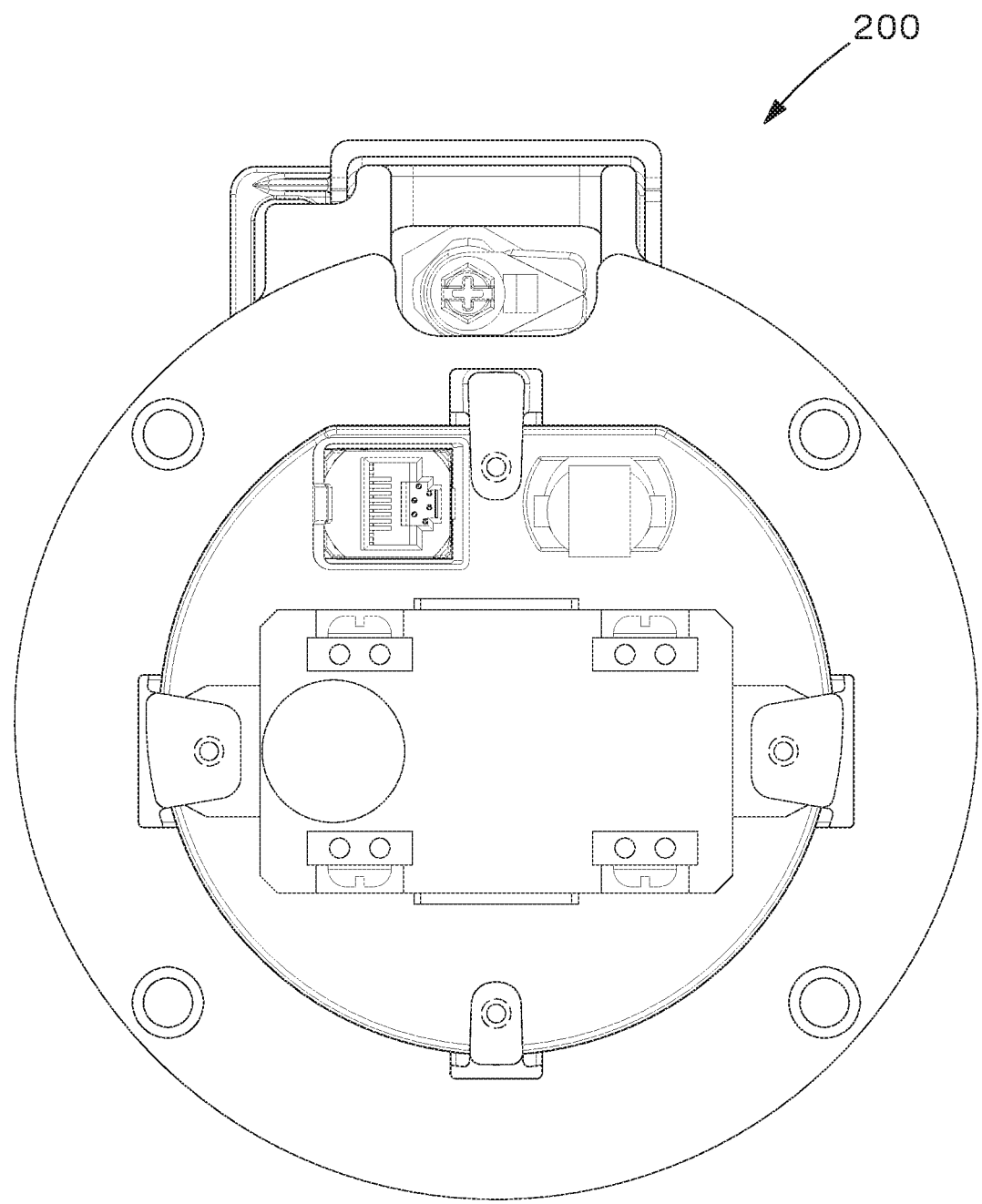
FIG. 20 is a back-elevation view of the access port shown in FIG. 14, with the cover of the access port being shown in the closed position.
Figure 21:
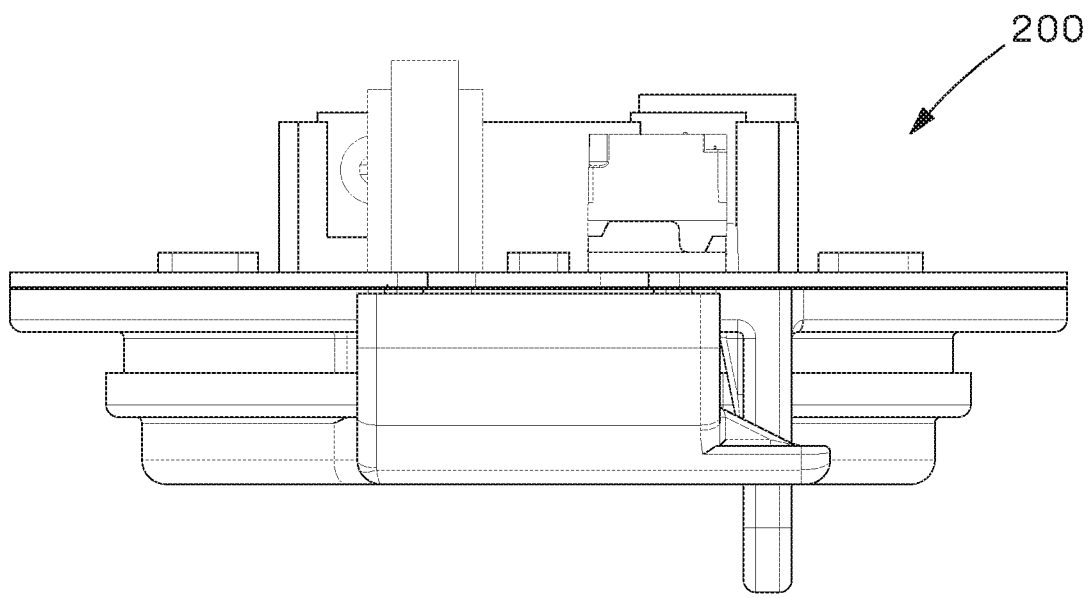
FIG. 21 is a top plan view of the access port shown in FIG. 14, with the cover of the access port being shown in the closed position.
Figure 22:
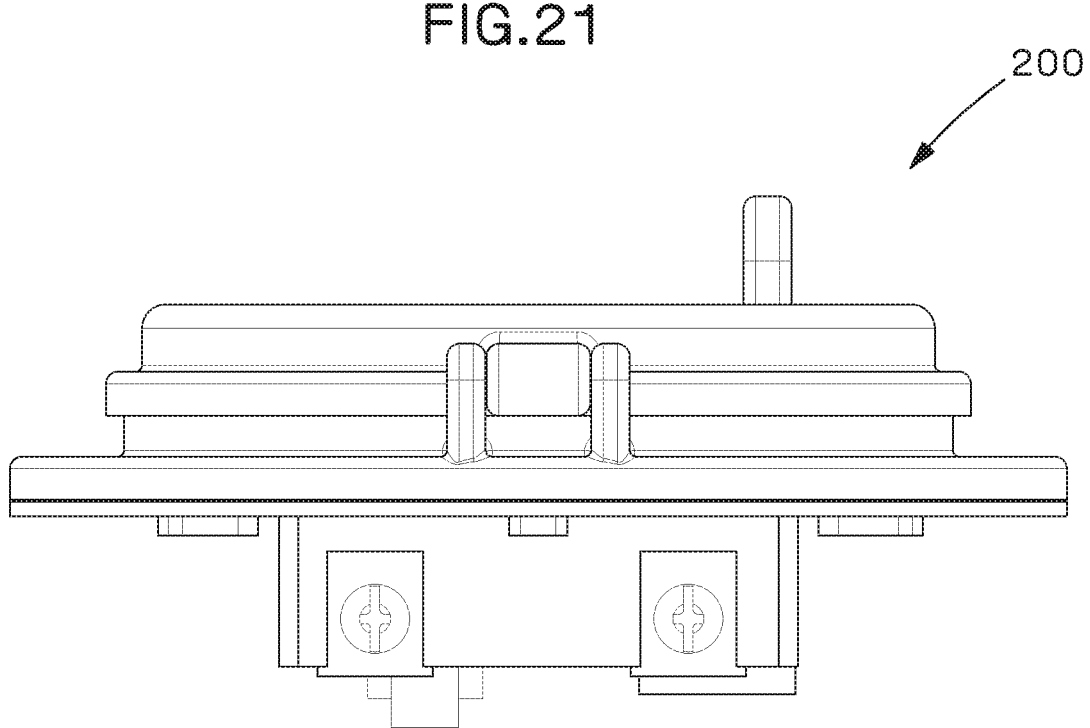
FIG. 22 is a bottom plan view of the access port shown in FIG. 14, with the cover of the access port being shown in the closed position.
Figure 24:
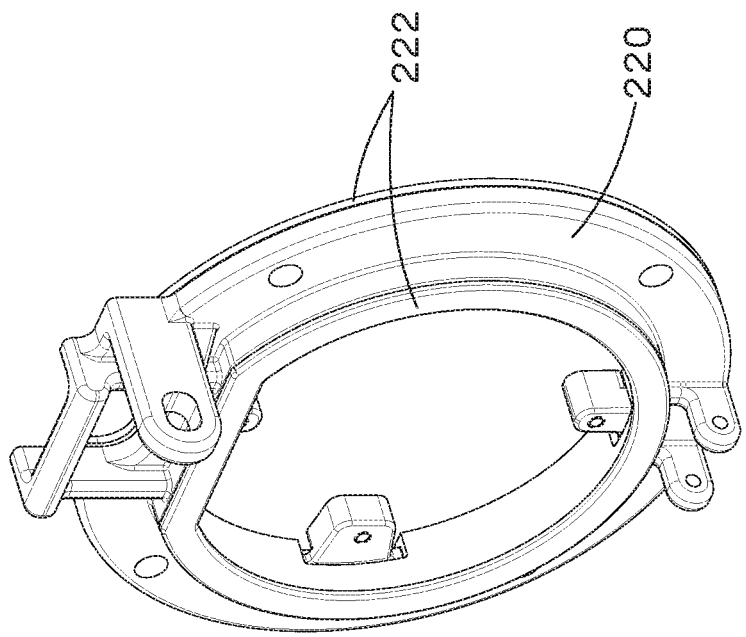
FIG. 24 is another trimetric projection of the base and gasket of the access port shown in FIG. 14.
Figure 23:
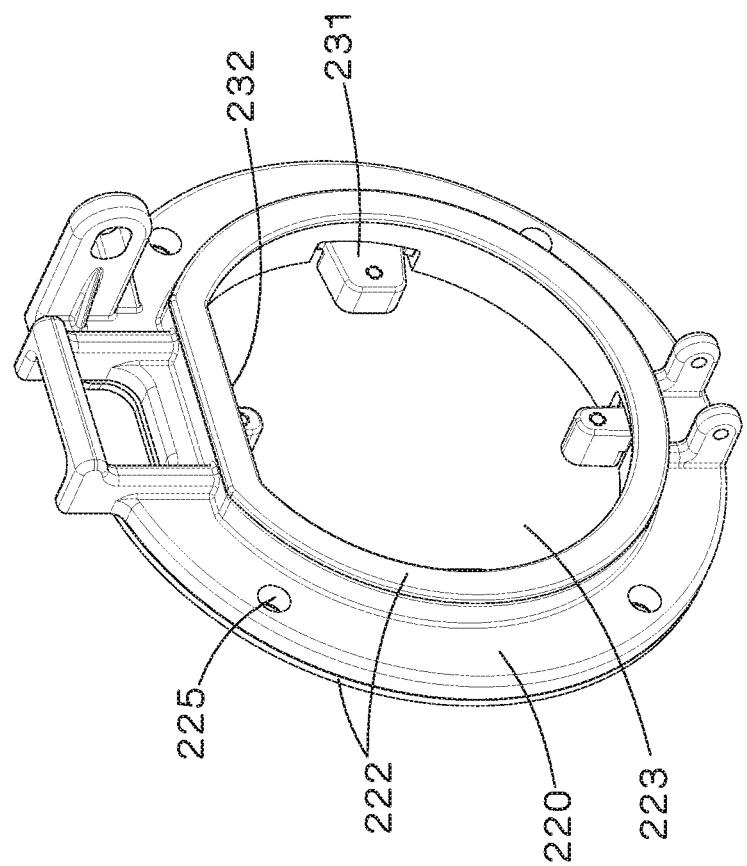
FIG. 23 is a trimetric projection of a base and gasket of the access port shown in FIG. 14.
Figure 26:
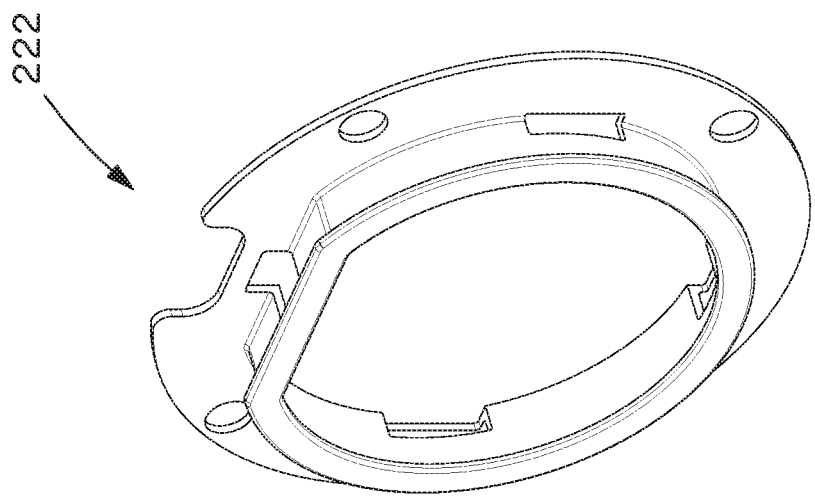
FIG. 26 is another trimetric projection of the gasket of the access port shown in FIG. 14.
Figure 25:
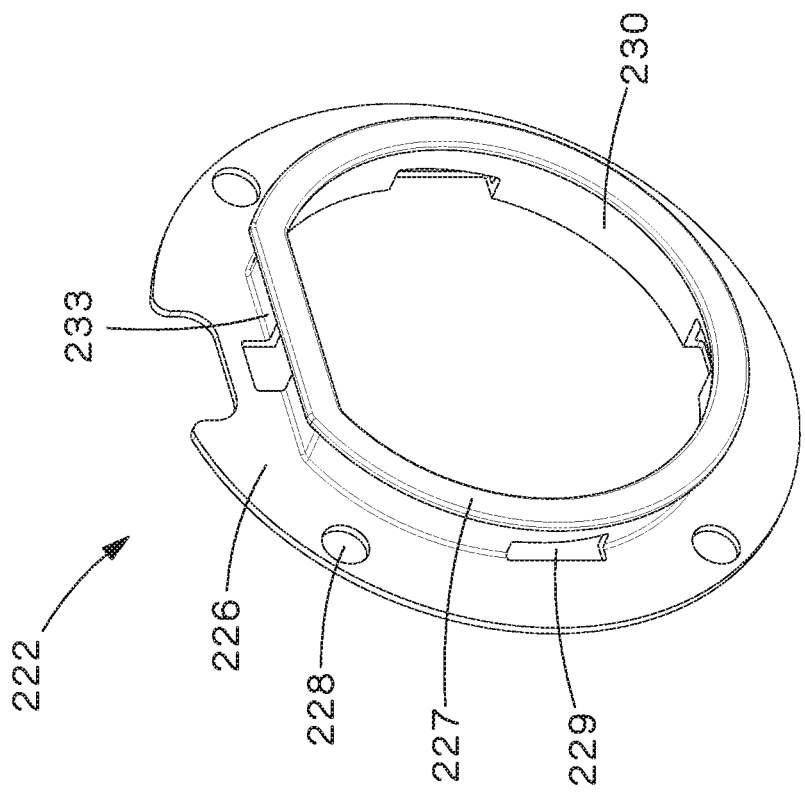
FIG. 25 is a trimetric projection of the gasket of the access port shown in FIG. 14.
Figure 27:
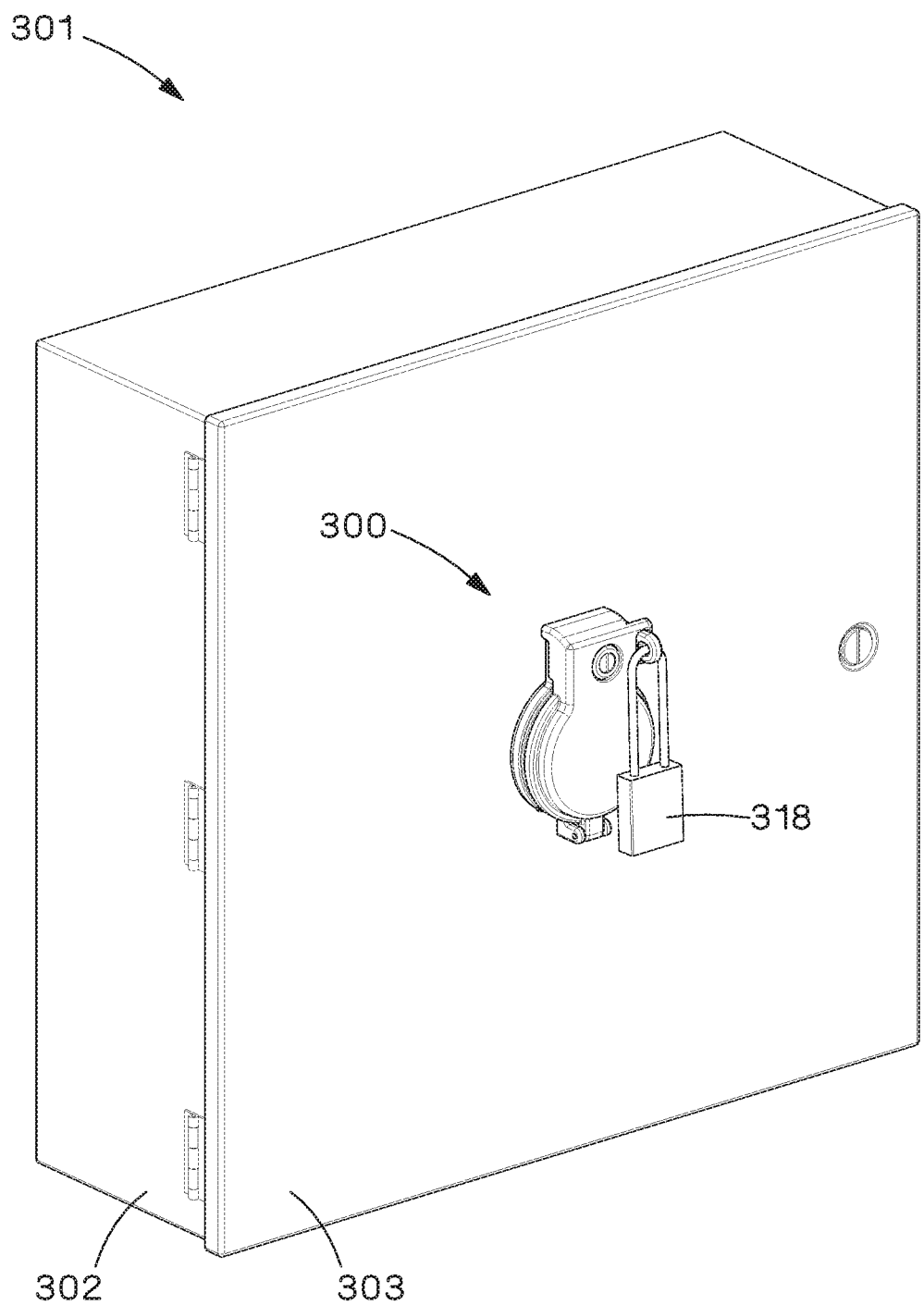
FIG. 27 is a trimetric projection of another example implementation of an access port mounted to an electrical enclosure, both a cover of the access port and a door of the enclosure being shown in a closed position.
Figure 28:
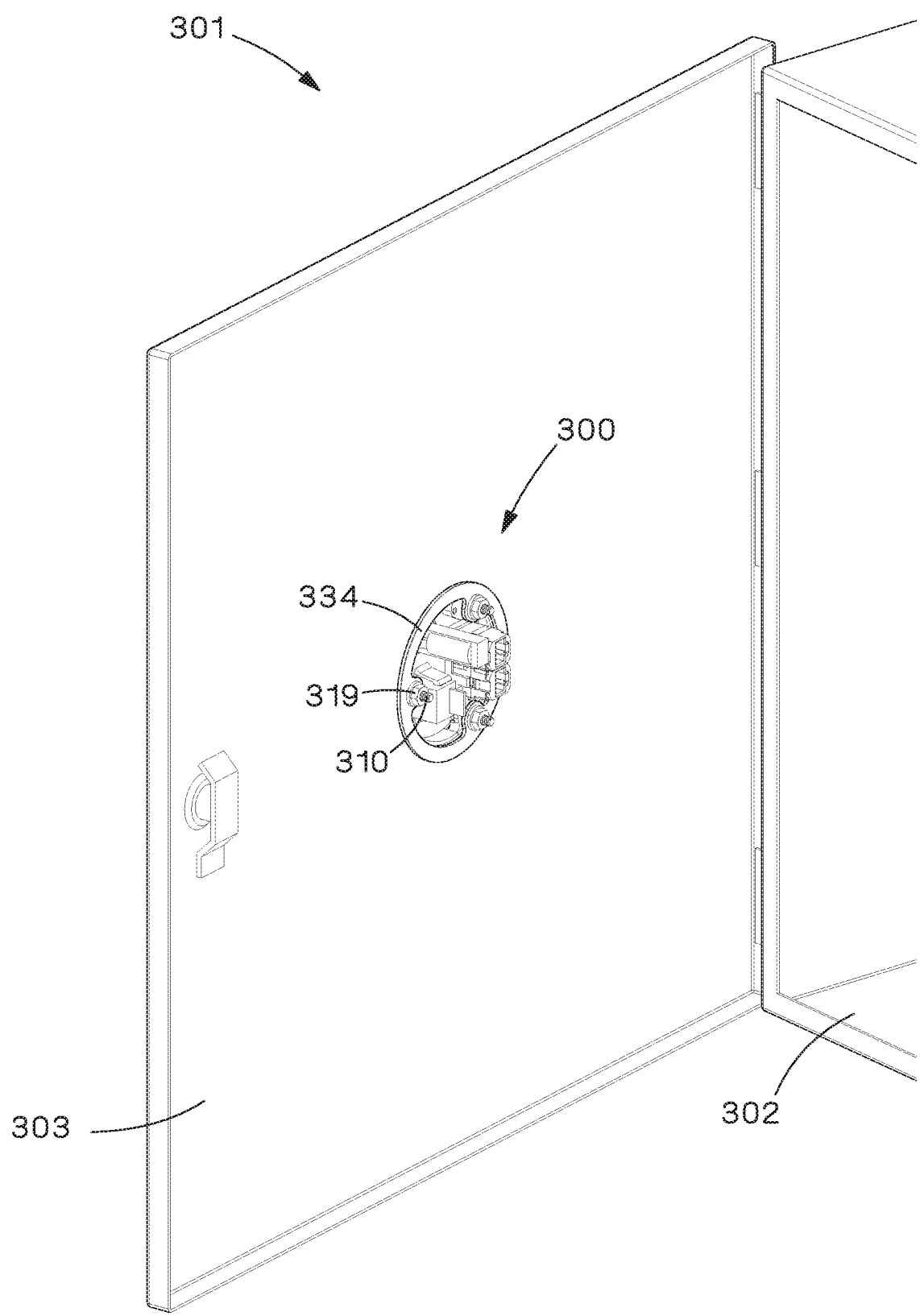
FIG. 28 is a trimetric projection of the access port of FIG. 27, with the door of the enclosure being shown in an open position.

Captive gasket 122 may be formed of a rubber. Captive gasket 122 may be captive in that it is held in place in interior opening 123 by tension. As shown in FIGS. 12 and 13, captive gasket 122 may be a one-piece gasket having a front compression surface 127, a rear compression surface 126, and an interior circumferential surface 130.

Front compression surface 127 may be positioned between the front surface of base 120 and cover 111 to provide a seal between base 120 and cover 111 when cover 111 is in the closed position. The seal provided by front compression surface 127 prevents ingress of environmental particulates between base 120 and cover 111.

Rear compression surface 126 may be positioned between the rear surface of base 120 and door 103 of electrical enclosure 101 to provide a seal between base 120 and door 103. The seal provided by rear compression surface 126 prevents ingress of environmental particulates between base 120 and door 103.

Interior circumferential surface 130 may be positioned between an interior circumferential surface of base 120 and faceplate 108 to provide a seal between base 120 and faceplate 108. The seal provided by interior circumferential surface 130 prevents ingress of environmental particulates between base 120 and faceplate 108 when cover 111 is in the open position.

Captive gasket 122 may include holes 128 through which screws 110 may pass. Captive gasket 122 may also include holes 129 through which alignment tabs 131 may be positioned.

FIGS. 14-26 illustrate an example access port 200. Access port 200 may be similar in design and operation as access port 100 of FIGS. 1-13. Thus, similar features are numbered similarly and will not be described in reference to FIGS. 14-26. As shown in FIGS. 14-26, access port 200 may be a round access port similar to access port 100 of FIGS. 1-13, except that an upper portion of interior opening 223 in base 220 may be flattened. As a result, the upper portions of captive gasket 222 and cover 211 may also be flattened. As shown in FIGS. 23-26, base 220 may include a flat portion 232, cover 211 may include a flat portion 237, and captive gasket 222 may include a flat portion 233.

FIGS. 27-40 illustrate a further example access port 300. As shown in FIGS. 27-40, access port 300 may be mounted on a door 303 of an enclosure 301 via screws 310 and nuts 319 or other types of fasteners, as well as a lock ring 334. Screws 310 may protrude through holes 325 in alignment tabs 331 and holes 335 in lock ring 334. Screws 310 may engage nuts 319 and may be tightened to compress lock ring 334 and base assembly 304 against door 303 to hold access port 300 in place. In some implementations, access port 300 may be mounted on other areas of enclosure 301, such as body 302.

As shown in FIGS. 27-40, access port 300 may be a round access port. The round shape of access port 300 minimizes mounting space and provides for easy installation of access port 300. An installer only needs to make one cut in enclosure 301 to provide access to the back of access panel 300 in enclosure 301. Previous access ports required making multiple difficult cuts (e.g., a starter hole first and then the remainder of the area cut using a straight blade) for a square or rectangular shaped access panel. Moreover, in the example shown in FIGS. 27-40, the installer need not make additional cuts (i.e., clearance holes) for screws 310 because screws 310 are within interior opening 323, which further minimizes install times and the overall footprint of access port 300.

As shown in FIGS. 29-40, access port 300 may include a base assembly 304 and a cover assembly 305 held together by a hinge pin 306 at hinge point 307. Hinge pin 306 allows cover assembly 305 to rotate about hinge point 307 to an opened position, where cover assembly 305 is swung completely open so as to provide access to components 309a-309c mounted on a faceplate 308. In a closed position, where cover assembly 305 is swung completely closed against base assembly 304, access is restricted to components 309a-309c for security purposes as well as protecting them from the elements. Hinge point 307 may be positioned near the bottom of access port 300 such that cover assembly 305 swings downward with gravity to the open position. This way, a technician need not prop open cover assembly 305 with one hand while trying to interface with components 309a-309c in base assembly 304.

Cover assembly 305 may include a low-profile cover 311 that reduces the risk of accidental contact with other equipment or technicians. Cover 311 may be made of various clear or opaque materials, such as a polycarbonate with ultraviolet (UV) protection.

Cover assembly 305 may also include a compression lock 312 which may require a tool to lock and unlock. Compression lock 312 may rotate latch 313 between a locked position, where it engages tab 314 to prevent cover assembly 305 from being swung open, and an unlocked position, where cover assembly 305 is free to rotate about hinge point 307.

Cover assembly 305 may further include an eye 315 through which a padlock tab 316 on base assembly 304 may be seated when cover assembly 305 is in the closed position. Padlock tab 316 may include a mounting port 317 to which a padlock 318 may be mounted. Padlock 318 may retain cover assembly 305 in the closed and locked position for added security.

Base assembly 304 may include a faceplate 308 mounted to a base 320 in an interior opening 323 of base 320 via screws 321. Base 320 may be made of various materials, such as cast aluminum, nylon, nylon with glass fill, etc.

Faceplate 308 may hide screws 310 securing access port 300 to enclosure 301. A single-piece captive gasket 322 may be positioned in opening 323 between base 320 and faceplate 308. Components 309a-309c may be mounted to faceplate 308 by various techniques, such as screws or by press-fitting these components onto faceplate 308.

Figure 29:
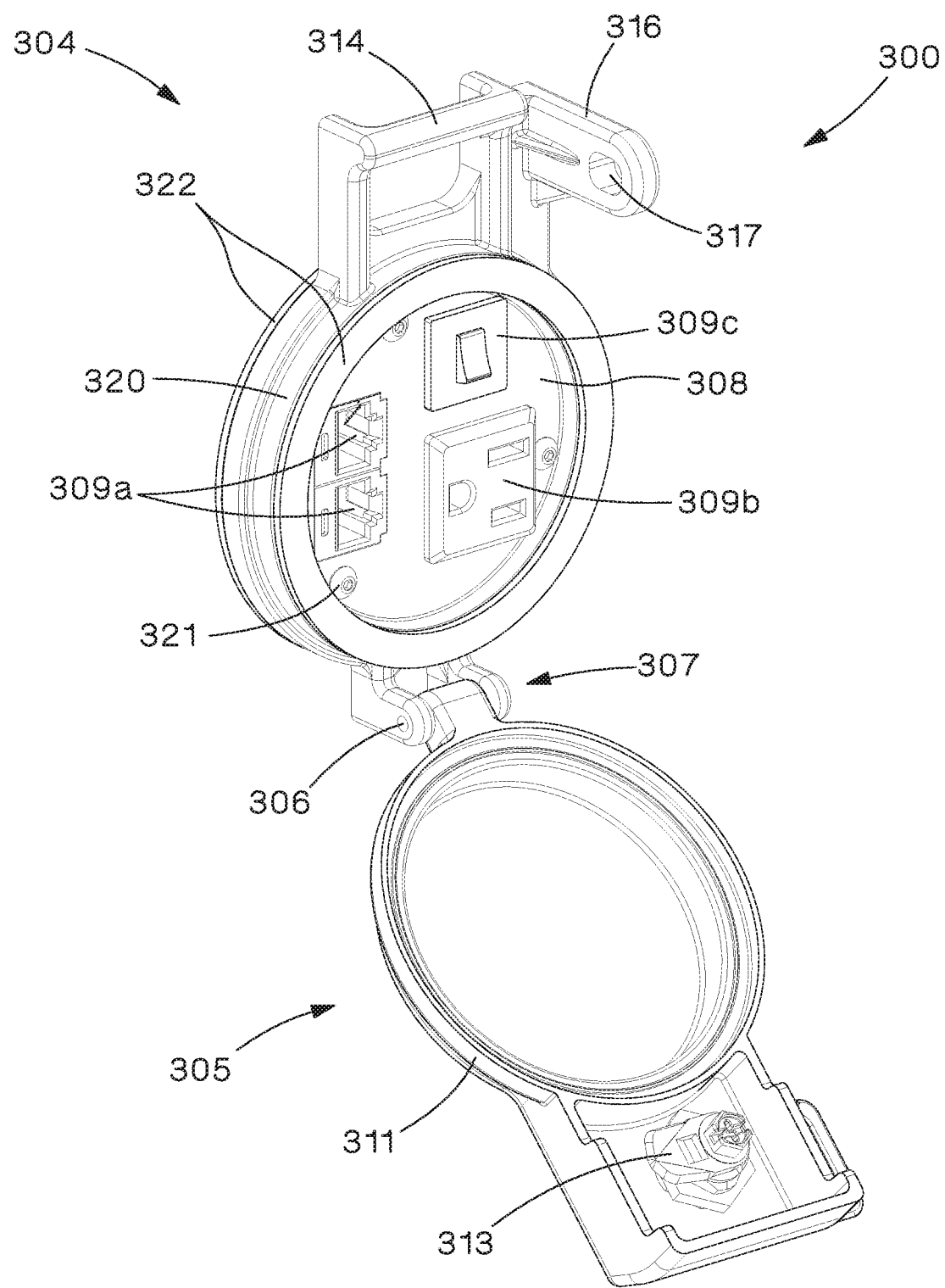
FIG. 29 is a trimetric projection of the access port shown in FIG. 27, with the cover of the access port being shown in an open position.
Figure 30:
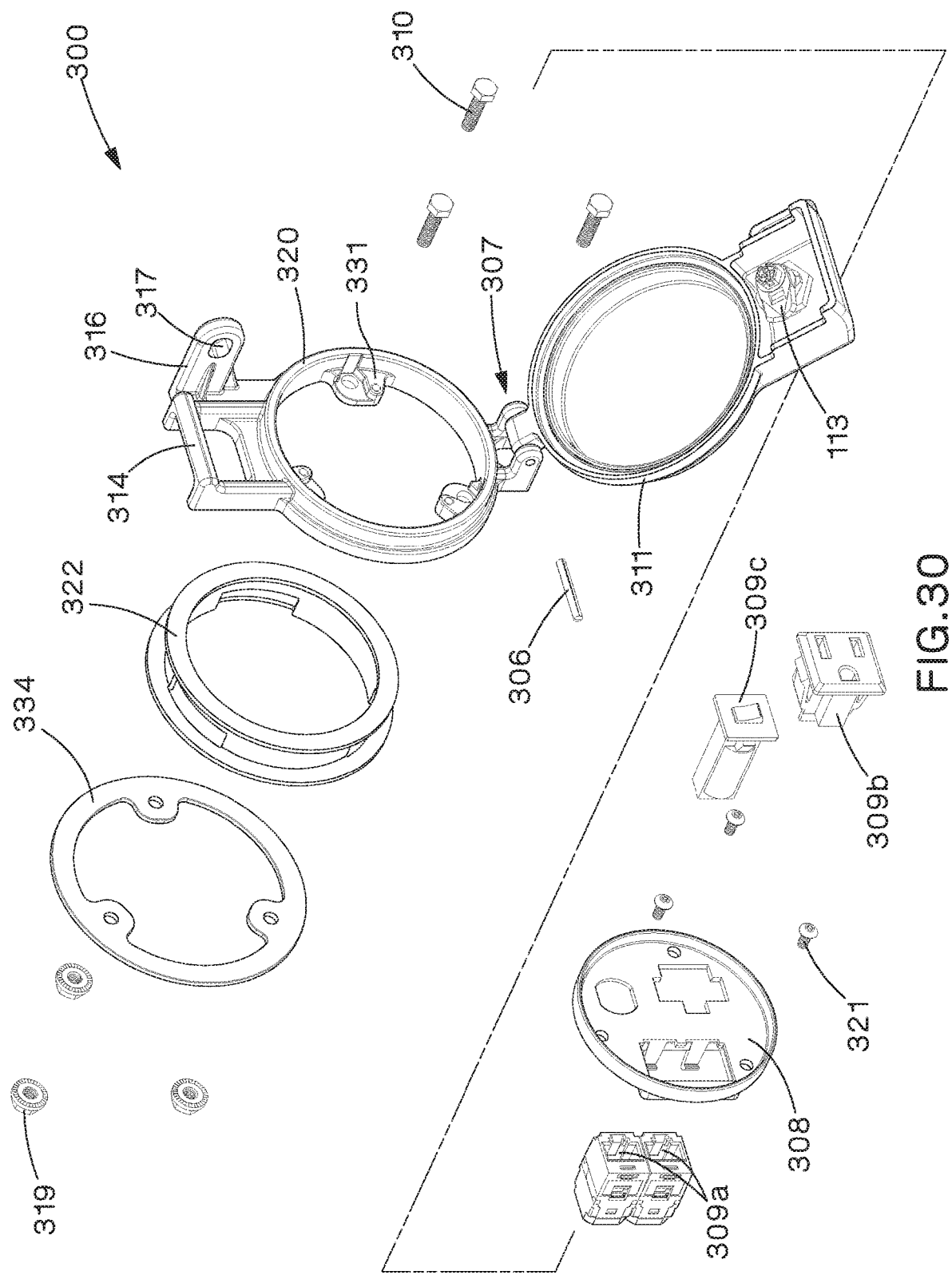
FIG. 30 is an exploded trimetric projection of the access port shown in FIG. 27, with the cover of the access port being shown in the open position.
Figure 31:
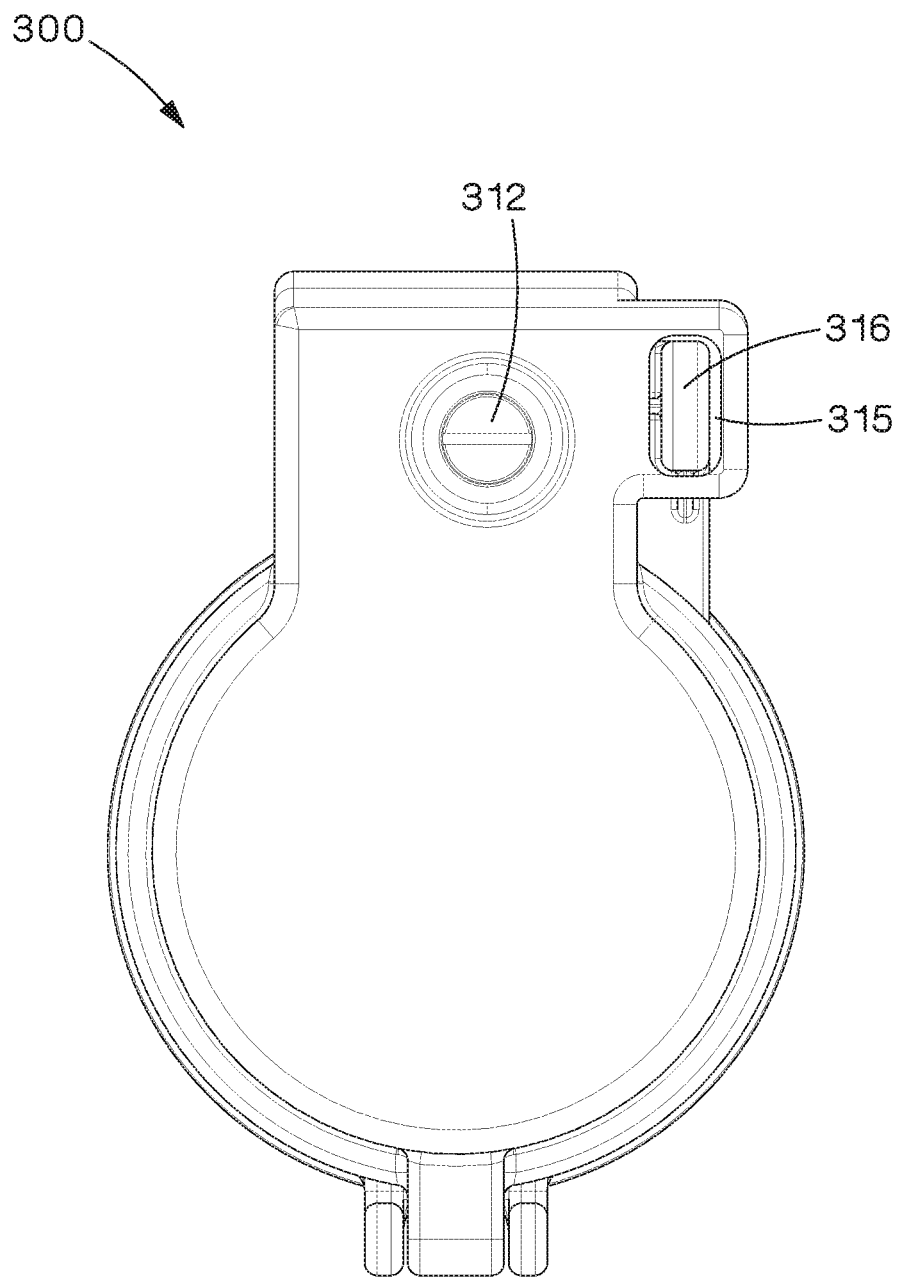
FIG. 31 is a front elevation view of the access port shown in FIG. 27, with the cover of the access port being shown in the closed position.
Figure 32:
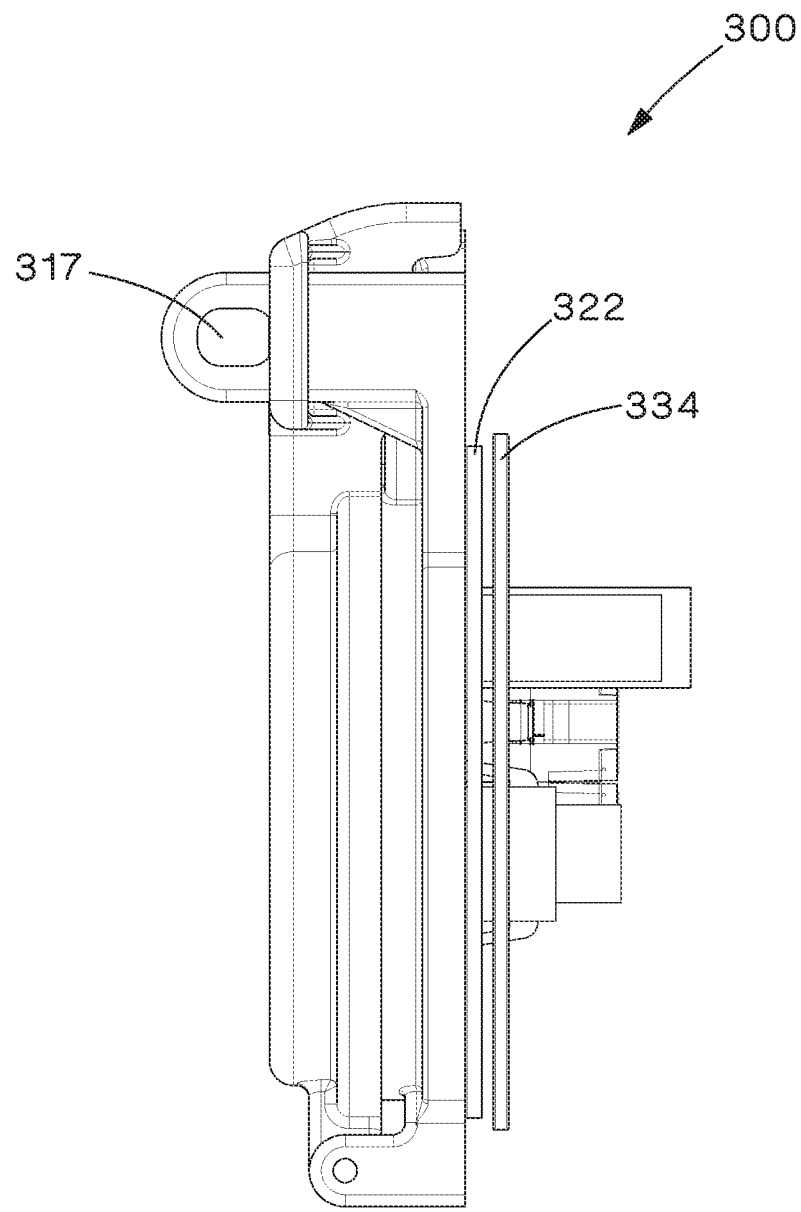
FIG. 32 is a right-side elevation view of the access port shown in FIG. 27, with the cover of the access port being shown in the closed position.
Figure 33:
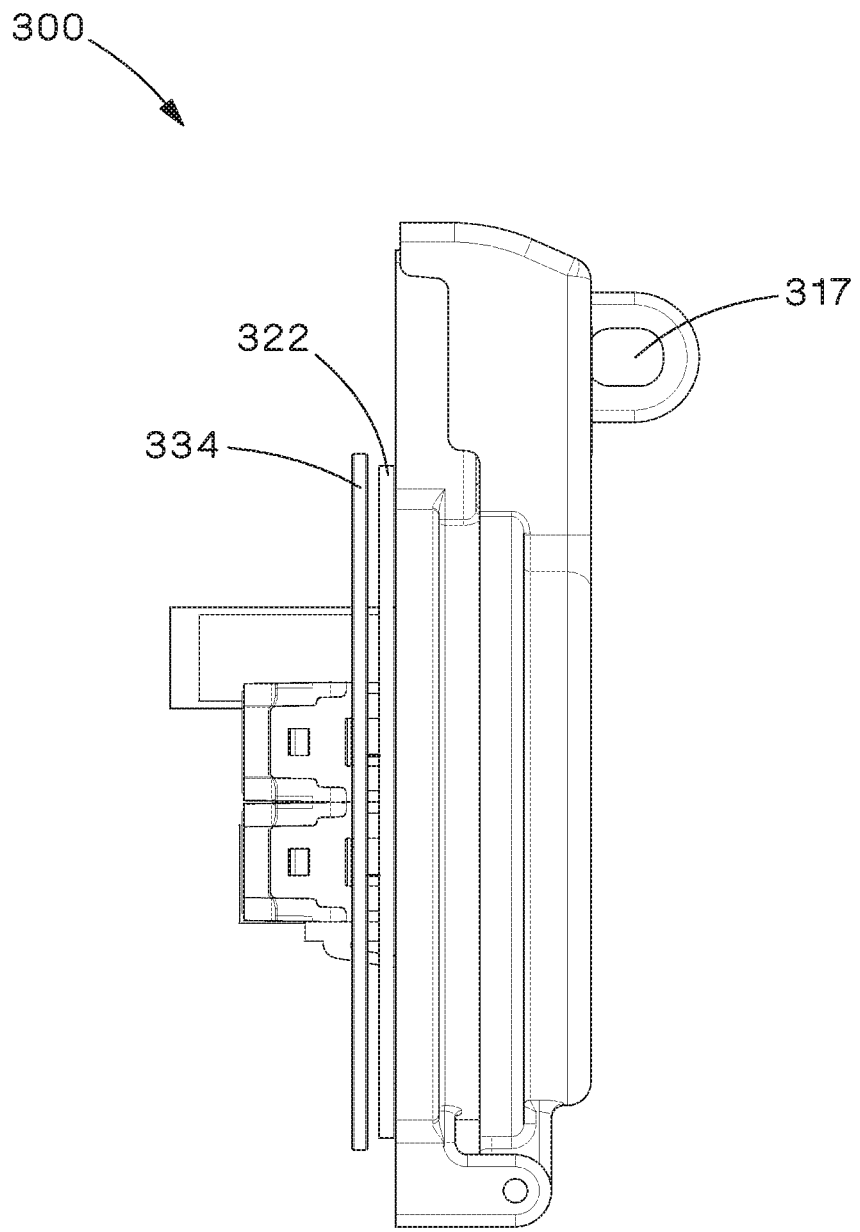
FIG. 33 is a left-side elevation view of the access port shown in FIG. 27, with the cover of the access port being shown in the closed position.
Figure 34:
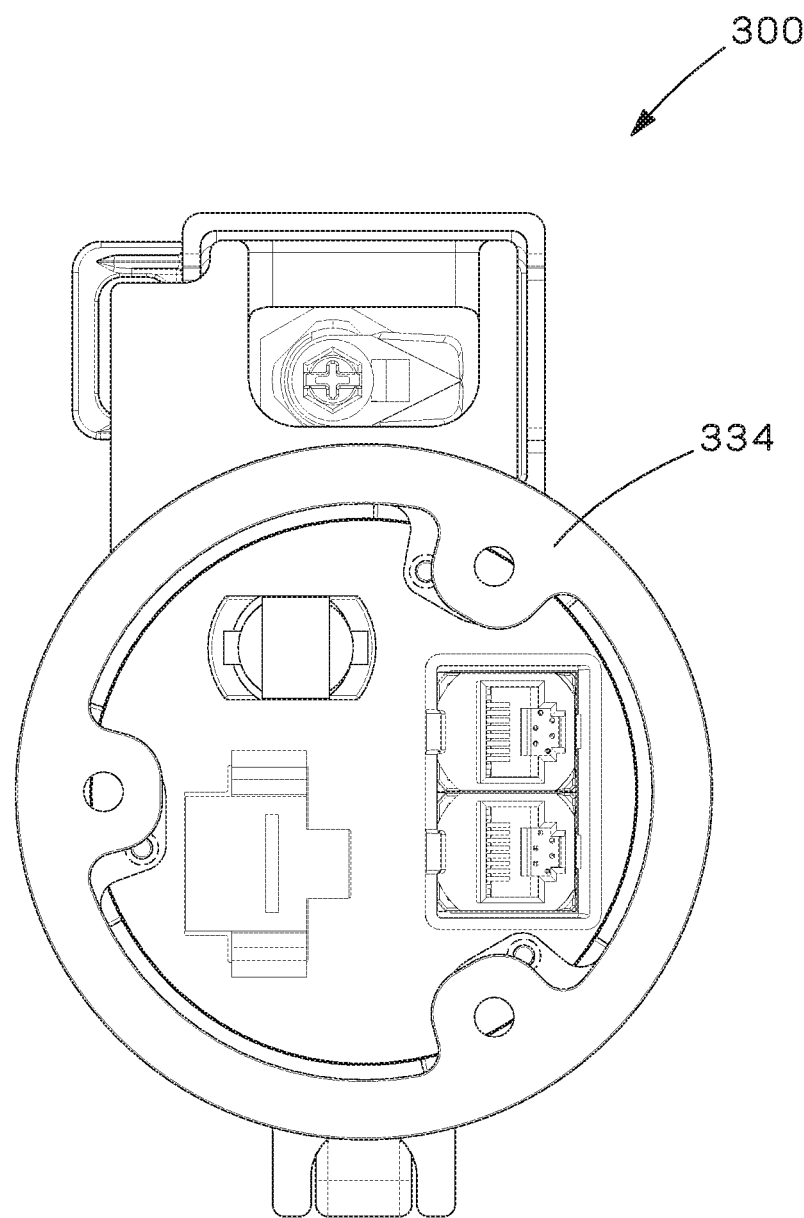
FIG. 34 is a back-elevation view of the access port shown in FIG. 27, with the cover of the access port being shown in the closed position.
Figure 35:
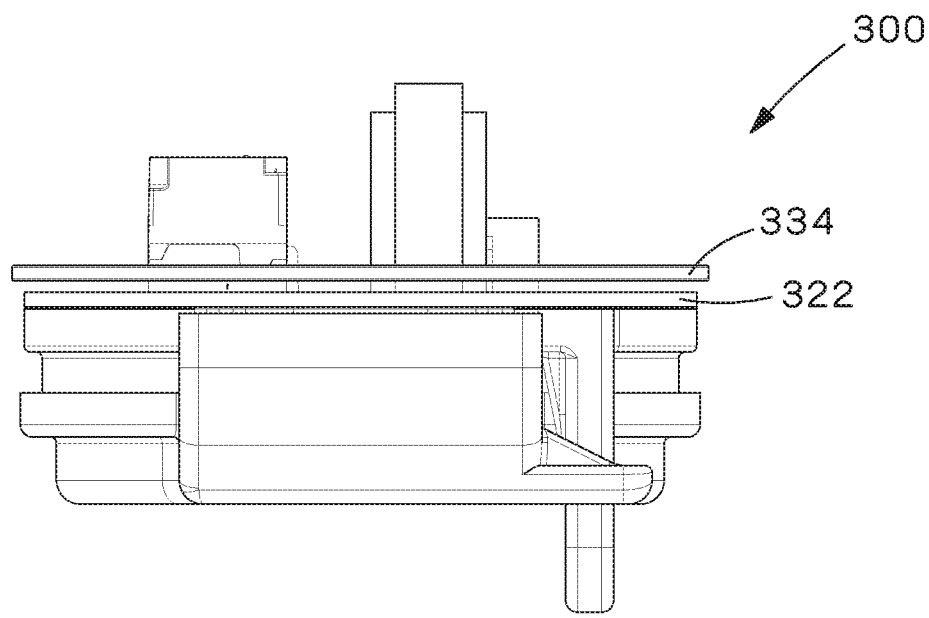
FIG. 35 is a top plan view of the access port shown in FIG. 27, with the cover of the access port being shown in the closed position.
Figure 36:
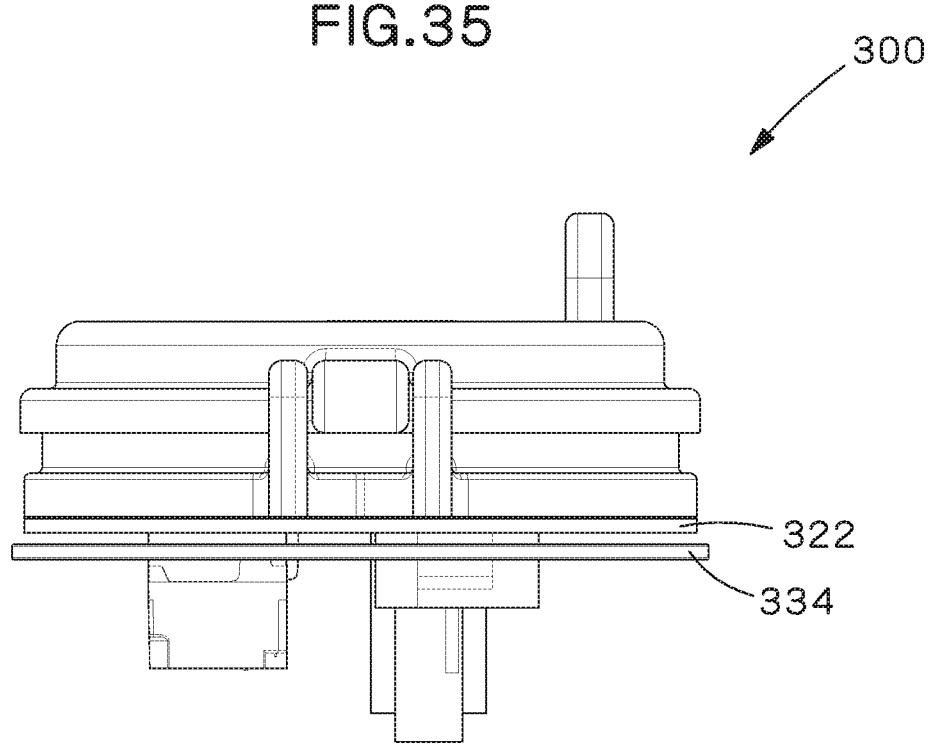
FIG. 36 is a bottom plan view of the access port shown in FIG. 27, with the cover of the access port being shown in the closed position.
Figure 38:
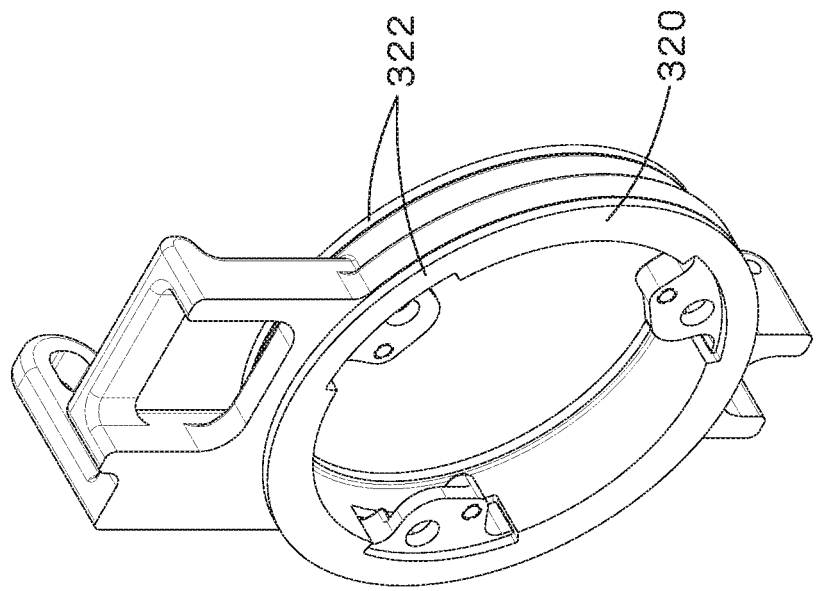
FIG. 38 is another trimetric projection of the base and gasket of the access port shown in FIG. 27.
Figure 37:
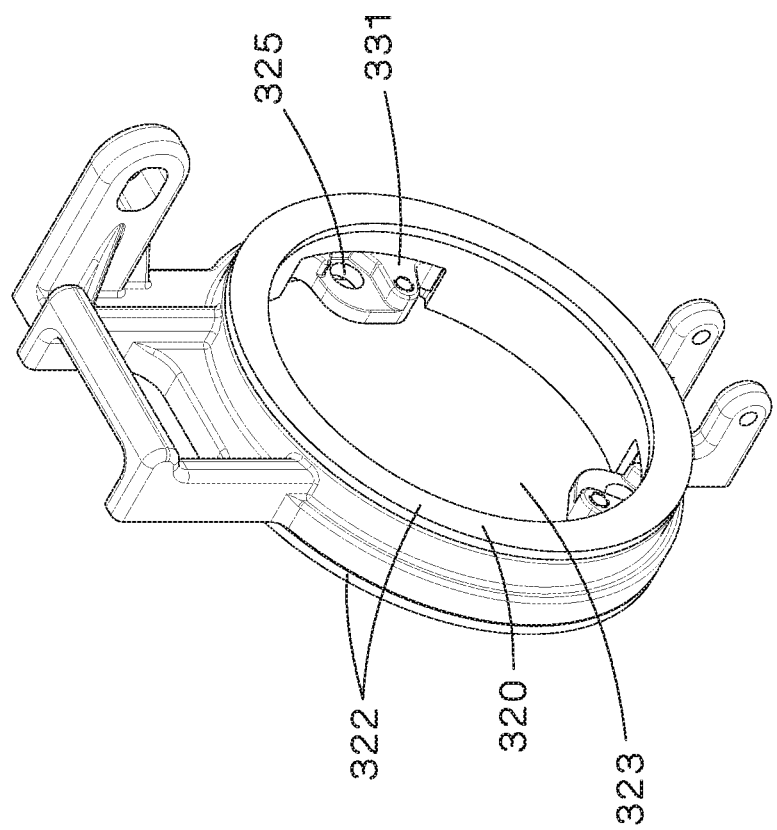
FIG. 37 is a trimetric projection of a base and gasket of the access port shown in FIG. 27.

Faceplate 308 may be made of various materials, such as an ABS plastic with UV protection. Faceplate 308 may be configured to accommodate various component configurations such that different faceplates may be swapped out without removing access port 300 from electrical enclosure 301 to provide flexibility in tailoring the connectivity of access port 300 for different applications. As shown in FIG. 29, one example configuration of a faceplate 308 includes mounting holes for two RJ45 couplers (component 309a), an electrical outlet (component 309b), such as a single female port outlet or double female port outlet, and a circuit breaker (component 309c).

Figure 40:
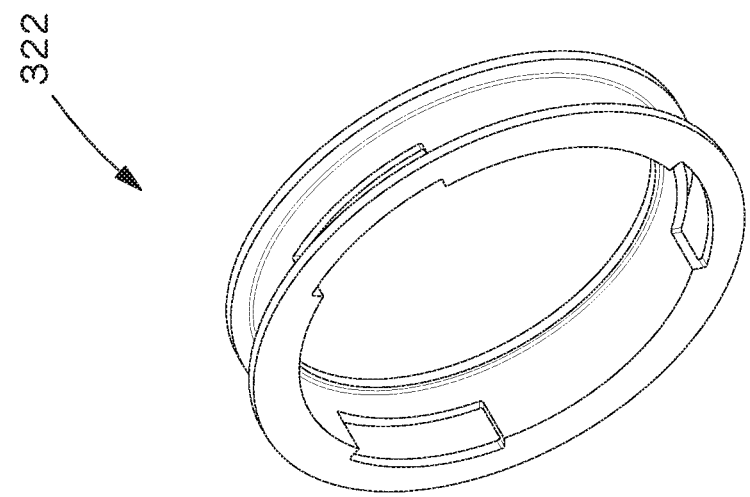
FIG. 40 is another trimetric projection of the gasket of the access port shown in FIG. 27.
Figure 39:
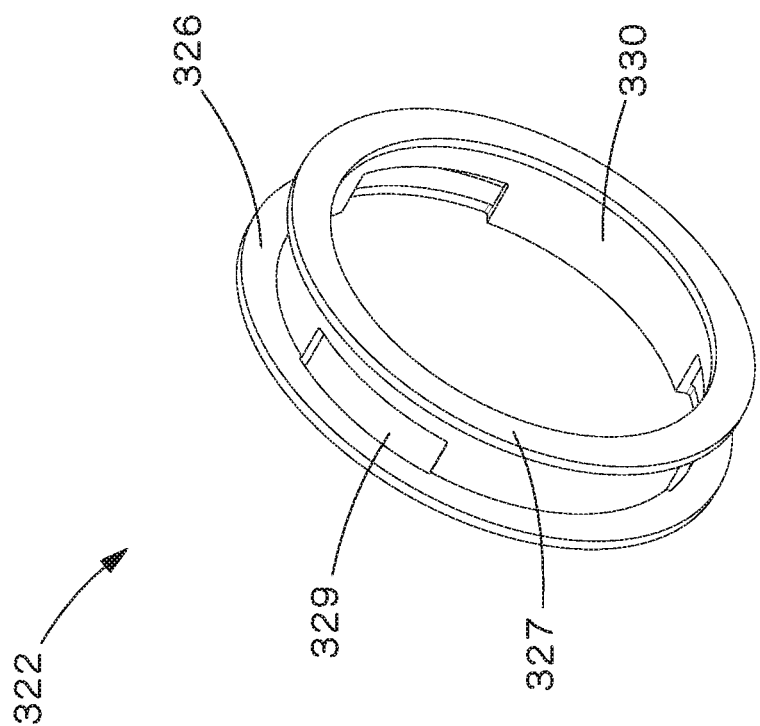
FIG. 39 is a trimetric projection of the gasket of the access port shown in FIG. 27.
Figure 41:
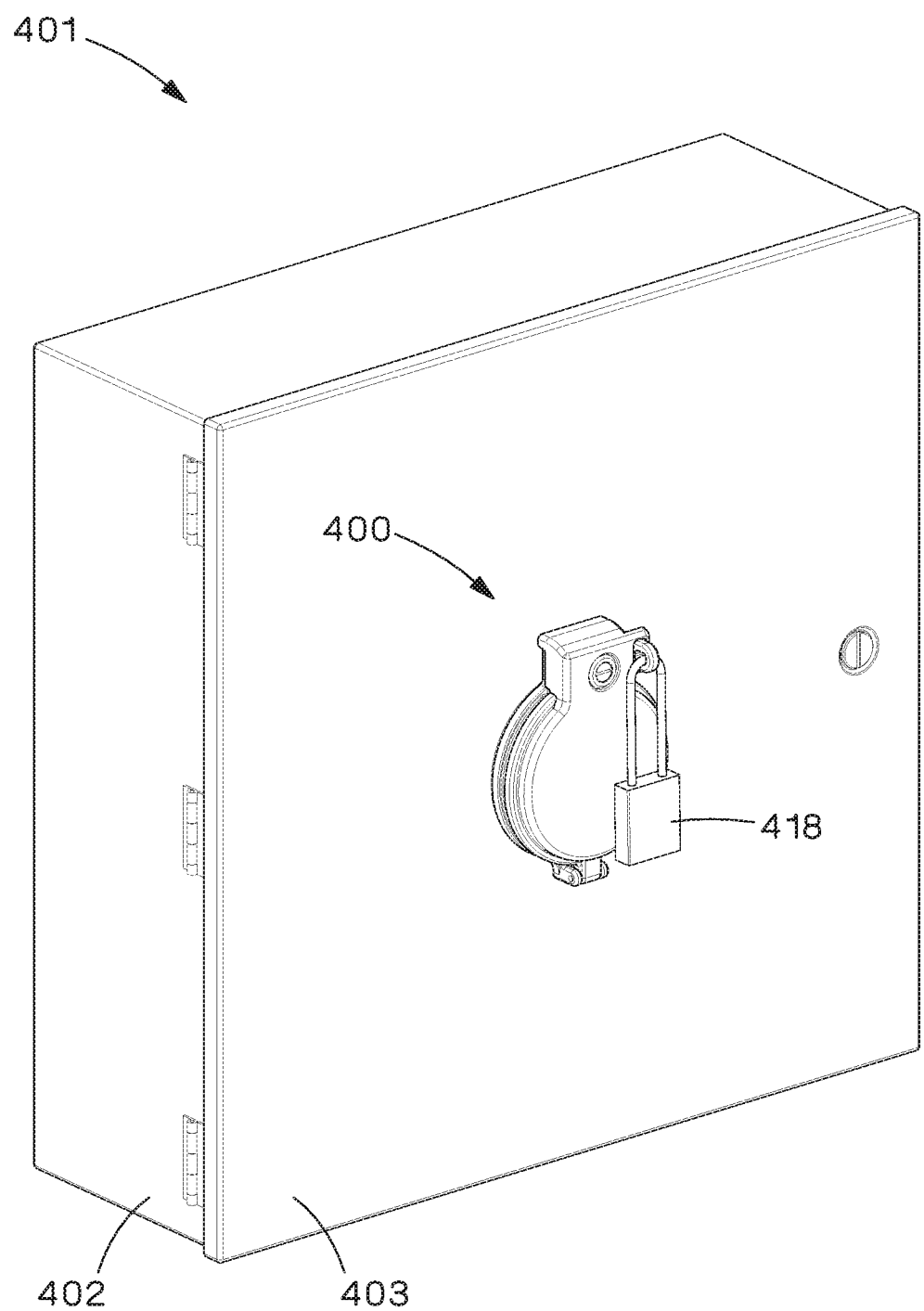
FIG. 41 is a trimetric projection of another example implementation of an access port mounted to an electrical enclosure, both a cover of the access port and a door of the enclosure being shown in a closed position.
Figure 42:
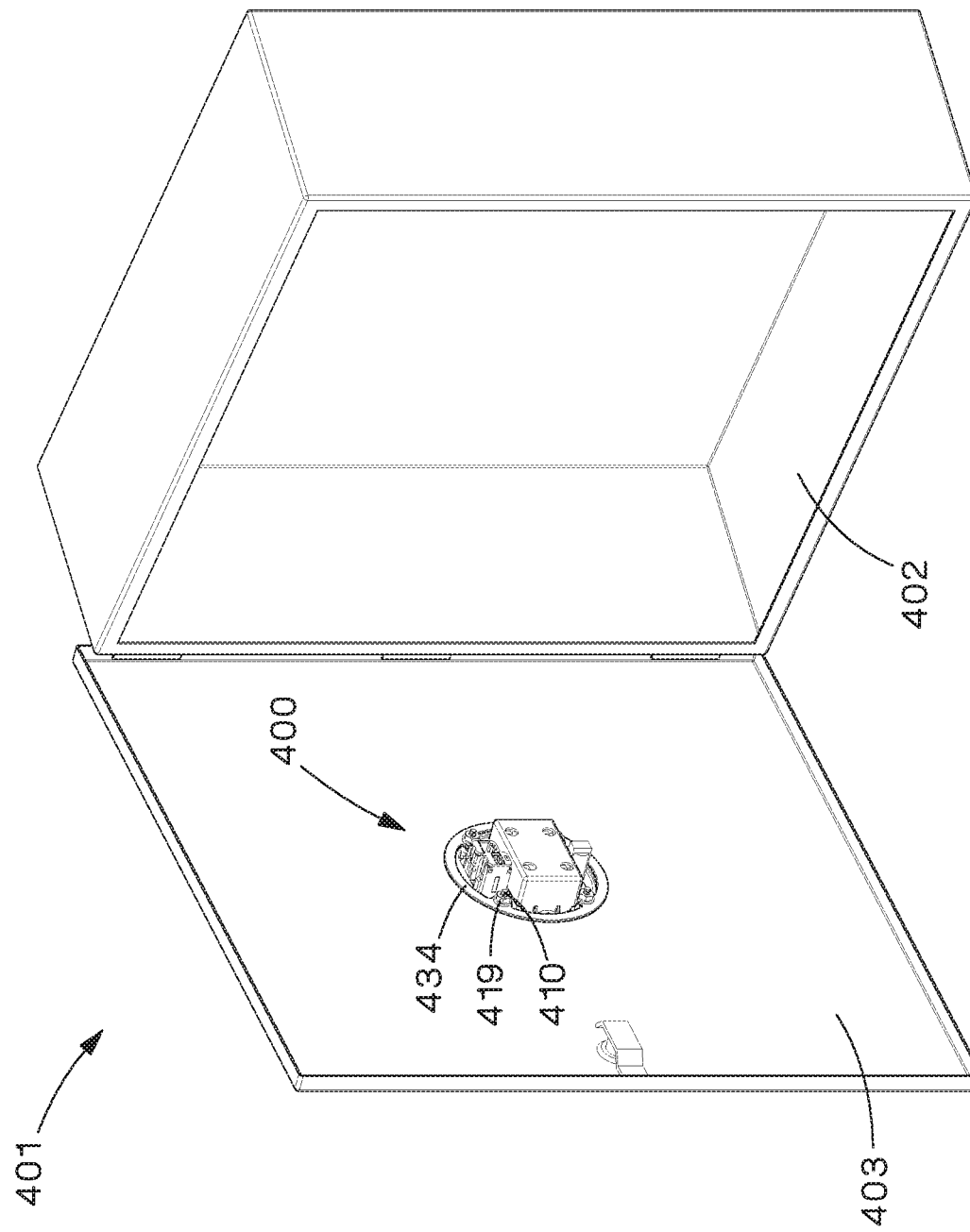
FIG. 42 is a trimetric projection of the access port of FIG. 41, with the cover of the access port being shown in the closed position and the door of the enclosure being shown in an open position.
Figure 43:
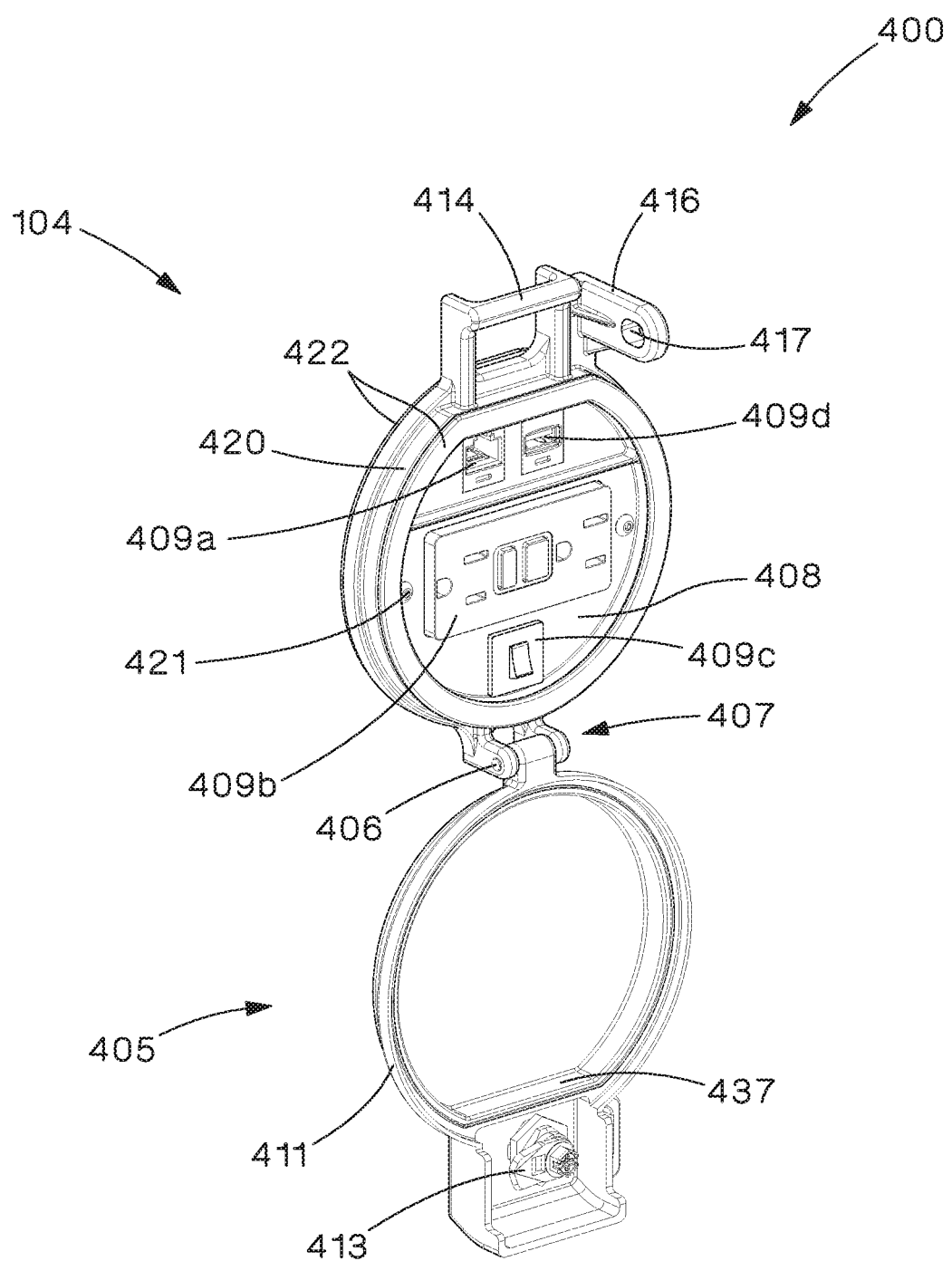
FIG. 43 is a trimetric projection of the access port shown in FIG. 41, with the cover of the access port being shown in an open position.
Figure 44:
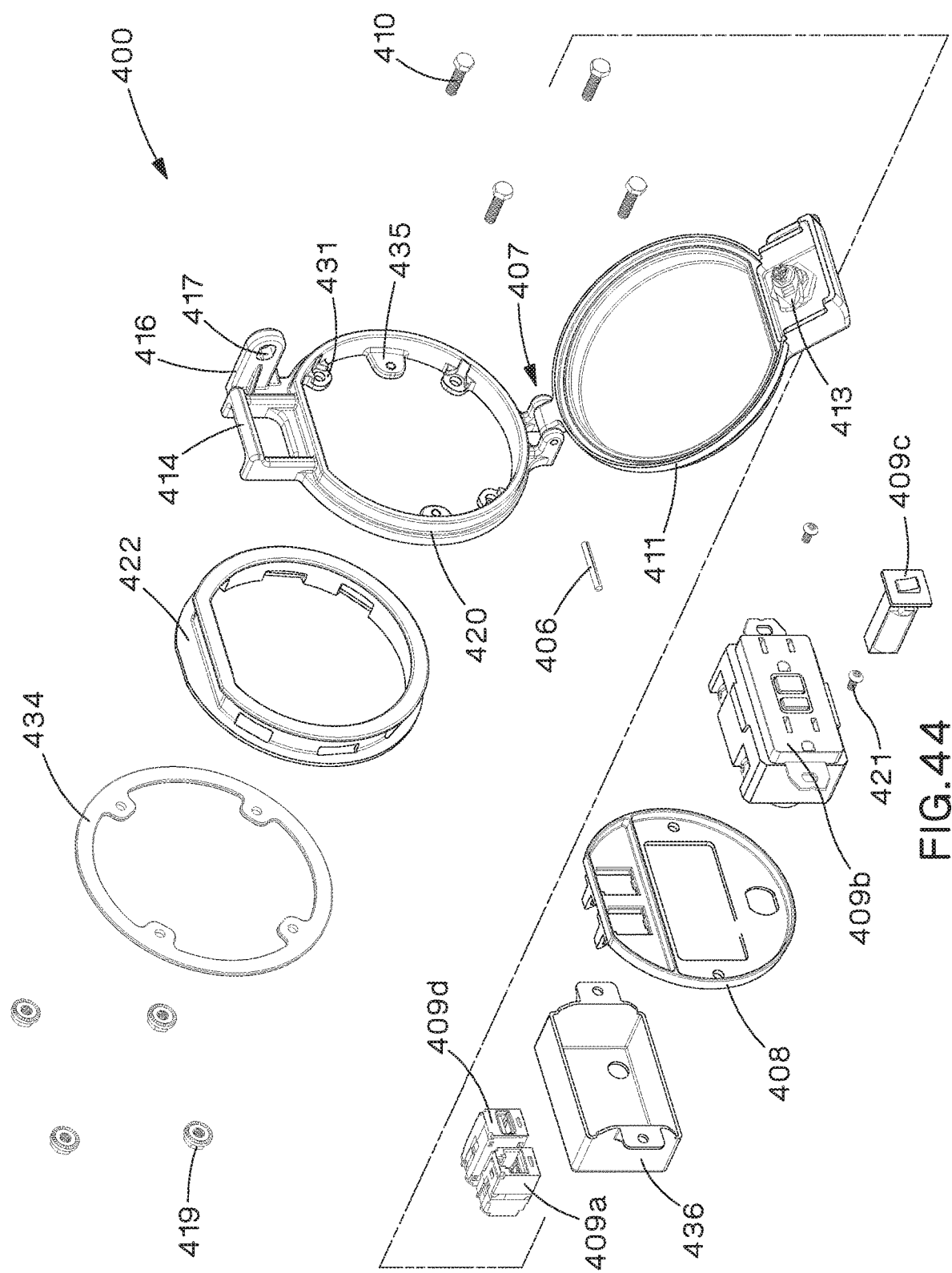
FIG. 44 is an exploded trimetric projection of the access port shown in FIG. 41, with the cover of the access port being shown in the open position.
Figure 45:
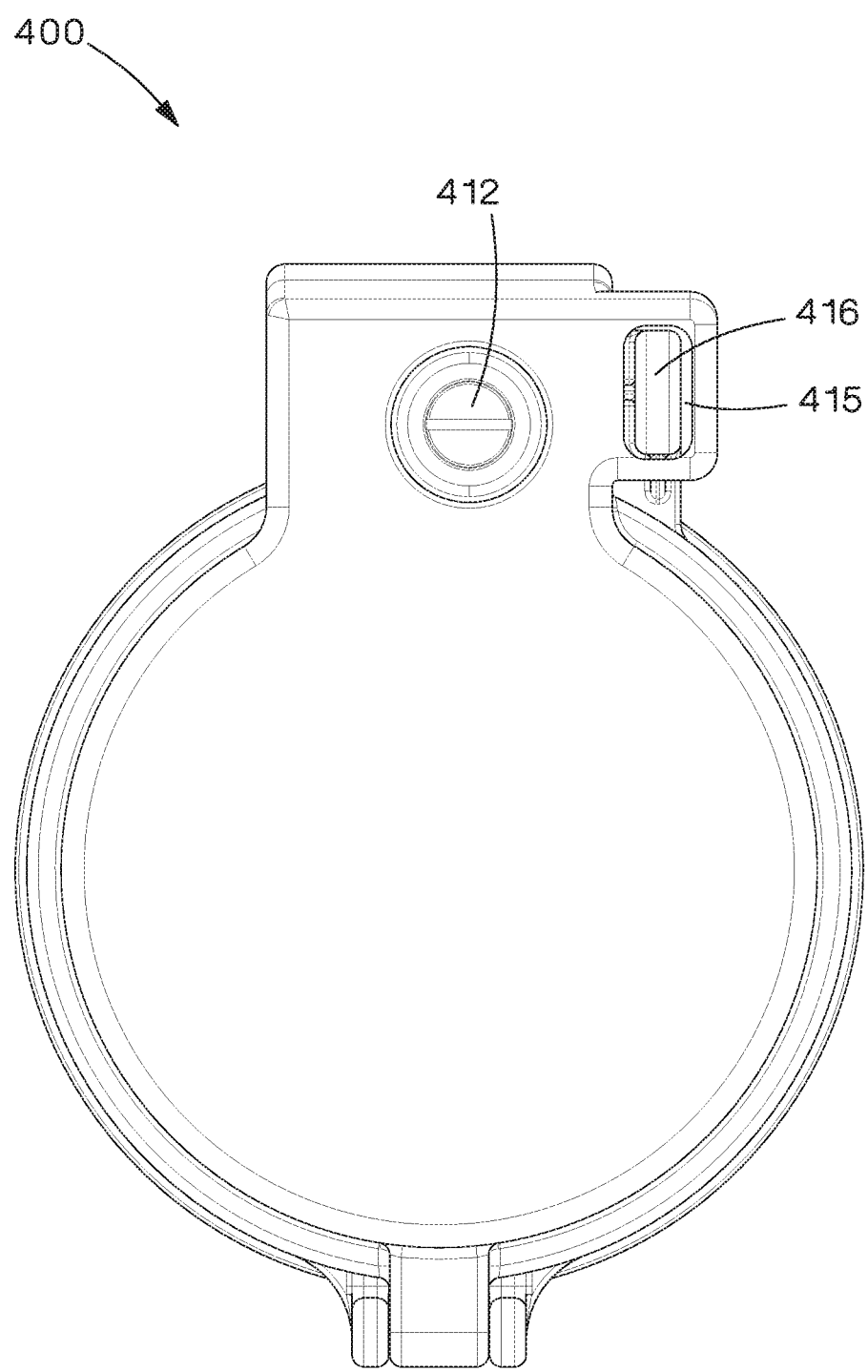
FIG. 45 is a front elevation view of the access port shown in FIG. 41, with the cover of the access port being shown in the closed position.
Figure 46:
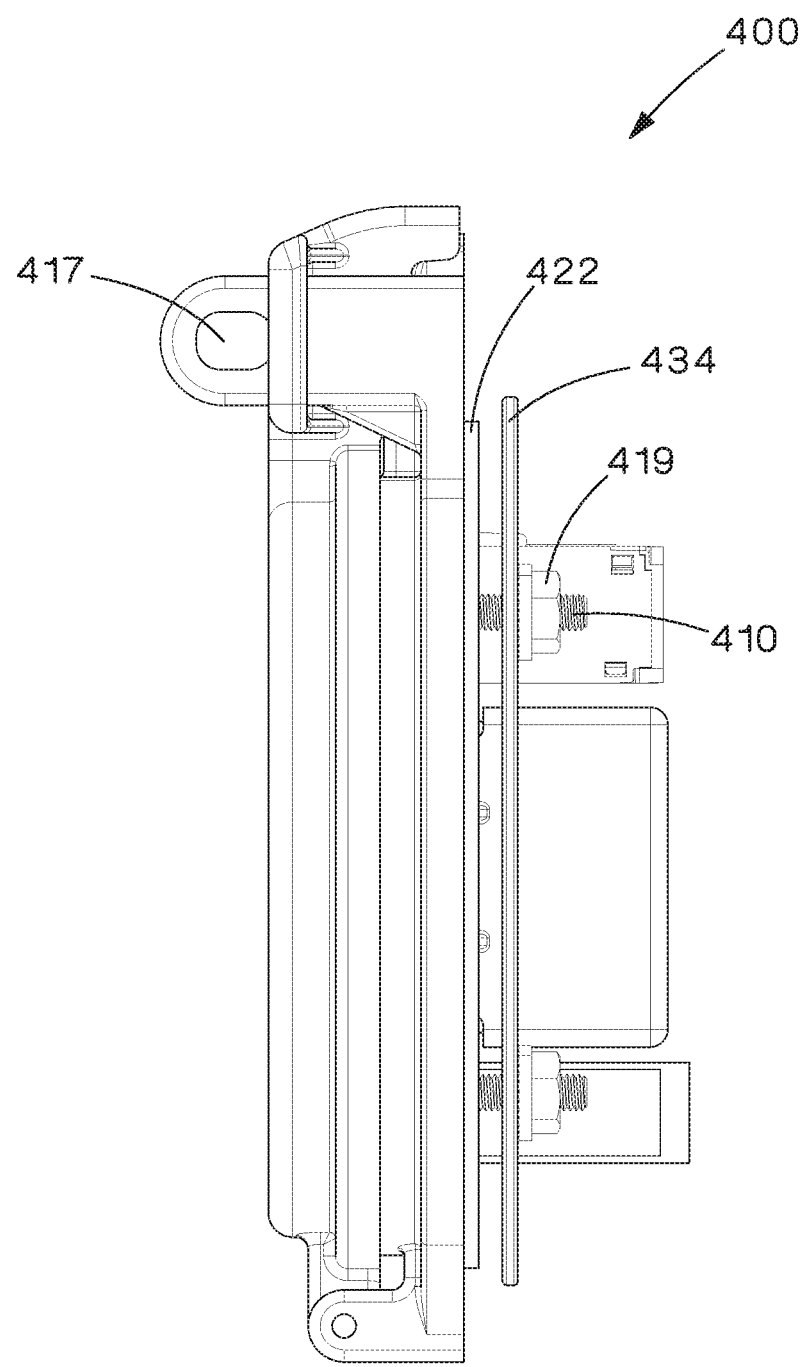
FIG. 46 is a right-side elevation view of the access port shown in FIG. 41, with the cover of the access port being shown in the closed position.
Figure 47:
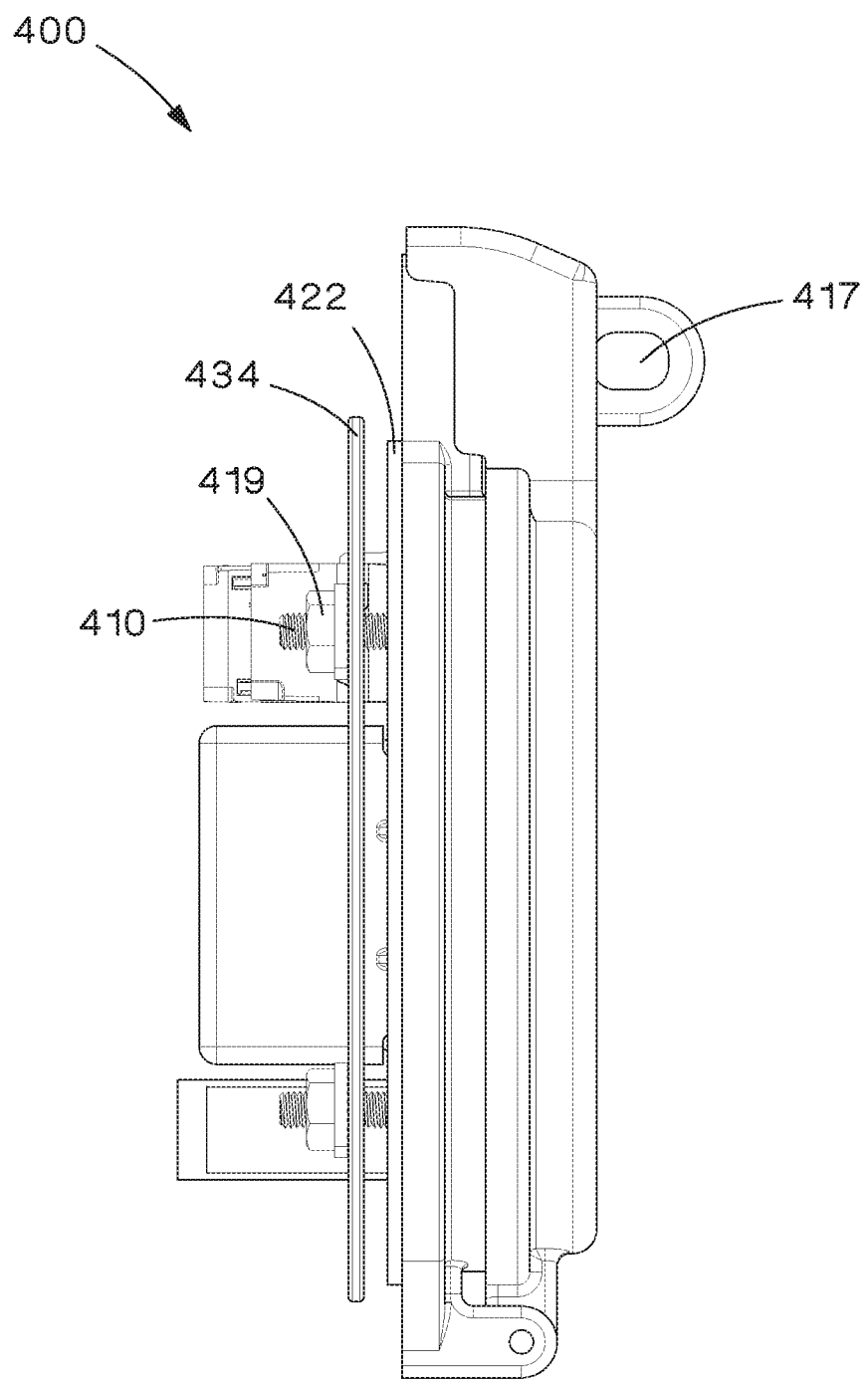
FIG. 47 is a left-side elevation view of the access port shown in FIG. 41, with the cover of the access port being shown in the closed position.
Figure 48:
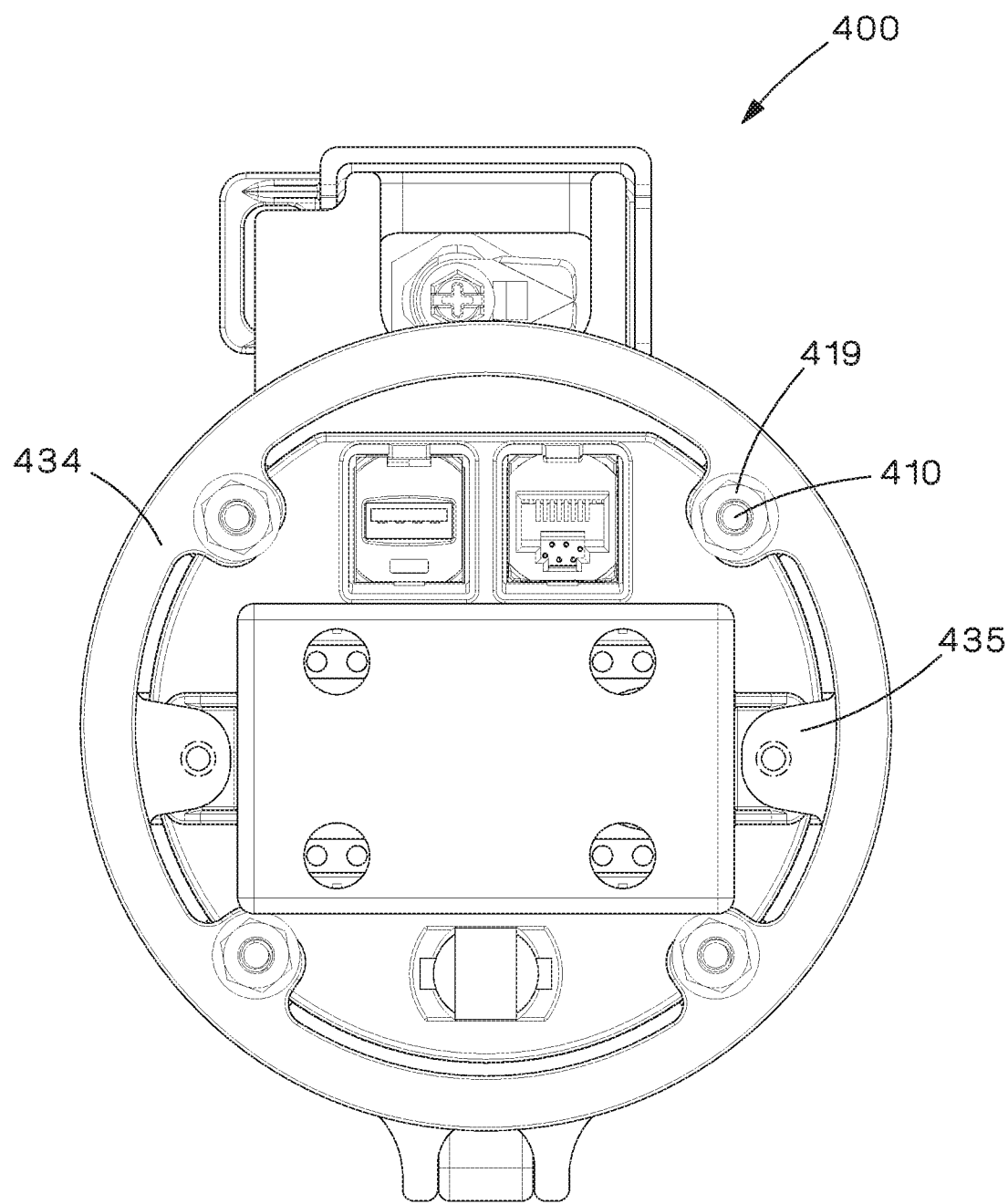
FIG. 48 is a back-elevation view of the access port shown in FIG. 41, with the cover of the access port being shown in the closed position.
Figure 49:
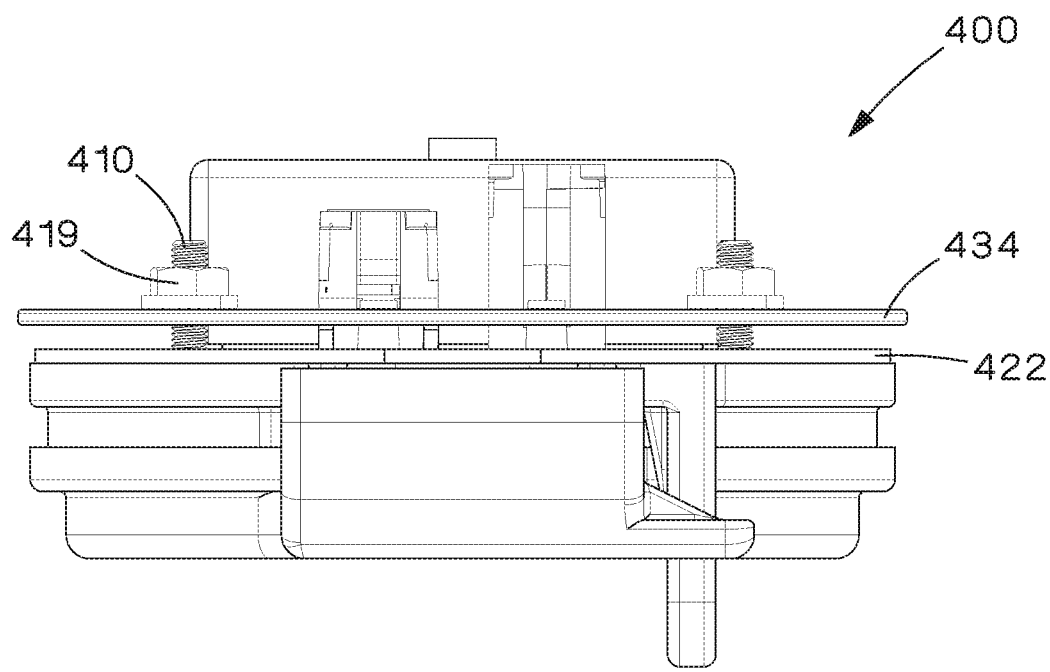
FIG. 49 is a top plan view of the access port shown in FIG. 41, with the cover of the access port being shown in the closed position.
Figure 50:
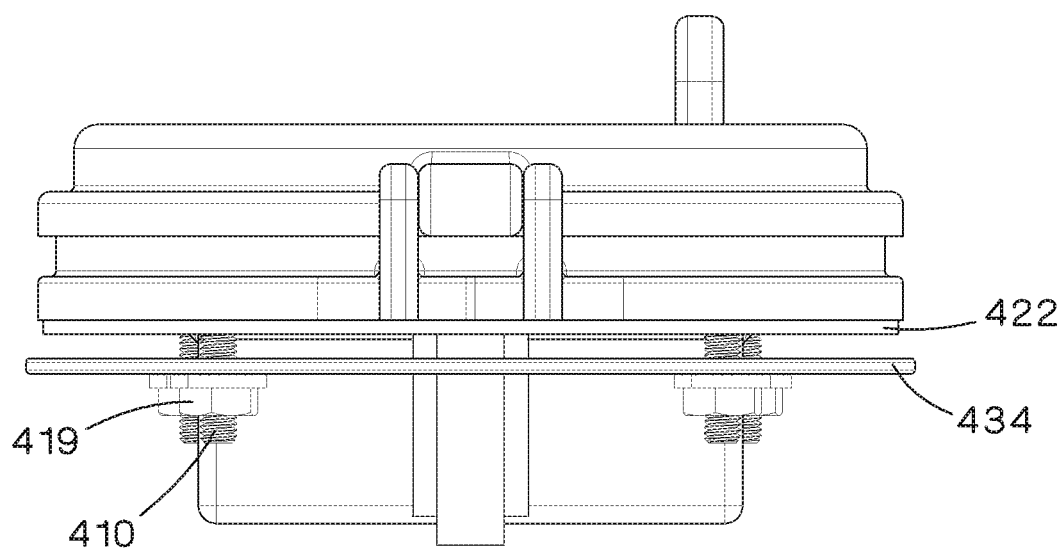
FIG. 50 is a bottom plan view of the access port shown in FIG. 41, with the cover of the access port being shown in the closed position.
Figure 52:
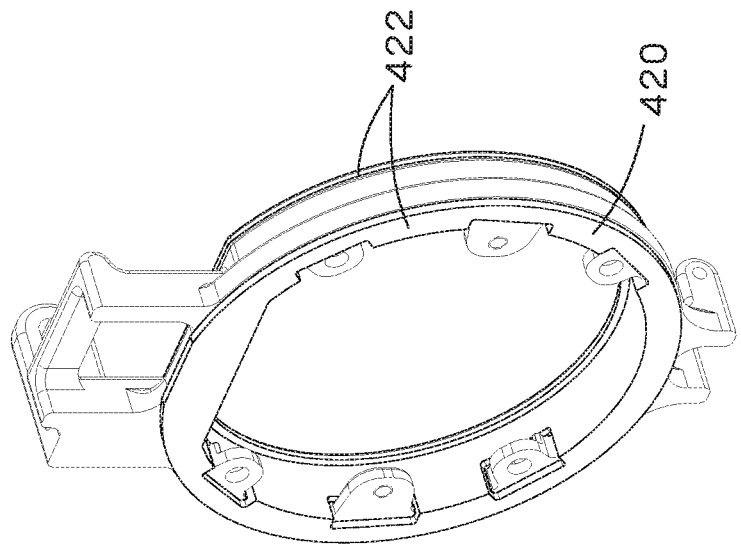
FIG. 52 is another trimetric projection of the base and gasket of the access port shown in FIG. 41.
Figure 51:
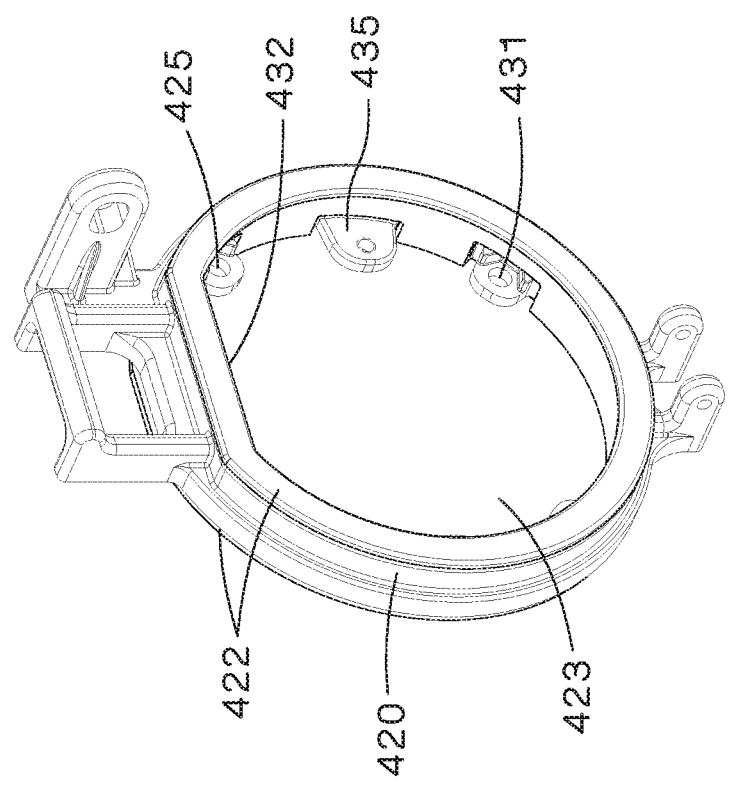
FIG. 51 is a trimetric projection of a base and gasket of the access port shown in FIG. 41.
Figure 54:
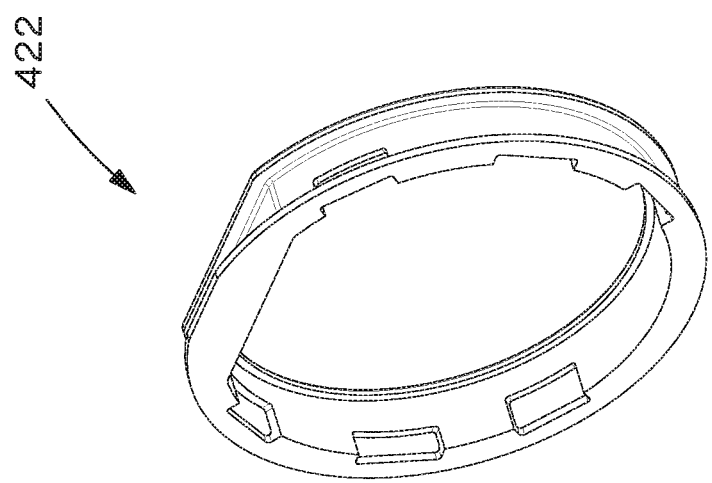
FIG. 54 is another trimetric projection of the gasket of the access port shown in FIG. 41.
Figure 53:
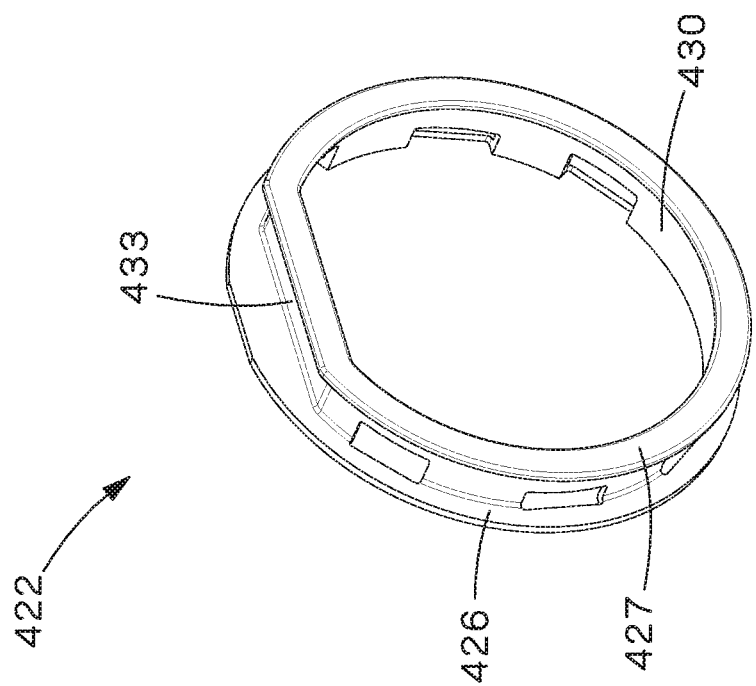
FIG. 53 is a trimetric projection of the gasket of the access port shown in FIG. 41.

Captive gasket 322 may be formed of a rubber. Captive gasket 322 may be captive in that it is held in place in interior opening 323 by tension. As shown in FIGS. 39 and 40, captive gasket 322 may be a one-piece gasket having a front compression surface 327, a rear compression surface 326, and an interior circumferential surface 330.

Front compression surface 327 may be positioned between the front surface of base 320 and cover 311 to provide a seal between base 320 and cover 311 when cover 311 is in the closed position. The seal provided by front compression surface 327 prevents ingress of environmental particulates between base 320 and cover 311.

Rear compression surface 326 may be positioned between the rear surface of base 320 and door 303 of electrical enclosure 301 to provide a seal between base 320 and door 303. The seal provided by rear compression surface 326 prevents ingress of environmental particulates between base 320 and door 303.

Interior circumferential surface 330 may be positioned between an interior circumferential surface of base 320 and faceplate 308 to provide a seal between base 320 and faceplate 308. The seal provided by interior circumferential surface 330 prevents ingress of environmental particulates between base 320 and faceplate 308 when cover 311 is in the open position.

Captive gasket 322 may include holes 329 through which alignment tabs 331 may be positioned.

FIGS. 41-54 illustrate a further example access port 400. Access port 400 may be similar in design and operation as access port 300 of FIGS. 27-40. Thus, similar features are numbered similarly and will not be described in reference to FIGS. 41-54. As shown in FIGS. 41-54, access port 400 may be a round access port similar to access port 300 of FIGS. 27-40, except that an upper portion of interior opening 423 in base 420 may be flattened. As a result, the upper portions of captive gasket 422 and cover 411 may also be flattened. As shown in FIGS. 43 and 51-54, base 420 may include a flat portion 432, cover 411 may include a flat portion 437, and captive gasket 422 may include a flat portion 433.

In addition, access port 400 may include a backing cover 436 to enclose the back of component 409b. Backing cover 436 may be held against the back of faceplate 408 by screws 421.

Access port 400 may also have separate alignment tabs, one set of alignment tabs 431 for mounting access port 400 to enclosure 401, and a second set of alignment tabs 435 for mounting faceplate 408 to base 420.

Figure 55:
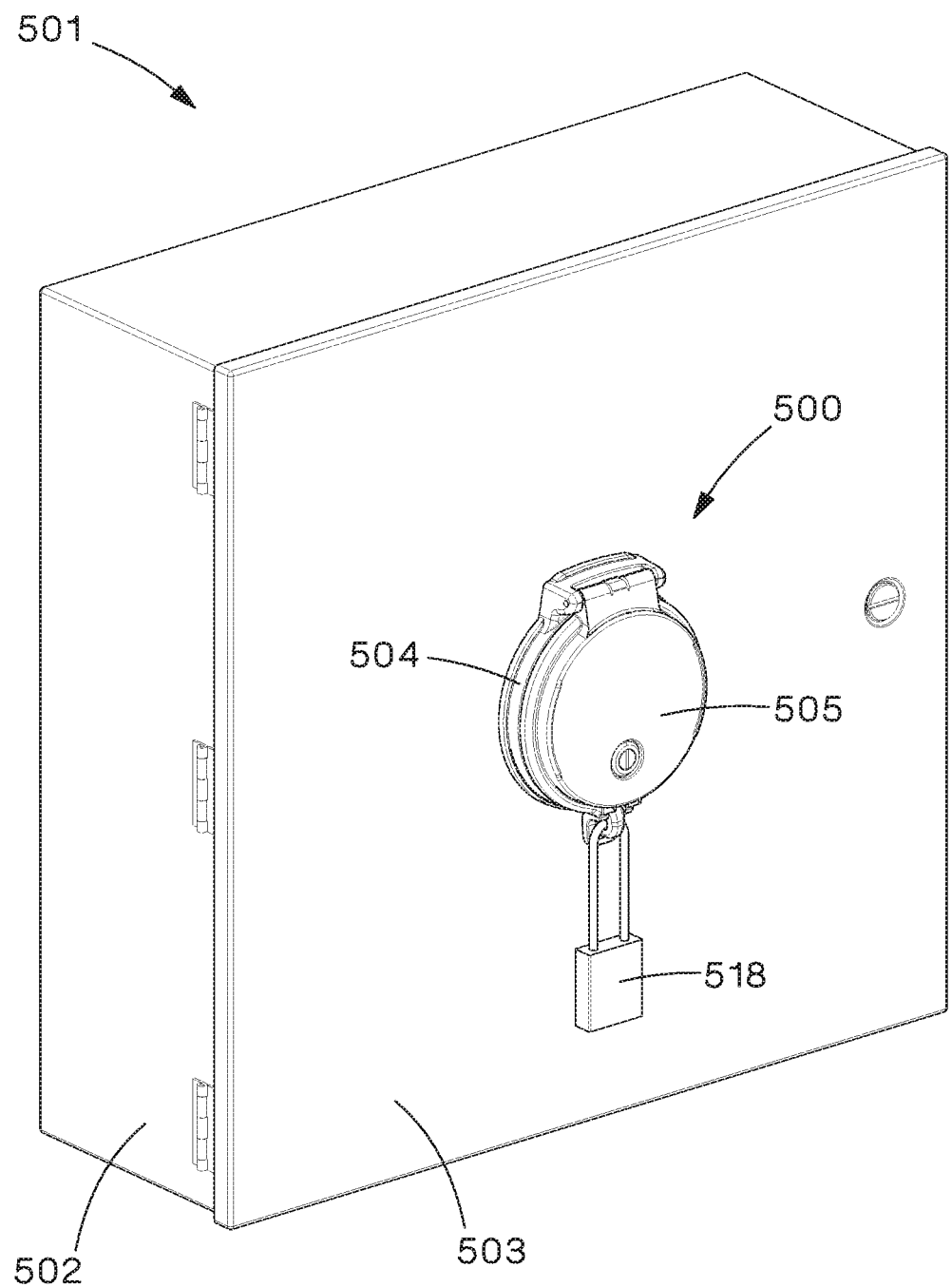
FIG. 55 is a trimetric projection of another example implementation of an access port mounted to an electrical enclosure, both a cover of the access port and a door of the enclosure being shown in a closed position.
Figure 56:
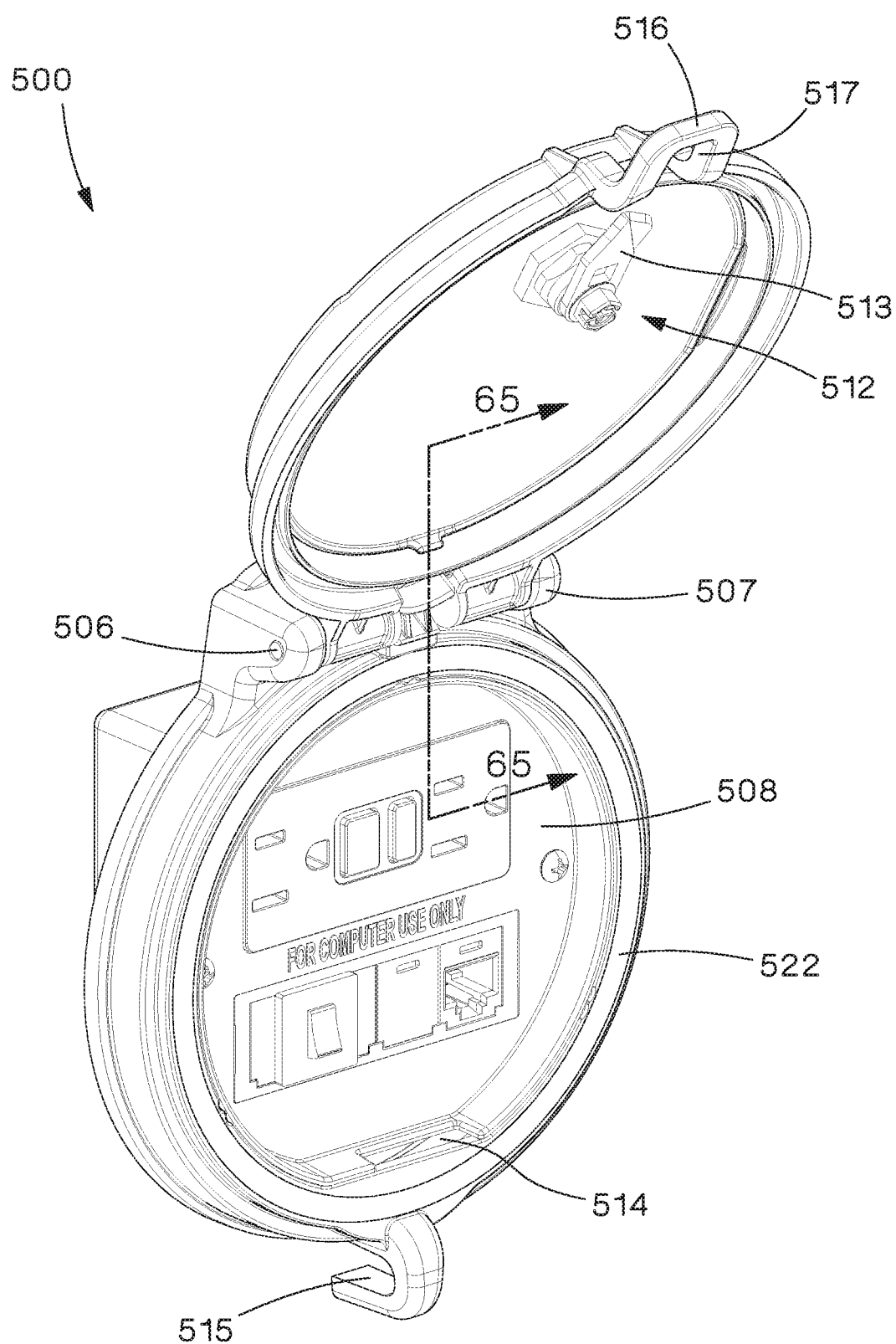
FIG. 56 is a trimetric projection of the access port shown in FIG. 55, with the cover of the access port being shown in an open position.
Figure 69:
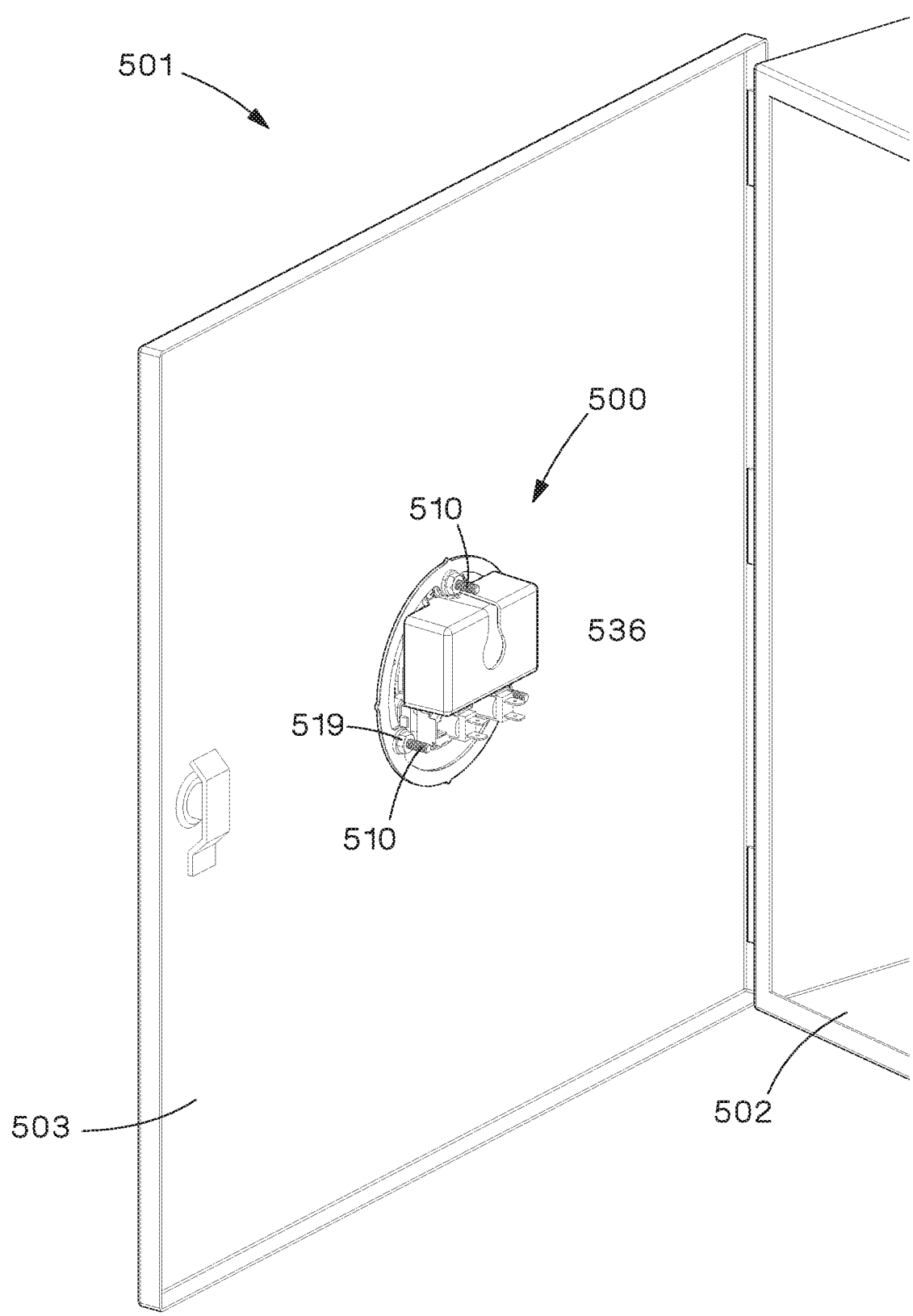
FIG. 69 is a trimetric projection of the access port of FIG. 55, with the door of the enclosure being shown in an open position.

FIGS. 55-69 illustrate a further example access port 500. As shown in FIGS. 55 and 69, access port 500 may be mounted on a door 503 of an enclosure 501 via screws 510 and nuts 519 or other types of fasteners, as well as a lock ring 534. Screws 510 may protrude through holes 525 in alignment tabs 531 and holes 542 in lock ring 534. Screws 510 may engage nuts 519 and may be tightened to compress lock ring 534 and base assembly 504 against door 503 to hold access port 500 in place. In some implementations, access port 500 may be mounted on other areas of enclosure 501, such as body 502.

As shown in FIGS. 55-69, access port 500 may be a round access port. The round shape of access port 500 minimizes mounting space and provides for easy installation of access port 500. An installer only needs to make one cut in enclosure 501 to provide access to the back of access panel 500 in enclosure 501. Previous access ports required making multiple difficult cuts (e.g., a starter hole first and then the remainder of the area may be cut using a straight blade) for a square or rectangular shaped access panel. Moreover, in the example shown in FIGS. 55-69, the installer need not make additional cuts (i.e., clearance holes) for screws 510 because screws 510 are within interior opening 523, which further minimizes install times and the overall footprint of access port 500.

As shown in FIGS. 55-69, access port 500 may include a base assembly 504 and a cover assembly 505 held together by a hinge pin 506 at hinge point 507. Hinge pin 506 allows cover assembly 505 to rotate about hinge point 507 to an opened position, where cover assembly 505 is swung completely open so as to provide access to components 509a-509c mounted on a faceplate 508. In a closed position, where cover assembly 505 is swung completely closed against base assembly 504, access is restricted to components 509a-509c for security purposes as well as protecting them from the elements. Hinge point 507 may be positioned near the top of access port 500 such that cover assembly 505 swings upward.

Figure 65:
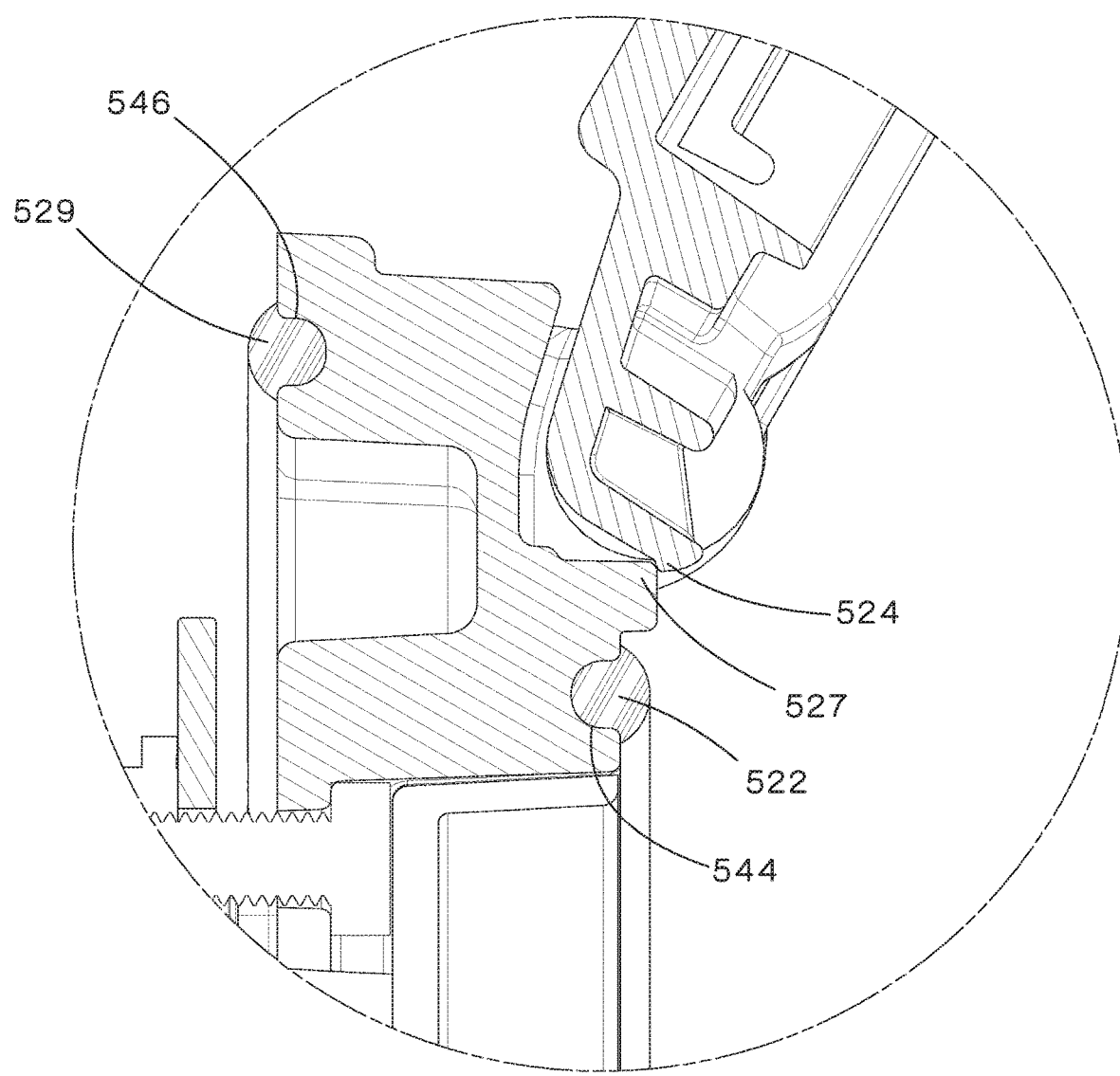
FIG. 65 is a cross-sectional view of the access port shown in FIG. 55, with the retention tab depicted.
Figure 67:
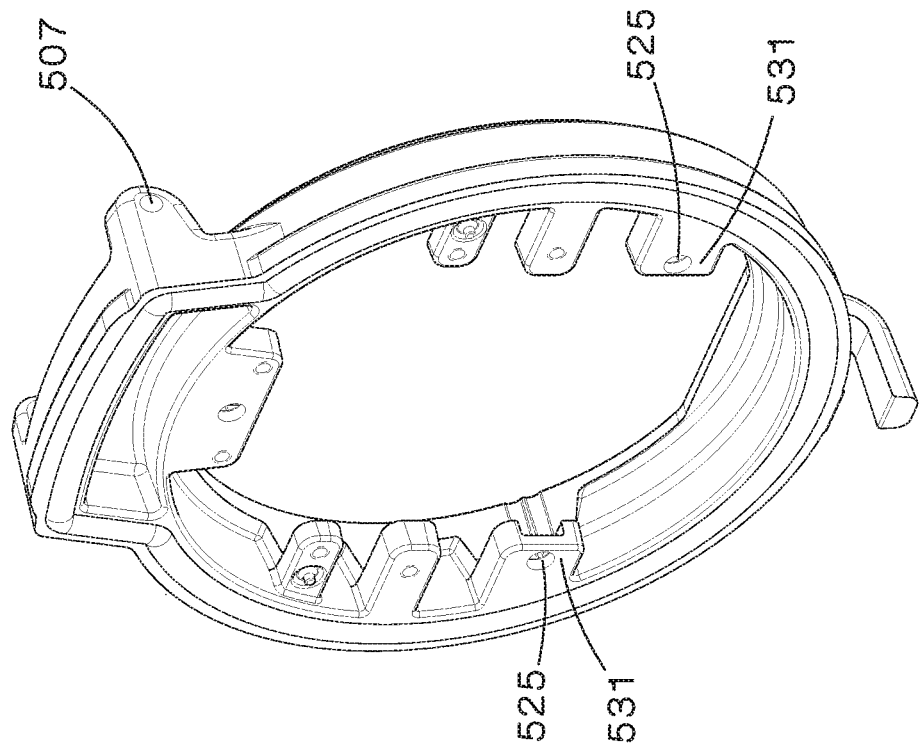
FIG. 67 is a rear trimetric projection of the base assembly of the access port shown in FIG. 55.
Figure 66:
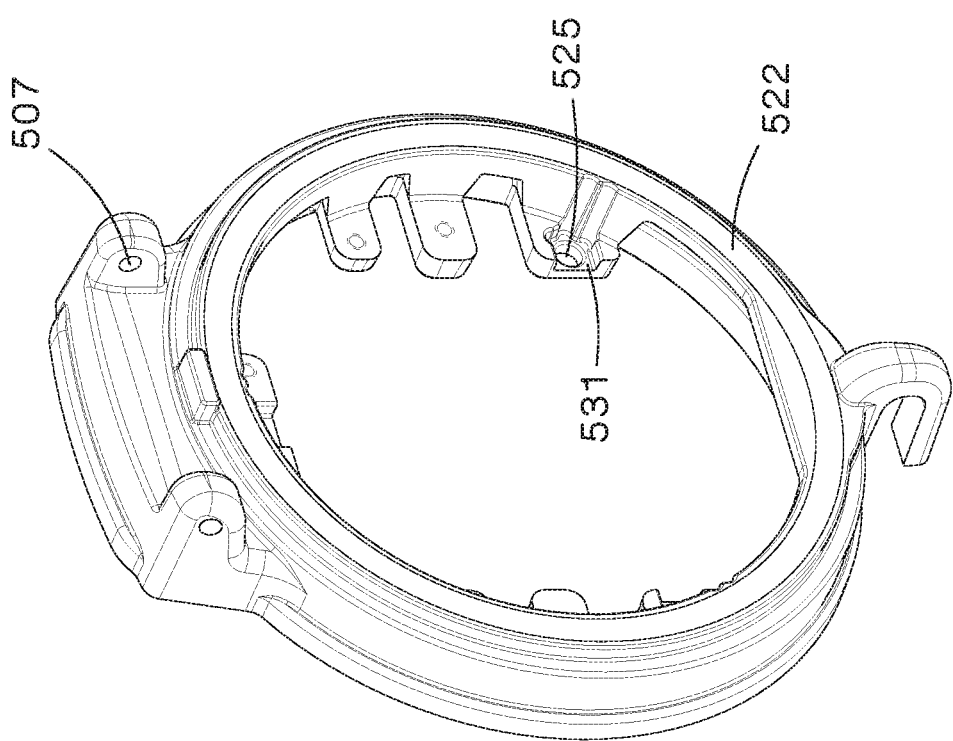
FIG. 66 is a front trimetric projection of the base assembly of the access port shown in FIG. 55.
Figure 68:
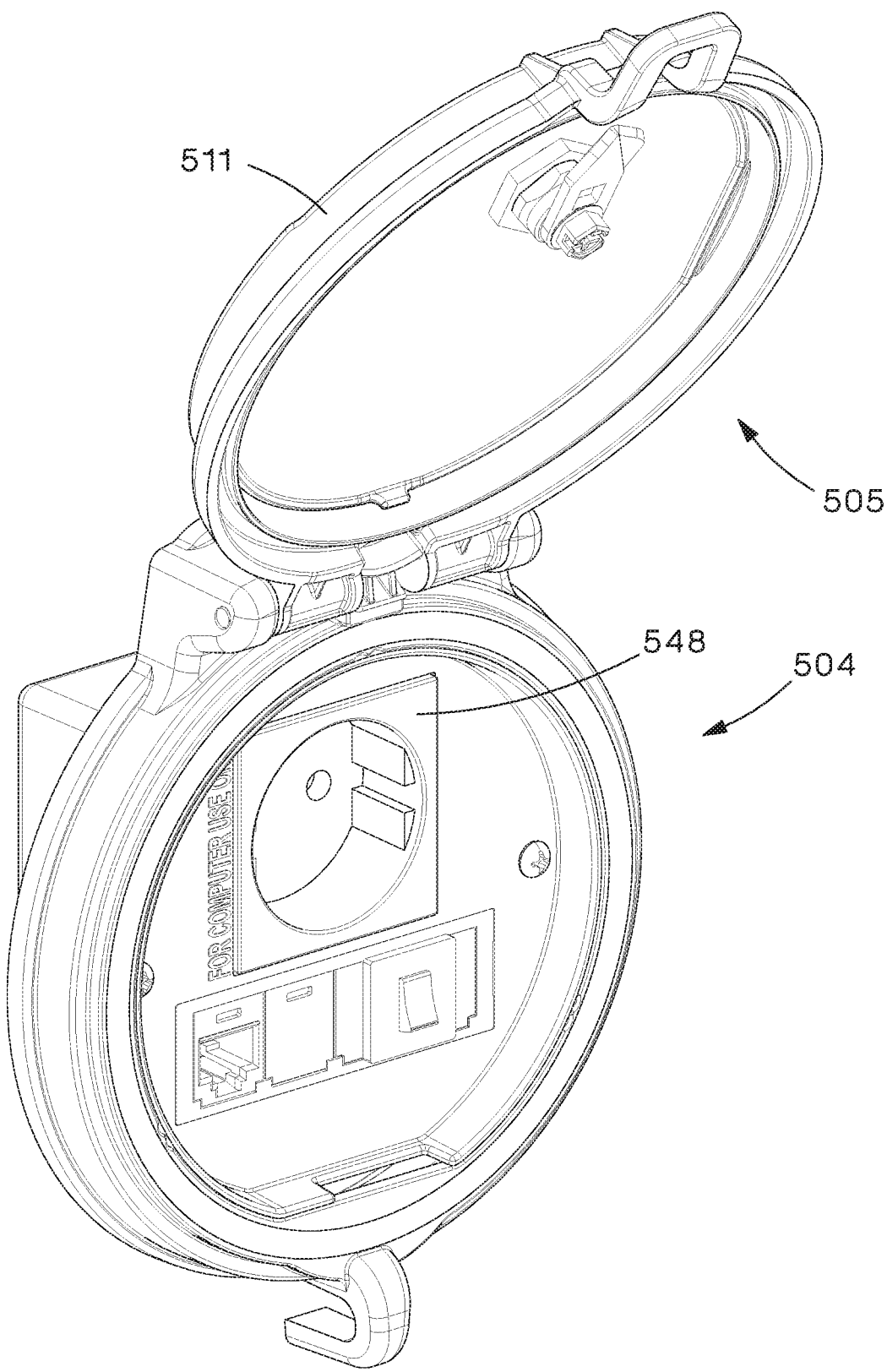
FIG. 68 is a trimetric projection of the access port shown in FIG. 55 with an alternative component configuration.

Cover assembly 505 may include a low-profile cover 511 that reduces the risk of accidental contact with other equipment or technicians. Cover 511 may be made of various clear or opaque materials, such as a polycarbonate with ultraviolet (UV) protection. The cover assembly 505 may include retention tab 524, as depicted in FIG. 65. Retention tab 524 may operate to retain the cover 511 in the up and open position, which allows easy access to the base assembly 504. Retention tab 524 may be integral with cover 511.

Retention tab 524 operates in connection with hinge point 507. As the cover 511 is rotated to a completely open position, as depicted in FIG. 65, the distal end of retention tab 524 catches on front face 527, which holds cover 511 open.

Cover assembly 505 may also include a compression lock 512 which may require a tool to lock and unlock. Compression lock 512 may rotate latch 513 between a locked position, where it engages slot 514 in the base assembly 504 to prevent cover assembly 505 from being swung open, and an unlocked position, where cover assembly 505 is free to rotate about hinge point 507.

Cover assembly 505 may further include an eye 515 through which a padlock tab 516 on base assembly 504 may be seated when cover assembly 505 is in the closed position. Padlock tab 516 may include a mounting port 517 to which a padlock 518 may be mounted. Padlock 518 may retain cover assembly 505 in the closed and locked position for added security.

Base assembly 504 may include a faceplate 508 mounted to a base 520 in an interior opening 523 of base 520 via screws 521. The base 520 includes front surface 527. A foam gasket 522 may be positioned in front surface 527 to provide a seal between base 520 and cover 511 when cover 511 is in the closed position. Foam gasket 522 may be extruded into and cured within a pocket 544 in which foam gasket 522 is positioned. The seal provided by foam gasket 522 prevents ingress of environmental particulates between base 520 and cover 511.

Base 520 may also include a rear surface 526. Foam gasket 529 may be positioned in the rear surface of base 520 to provide a seal between base 520 and door 503. Foam gasket 529 may be extruded into and cured within a pocket 546 in which foam gasket 529 is positioned. The seal provided by rear surface 526 prevents ingress of environmental particulates between base 520 and door 503.

Base 520 may have separate alignment tabs, one set of alignment tabs 531 for mounting access port 500 to enclosure 501, and a second set of alignment tabs 535 for mounting faceplate 508 to base 520.

Faceplate 508 may be configured to accommodate various component configurations such that different faceplates may be swapped out without removing access port 500 from electrical enclosure 501 to provide flexibility in tailoring the connectivity of access port 500 for different applications. Faceplate 508 may hide screws 510 securing access port 500 to enclosure 501. Faceplate 508 may be made of various materials, such as an ABS plastic with UV protection.

Figure 57:
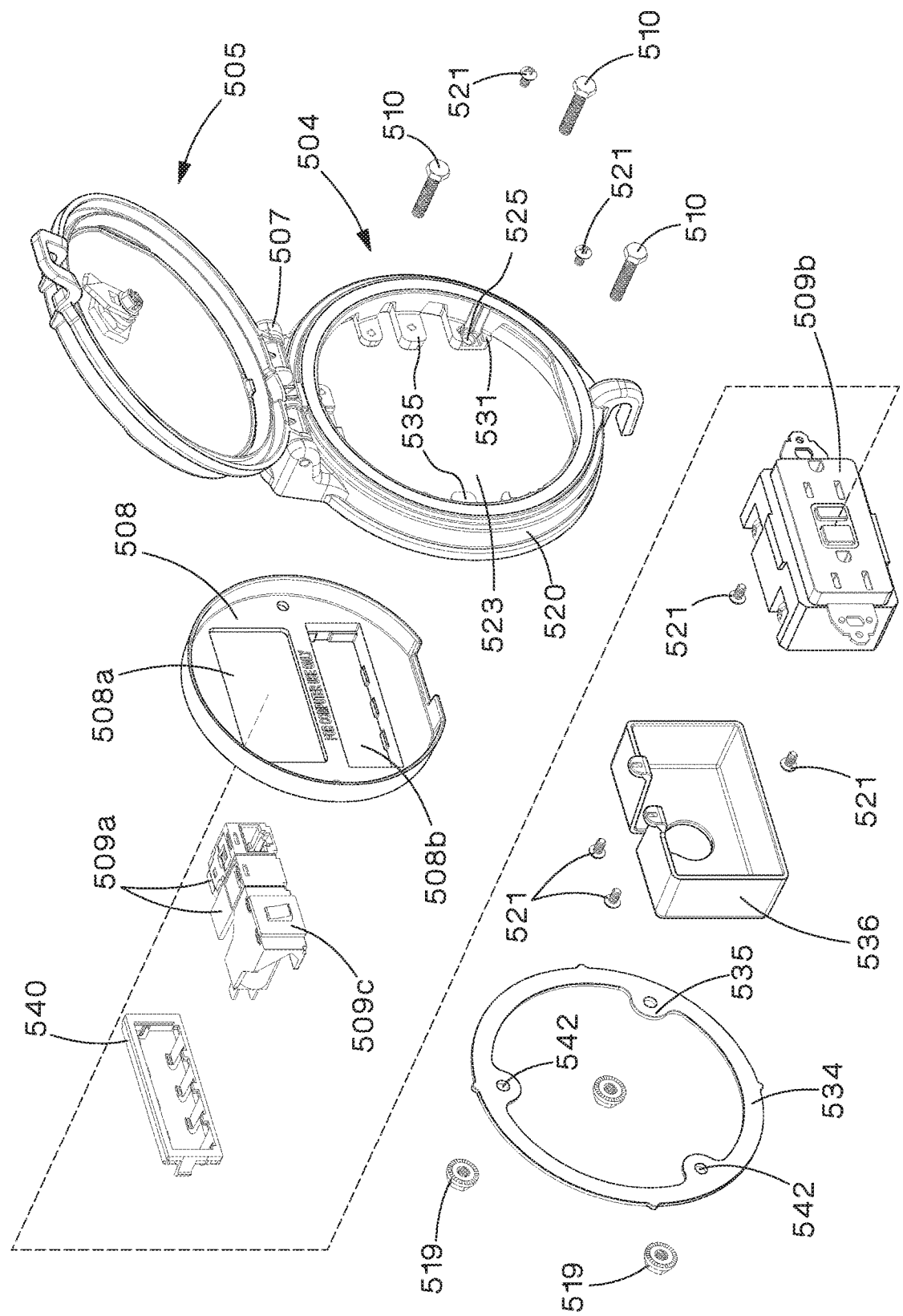
FIG. 57 is an exploded trimetric projection of the access port shown in FIG. 55, with the cover of the access port being shown in the open position.
Figure 58:
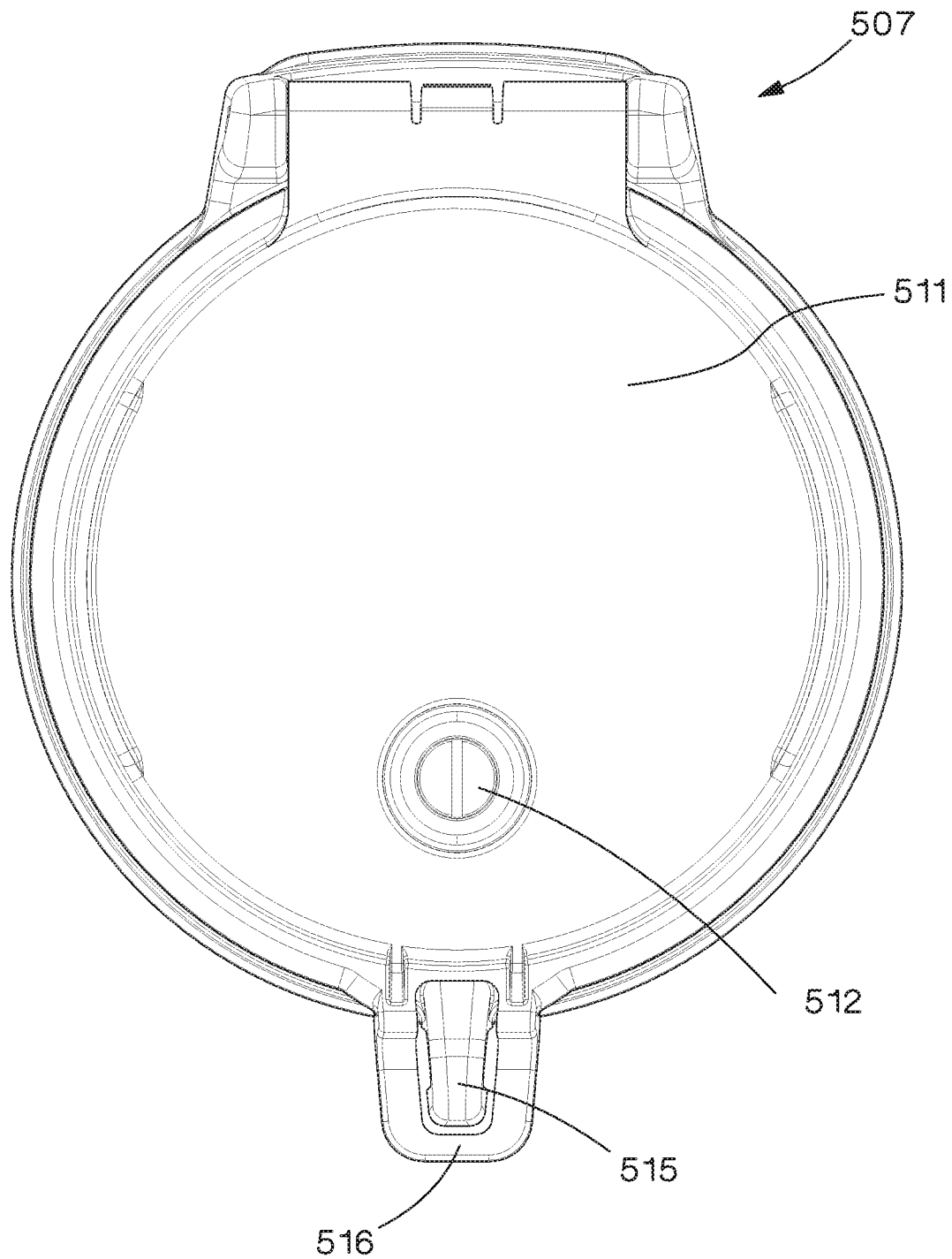
FIG. 58 is a front elevation view of the access port shown in FIG. 55, with the cover of the access port being shown in the closed position.
Figure 59:
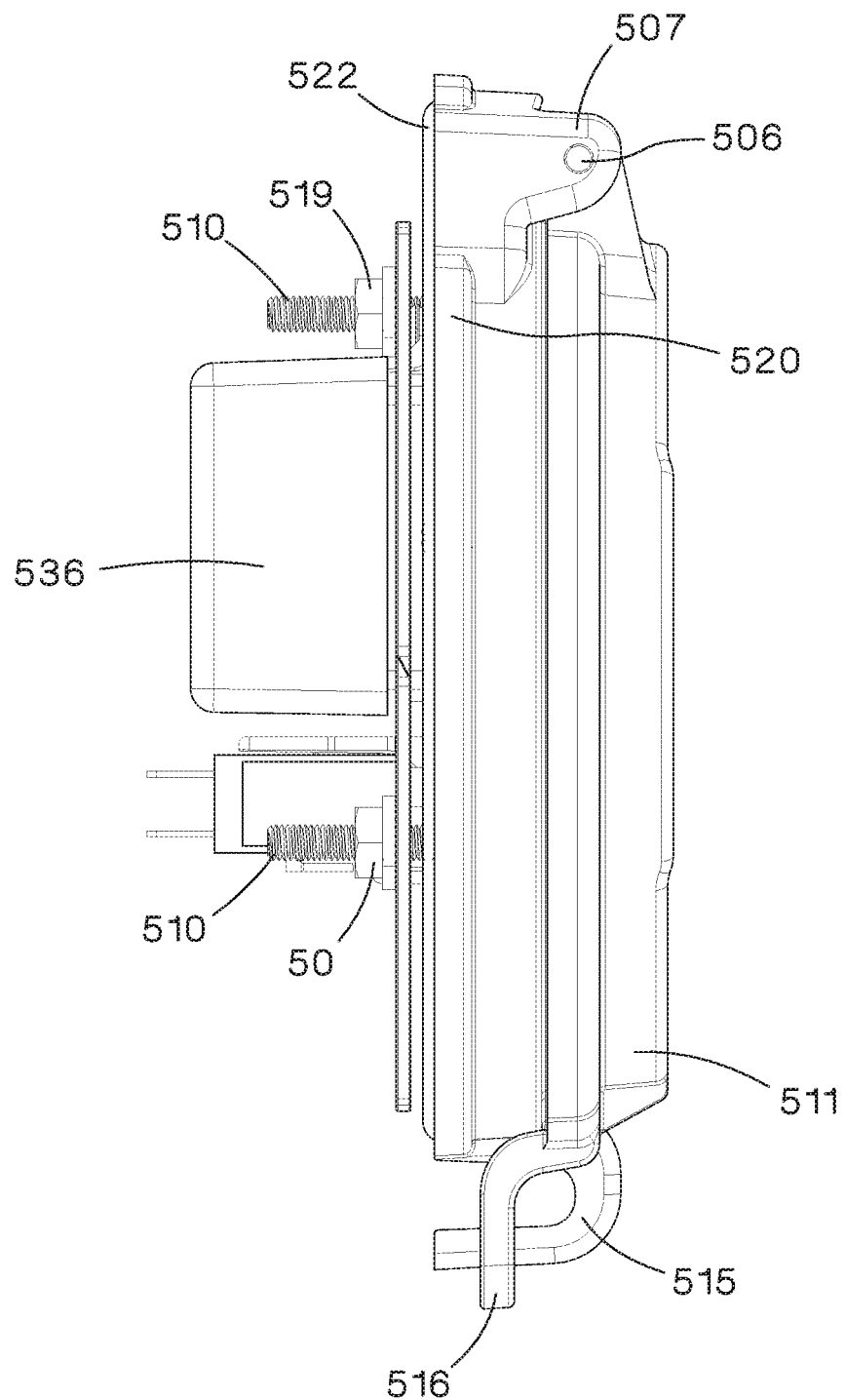
FIG. 59 is a left-side elevation view of the access port shown in FIG. 55, with the cover of the access port being shown in the closed position.
Figure 60:
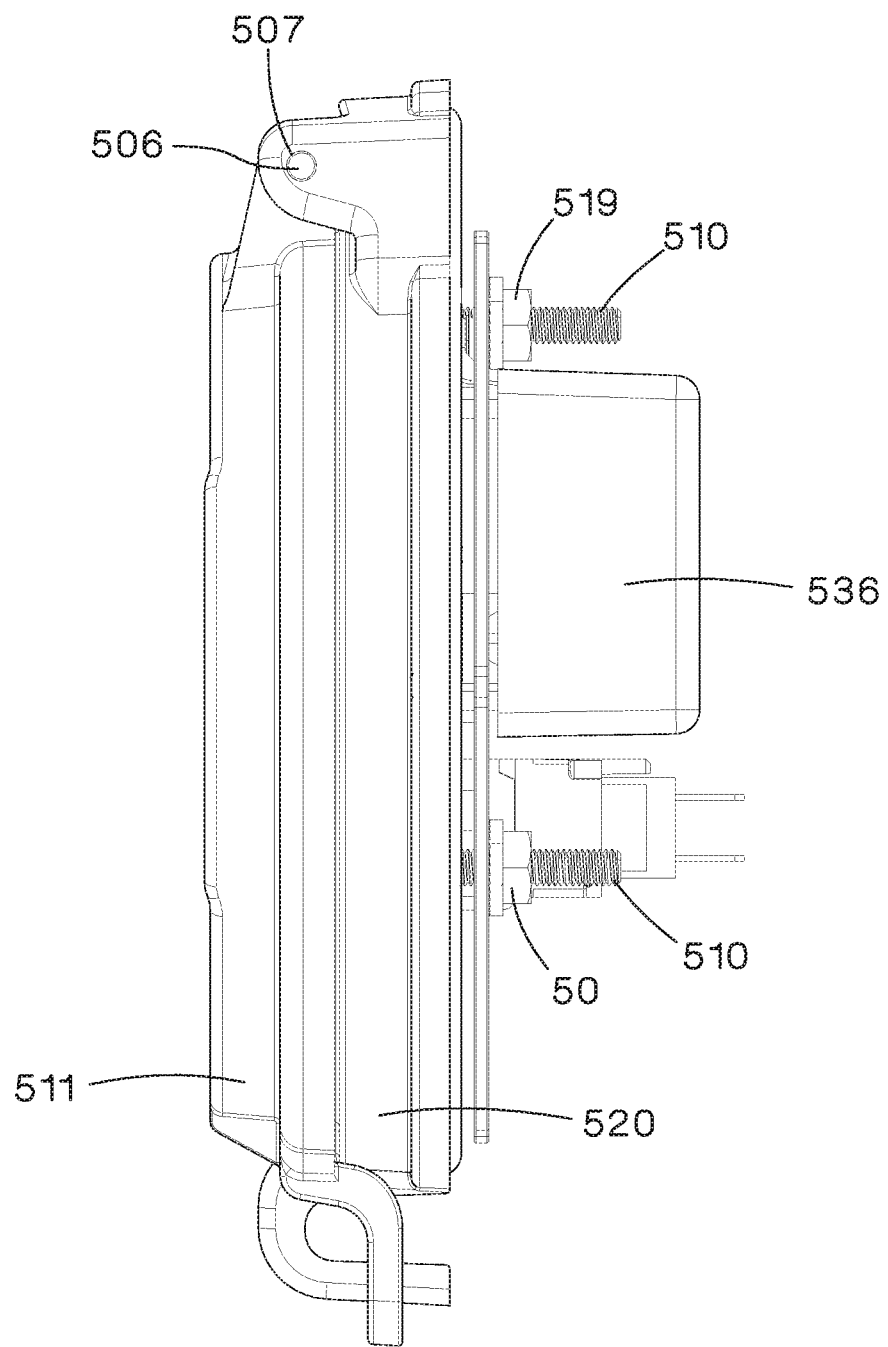
FIG. 60 is a right-side elevation view of the access port shown in FIG. 55, with the cover of the access port being shown in the closed position.
Figure 61:
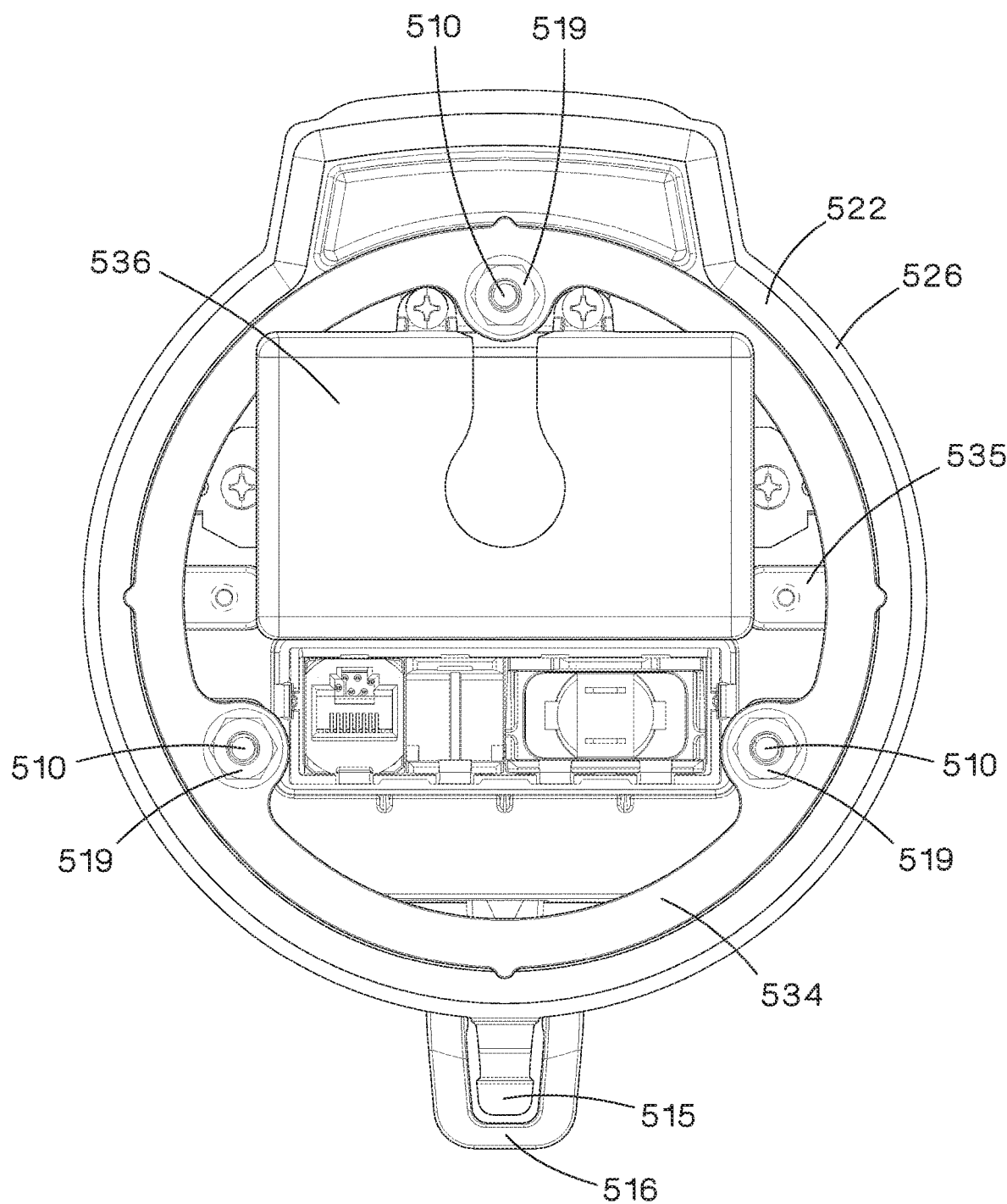
FIG. 61 is a back-elevation view of the access port shown in FIG. 55, with the cover of the access port being shown in the closed position.
Figure 62:
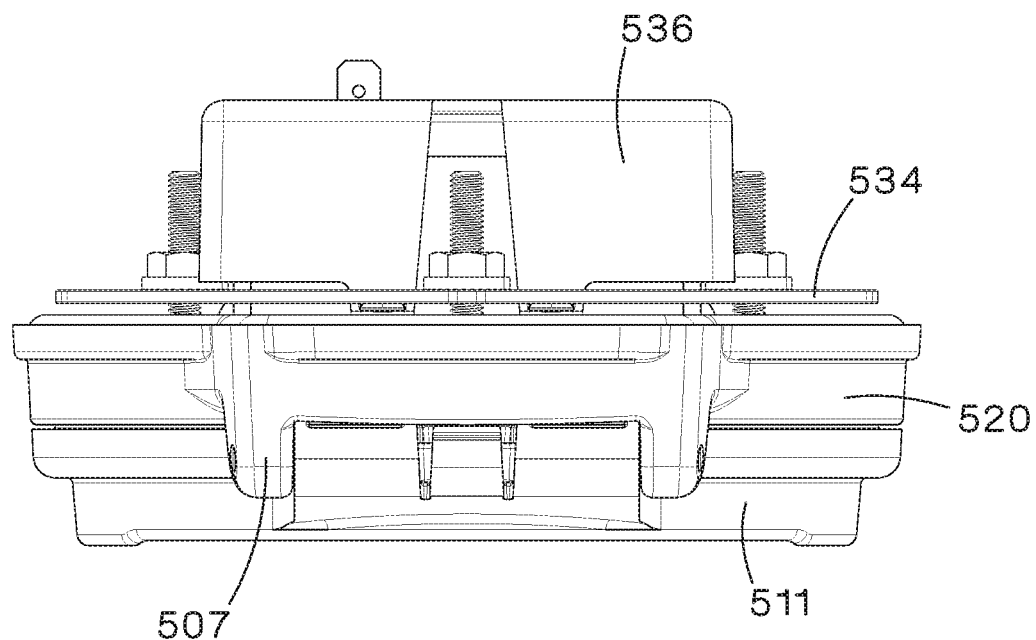
FIG. 62 is a top plan view of the access port shown in FIG. 55, with the cover of the access port being shown in the closed position.
Figure 63:
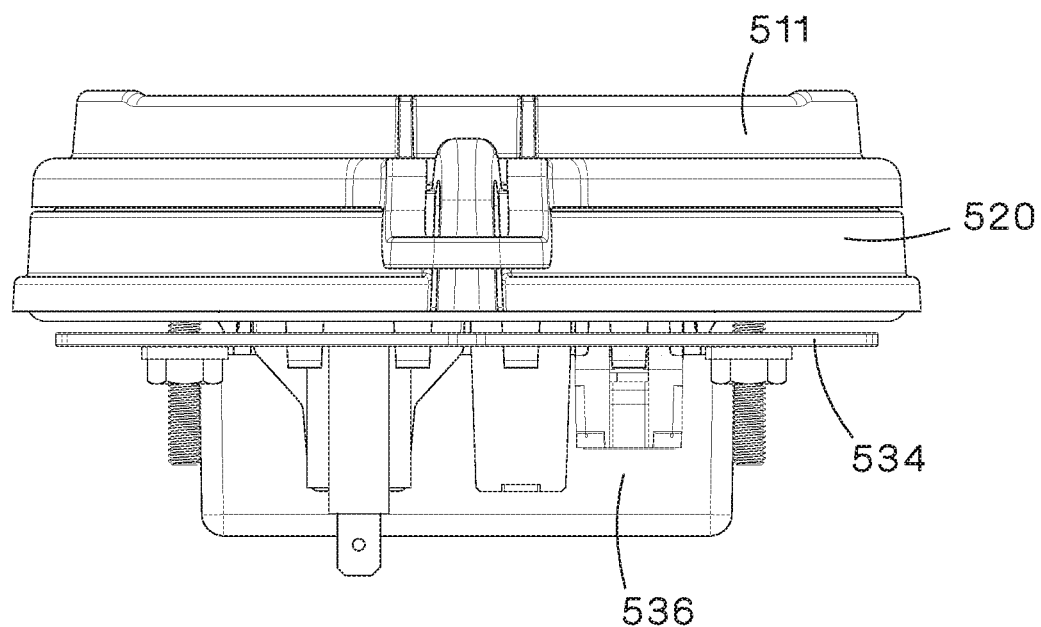
FIG. 63 is a bottom plan view of the access port shown in FIG. 55, with the cover of the access port being shown in the closed position.
Figure 64:
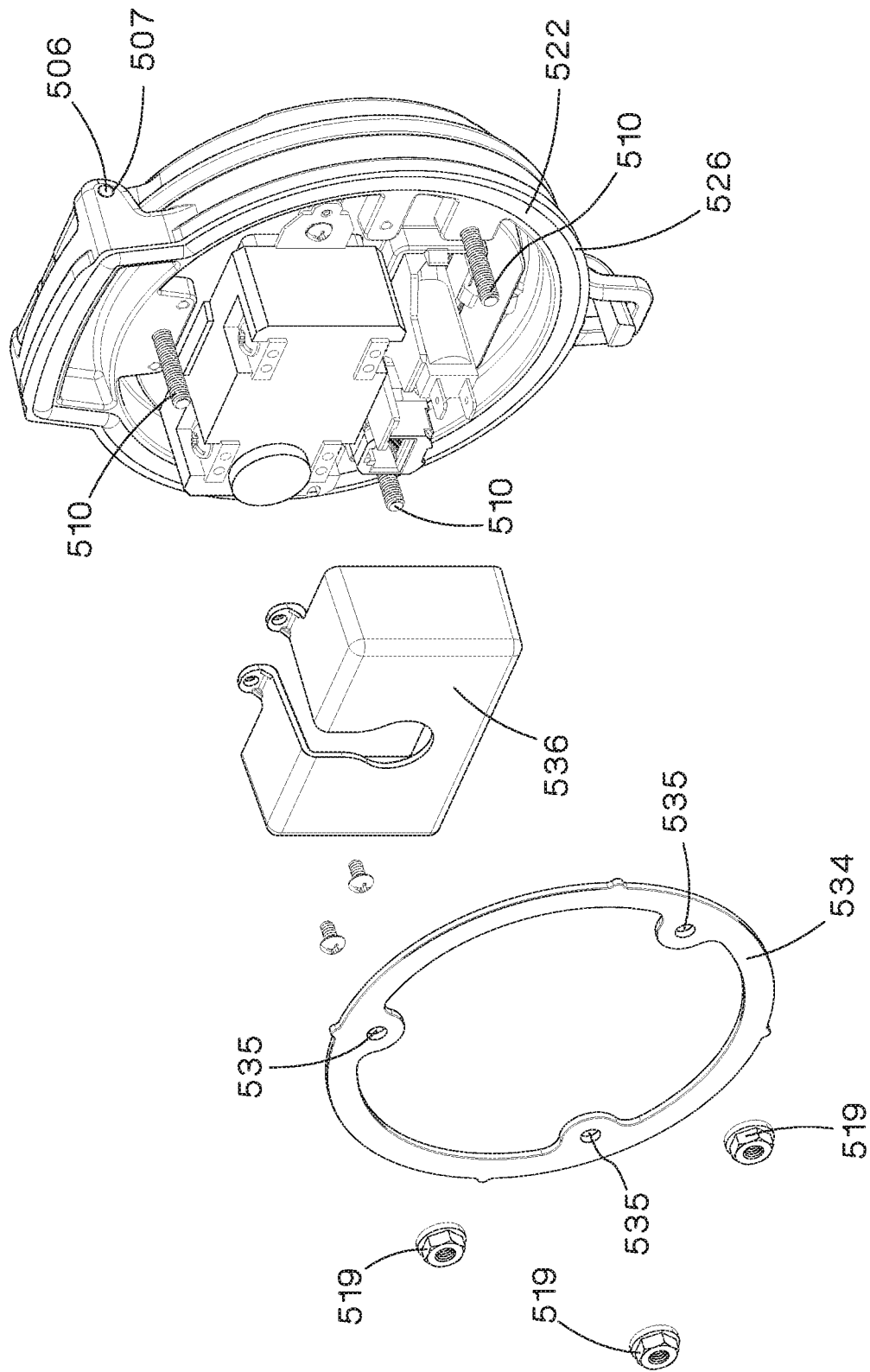
FIG. 64 is a rear partial exploded trimetric projection of the access port shown in FIG. 55, with the locking ring and backing cover exploded.

As shown in FIG. 57, the present example configuration of a faceplate 508 includes mounting holes 508a, 508b. Mounting hole 508a may accommodate an electrical outlet (component 509b), such as a double female port outlet. Electrical outlet 509b may be enclosed within the access port 500, between the faceplate 508 and backing cover 536. Backing cover 536 may be held against the back of faceplate 508 by screws 521. Backing cover 536 encloses electrical outlet 509b to insure electrical wires of the electrical outlet 509b are protected and incidental contact by a technician is avoided.

Mounting hole 508b may be configured to accept a component insert 540. Component insert 540 is configured to reside within mounting hole 508b so that components 509a and 509c may be attached to the faceplate 508. Component insert 540 is depicted as two RJ45 couplers (component 509a) and a circuit breaker (component 509c). Mounting hole 508b may also be configured to accept alternative component inserts such as the component insert 548 of FIG. 68. It is contemplated that the mounting holes 508a, 508b may be of any shape and size configured to be supported by the faceplate 508 to accommodate different components. It is further contemplated that mounting holds 508a, 508b may be configured such that the installer may reconfigure or change component insert 540 and installed components 509a-509c after access port 500 has been installed within the enclosure 501.

It is contemplated that the outside of the base could be any shape, including rectangular or square, so long as the interior of the base assembly is circular or substantially circular so that the opening in the enclosure is substantially similar in size to the circular or substantially circular interior of the base assembly.

Note that while the present disclosure includes several embodiments, these embodiments are non-limiting, and there are alterations, permutations, and equivalents, which fall within the scope of this invention. Additionally, the described embodiments should not be interpreted as mutually exclusive and should instead be understood as potentially combinable if such combinations are permissive. It should also be noted that there are many alternative ways of implementing the embodiments of the present disclosure. It is therefore intended that claims that may follow be interpreted as including all such alterations, permutations, and equivalents as fall within the true spirit and scope of the present disclosure.

The invention claimed is:

1. An access port for mounting to an electrical enclosure, comprising:
    a base assembly having a substantially circular interior opening defined by an interior wall;
    a cover assembly connected to the base assembly at a hinge point;
    a faceplate disposed in the substantially circular interior opening and removably attached to the base assembly while the base assembly is mounted to the electrical enclosure and the cover assembly is in an open position, the faceplate configured to support mounting of a connection component; and
    a lock ring removably attached to the base assembly by at least one fastener connected to the interior wall of the base assembly, wherein the lock ring is configured to engage an interior side of the electrical enclosure when the at least one fastener is tightened.

2. The access port of claim 1, wherein the at least one fastener is connected to the interior wall through openings in an alignment tab.

3. The access port of claim 1, wherein the connection component is one of an electrical or a fiber optic connection component.

4. The access port of claim 3, wherein the faceplate is disposed between the at least one fastener and the cover assembly.

5. The access port of claim 1, wherein the cover assembly includes a compression lock disposed within, wherein the compression lock is configured to rotate a latch between a locked position and an unlocked position.

6. The access port of claim 1, wherein a front of the base includes a first gasket disposed therein and a rear of the base includes second gasket disposed therein.

7. An electrical enclosure comprising:
    a first wall, a second wall, a third wall, a fourth wall, a fifth wall, and a door; wherein one of the first wall, second wall, third wall, forth wall, fifth wall, or door include a circular opening; and an access port affixed about the opening, the access port comprising:
- a base assembly having a substantially circular interior opening defined by an interior wall;
- a cover assembly connected to the base assembly at a hinge point;
- a faceplate disposed in the substantially circular interior opening and removably attached to the base assembly while the base assembly is mounted to the electrical enclosure and the cover assembly is in an open position, the faceplate configured to support mounting of an electrical or fiber optic connection component; and
- a lock ring removably attached to the base assembly by at least one fastener connected to the interior wall of the base assembly, wherein the lock ring is configured to engage an interior side of the electrical enclosure when the at least one fastener is tightened.

8. The electrical enclosure of claim 7, wherein the at least one fastener is connected to the interior wall through openings in an alignment tab.

9. The electrical enclosure of claim 7, wherein the connection component is one of an electrical or a fiber optic connection component.

10. The electrical enclosure of claim 7, wherein the faceplate is disposed between the at least one fastener and the cover assembly.

11. The electrical enclosure of claim 7, wherein the cover assembly includes a compression lock disposed within, wherein the compression lock is configured to rotate a latch between a locked position and an unlocked position.

12. The electrical enclosure of claim 7, wherein a front of the base includes a first gasket disposed therein and a rear of the base includes second gasket disposed therein.

13. A method of installing an access port on an electrical enclosure, the method comprising the steps of:
- cutting a circular opening into one of a first wall, a second wall, a third wall, a fourth wall, a fifth wall, or a door of the electrical enclosure;
- positioning a base assembly having a substantially circular interior opening defined by an interior wall adjacent the opening on an exterior of the enclosure, the base assembly including a first set of base assembly openings and a second set of base assembly openings;
- positioning a lock ring adjacent the opening in an interior side of the enclosure so that a first set of lock ring openings line up to a first set of interior wall openings, affixing a first set of fasteners to the interior wall of the base assembly through the first set of lock ring openings and the first set of interior wall openings;
- positioning a faceplate adjacent to the base assembly so that a first set of faceplate openings line up to the second set of base assembly openings;
- affixing the first set of fasteners to the lock ring;
- tightening the first set of fasteners until the lock ring engages the interior side and the base engages the exterior of the enclosure;
- mounting a connection component to the faceplate; and
- affixing a second set of fasteners through the first set of faceplate openings and the second set of base assembly openings and tightening to engage the faceplate to the base assembly.

* * * * *